(12) United States Patent
Amemiya et al.

(10) Patent No.: US 7,734,175 B2
(45) Date of Patent: Jun. 8, 2010

(54) NETWORK CONFIGURING APPARATUS

(75) Inventors: Kouichirou Amemiya, Kawasaki (JP);
Toshiyuki Shibuya, Kawasaki (JP);
Tsunehisa Doi, Kawasaki (JP); Toshiki Tanaka, Kawasaki (JP); Hideyuki Miyata, Kawasaki (JP); Yasutaka Taniuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 806 days.

(21) Appl. No.: 11/528,795

(22) Filed: Sep. 28, 2006

(65) Prior Publication Data

US 2007/0280686 A1    Dec. 6, 2007

(30) Foreign Application Priority Data

May 31, 2006    (JP)    ............... 2006-152899

(51) Int. Cl.
*H04J 14/00*    (2006.01)
(52) U.S. Cl. ............... 398/45; 398/51; 398/54; 398/49; 398/50; 385/24; 385/16; 385/17; 385/18; 370/254; 370/229; 370/351; 370/354; 709/224; 709/226
(58) Field of Classification Search ............... 398/45, 398/46, 47, 48, 49, 50, 51, 42, 53, 54, 55, 398/56, 57, 58, 59, 79, 52, 82; 385/24, 16, 385/17, 18; 370/354, 397, 229, 254, 468, 370/351, 220, 223, 252, 390, 392, 432, 389, 370/465; 709/226, 219, 223, 224, 221, 238, 709/236, 231
See application file for complete search history.

(56) References Cited

U.S. PATENT DOCUMENTS

| 4,797,879 | A | * | 1/1989 | Habbab et al. | ............... 398/51 |
| 6,243,510 | B1 | * | 6/2001 | Rauch | ............... 385/15 |
| 2003/0069972 | A1 | | 4/2003 | Yoshimura et al. | |
| 2003/0156536 | A1 | | 8/2003 | Oki et al. | |

FOREIGN PATENT DOCUMENTS

| JP | 2003-124976 | 4/2003 |
| JP | 2003-258862 | 9/2003 |

* cited by examiner

*Primary Examiner*—Hanh Phan
(74) *Attorney, Agent, or Firm*—Fujitsu Patent Center

(57) ABSTRACT

An optical wiring switching unit includes a first connection interface. A packet switch includes a second connection interface. A resource includes a third connection interface, and is formed with at least one of a server and a storage device. A control device controls the optical wiring switching unit to perform a switching of connection between the connection interfaces. The packet switch and the resource are connected to the optical wiring switching unit via the connection interfaces. A network is configured by connecting the packet switch and the resource with a control of the optical wiring switching unit.

27 Claims, 47 Drawing Sheets

FIG.8

RESOURCE INFORMATION
30

| PORT NUMBER OF OPTICAL SWITCH | TYPE OF RESOURCE TO BE CONNECTED | PERFORMANCE OF RESOURCE TO BE CONNECTED |
|---|---|---|
| PORT 1 | WEB SERVER | OS XXX VER.4, CPU 3.2 GHz, MEMORY 1 GB,··· |
| PORT 2 | APPLICATION SERVER | OS XXX VER.3, CPU 2.8 GHz, MEMORY 2 GB,··· |
| ... | ... | ... |
| PORT n | STORAGE | HDD1TB、FC-1/F... |

FIG.24

|   | A | B | C | D | E | F | G |
|---|---|---|---|---|---|---|---|
| A | 0 | 2 | 2 | 0 | 0 | 0 | 0 |
| B | 2 | 0 | 2 | 0 | 0 | 0 | 0 |
| C | 2 | 2 | 0 | 0 | 0 | 0 | 1 |
| D | 0 | 0 | 0 | 0 | 2 | 2 | 1 |
| E | 0 | 0 | 0 | 2 | 0 | 2 | 0 |
| F | 0 | 0 | 0 | 2 | 2 | 0 | 0 |
| G | 0 | 0 | 1 | 1 | 0 | 0 | 0 |

FIG.27

| MIDDLE-SWITCH ID |
| --- |
| NUMBER OF SIGNAL LINES |
| SWITCHING CAPACITY |
| LINK CAPACITY |
| LAYER 2/3 SWITCHING CAPABILITY |

FIG.28

| | |
| --- | --- |
| NODE CHARACTERISTIC INFORMATION | MIDDLE-SWITCH ID |
| | NUMBER OF SIGNAL LINES |
| | SWITCHING CAPACITY |
| | LINK CAPACITY |
| | LAYER 2/3 SWITCHING CAPABILITY |
| NETWORK CONFIGURATION INFORMATION | LINK-CONNECTION-DESTINATION INFORMATION |
| | isRoot |
| | isL3 |
| | RIGHT-SIDE SUB NODE |
| | LEFT-SIDE SUB NODE |

FIG.33A

| ID | 0 | 1 | 2 | 3 | 4 | 5 | 6 |
|---|---|---|---|---|---|---|---|
|  | A | B | C | D | E | F | G |
| GROUP | 0 | 0 | 0 | 1 | 2 | 2 | 2 |
| LEFT | NULL | NULL | NULL | NULL | NULL | NULL | NULL |
| RIGHT | NULL | NULL | NULL | NULL | NULL | NULL | NULL |
| ISROOT | FALSE | FALSE | FALSE | FALSE | FALSE | FALSE | FALSE |
| ... | ... | ... | ... | ... | ... | ... | ... |

⬆

| ID | 0 | 1 | 2 | 3 | 4 | 5 | 6 |
|---|---|---|---|---|---|---|---|
|  | A | B | C | G | D | E | F |
| GROUP | 0 | 0 | 0 | 1 | 2 | 2 | 2 |
| LEFT | NULL | NULL | NULL | NULL | NULL | NULL | NULL |
| RIGHT | NULL | NULL | NULL | NULL | NULL | NULL | NULL |
| ISROOT | FALSE | FALSE | FALSE | TRUE | FALSE | FALSE | FALSE |
| ... | ... | ... | ... | ... | ... | ... | ... |

⬆

| ID | 0 | 1 | 2 | 3 | 4 | 5 | 6 |
|---|---|---|---|---|---|---|---|
|  | A | B | C | D | E | F | G |
| GROUP | 0 | 0 | 0 | 0 | 0 | 0 | 0 |
| LEFT | NULL | NULL | NULL | NULL | NULL | NULL | NULL |
| RIGHT | NULL | NULL | NULL | NULL | NULL | NULL | NULL |
| ISROOT | FALSE | FALSE | FALSE | FALSE | FALSE | FALSE | FALSE |
| ... | ... | ... | ... | ... | ... | ... | ... |

⬇

TRAFFIC AMOUNT "x"=2

| ID | 0 | 1 | 2 | 3 | 4 | 5 | 6 |
|---|---|---|---|---|---|---|---|
|  | A | B | C | D | E | F | G |
| GROUP | 0 | 0 | 0 | 1 | 2 | 2 | 2 |
| LEFT | NULL | NULL | NULL | NULL | NULL | NULL | NULL |
| RIGHT | NULL | NULL | NULL | NULL | NULL | NULL | NULL |
| ISROOT | FALSE | FALSE | FALSE | FALSE | FALSE | FALSE | FALSE |
| ... | ... | ... | ... | ... | ... | ... | ... |

FIG.35A

| ID | 0 | 1 | 2 | 3 | 4 | 5 | 6 |
|---|---|---|---|---|---|---|---|
| | A | B | C | D | E | F | G |
| GROUP | 0 | 0 | 0 | 0 | 0 | 0 | 0 |
| LEFT | NULL | NULL | NULL | NULL | NULL | NULL | NULL |
| RIGHT | NULL | NULL | NULL | NULL | NULL | NULL | NULL |
| ISROOT | FALSE | FALSE | FALSE | FALSE | FALSE | FALSE | FALSE |
| ISL3 | FALSE | FALSE | FALSE | FALSE | FALSE | FALSE | TRUE |
| ... | ... | ... | ... | ... | ... | ... | ... |

↓

| ID | 0 | 1 | 2 | 3 | 4 | 5 | 6 |
|---|---|---|---|---|---|---|---|
| | A | B | C | D | E | F | G |
| GROUP | 0 | 0 | 0 | 1 | 2 | 2 | 2 |
| LEFT | NULL | NULL | NULL | NULL | NULL | NULL | NULL |
| RIGHT | NULL | NULL | NULL | NULL | NULL | NULL | NULL |
| ISROOT | FALSE | FALSE | FALSE | FALSE | FALSE | FALSE | FALSE |
| ISL3 | FALSE | FALSE | FALSE | FALSE | FALSE | FALSE | TRUE |
| ... | ... | ... | ... | ... | ... | ... | ... |

TRAFFIC ROUTE BETWEEN A-B SUBNETS
TRAFFIC AMOUNT "x"

→

| ID | 0 | 1 | 2 | 3 | 4 | 5 | 6 |
|---|---|---|---|---|---|---|---|
| | A | B | C | D | E | F | G |
| GROUP | 0 | 0 | 0 | 1 | 2 | 2 | 2 |
| LEFT | NULL | NULL | NULL | NULL | NULL | NULL | NULL |
| RIGHT | NULL | NULL | NULL | NULL | NULL | NULL | NULL |
| ISROOT | FALSE | FALSE | FALSE | FALSE | FALSE | FALSE | FALSE |
| ISL3 | FALSE | FALSE | FALSE | FALSE | FALSE | FALSE | TRUE |
| ... | ... | ... | ... | ... | ... | ... | ... |

→

| ID | 0 | 1 | 2 | 3 | 4 | 5 | 6 |
|---|---|---|---|---|---|---|---|
| | A | B | C | G | D | E | F |
| GROUP | 0 | 0 | 0 | 1 | 2 | 2 | 2 |
| LEFT | NULL | NULL | NULL | NULL | NULL | NULL | NULL |
| RIGHT | NULL | NULL | NULL | NULL | NULL | NULL | NULL |
| ISROOT | FALSE | FALSE | FALSE | TRUE | FALSE | FALSE | FALSE |
| ISL3 | FALSE | FALSE | FALSE | TRUE | FALSE | FALSE | FALSE |
| ... | ... | ... | ... | ... | ... | ... | ... |

FIG.37

| | 0 | 1 | 2 | 3 | 4 | 5 | 6 |
|---|---|---|---|---|---|---|---|
| ID | A | C | B | G | E | D | F |
| GROUP | 0 | 0 | 0 | 0 | 0 | 0 | 0 |
| LEFT | NULL | A | NULL | C | NULL | E | NULL |
| RIGHT | NULL | B | NULL | D | NULL | F | NULL |
| ISROOT | FALSE | FALSE | FALSE | TRUE | FALSE | FALSE | FALSE |
| LINK CONNECTION DESTINATION | 1 2 3 | 7 8 9 | 4 5 6 | 19 20 21 | 13 14 15 | 10 11 12 | 16 17 18 |
| NUMBER OF SIGNAL LINES | 3 | 3 | 3 | 3 | 3 | 3 | 3 |
| SWITCHING CAPACITY | XBPS | XBPS | XBPS | XBPS | XBPS | XBPS | XBPS |
| LINK CAPACITY | XBPS ... | XBPS ... | XBPS ... | XBPS ... | XBPS ... | XBPS ... | XBPS ... |
| LAYER 2/3 SWITCHING CAPABILITY | FALSE | FALSE | FALSE | TRUE | FALSE | FALSE | FALSE |

FIG.43

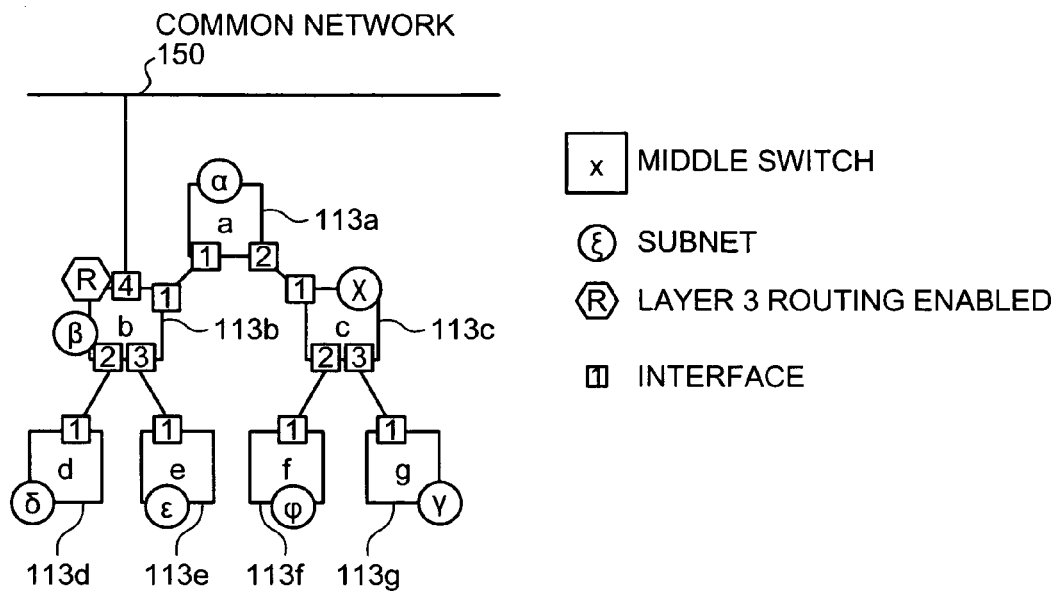

FIG.44

| NODE | INTERFACE | VLAN |
|---|---|---|
| a | 0<br>1<br>2 | $\alpha$<br>$\alpha, \chi, \phi, \gamma$<br>$\chi, \phi, \gamma$ |
| b | 0<br>1<br>2<br>3<br>4 | $\beta$<br>$\alpha, \chi, \phi, \gamma$<br>$\delta$<br>$\varepsilon$<br>COMMON NETWORK |
| c | 0<br>1<br>2<br>3 | $\chi$<br>$\chi, \phi, \gamma$<br>$\phi$<br>$\gamma$ |
| d | 0<br>1 | $\delta$<br>$\delta$ |
| e | 0<br>1 | $\varepsilon$<br>$\varepsilon$ |
| f | 0<br>1 | $\phi$<br>$\phi$ |
| g | 0<br>1 | $\gamma$<br>$\gamma$ |

FIG.45

| NODE | DESTINATION | INTERFACE |
|---|---|---|
| b | COMMON NETWORK<br>Net-$\alpha$<br>Net-$\beta$<br>Net-$\chi$<br>Net-$\delta$<br>Net-$\varepsilon$<br>Net-$\phi$<br>Net-$\gamma$ | 4<br>1,VLAN-$\alpha$<br>0,VLAN-$\beta$<br>1,VLAN-$\chi$<br>2,VLAN-$\delta$<br>3,VLAN-$\varepsilon$<br>1,VLAN-$\phi$<br>1,VLAN-$\gamma$ |

NETWORK CONFIGURING APPARATUS

BACKGROUND OF THE INVENTION

1. Field of the Invention

The present invention relates to a network configuring apparatus employing a physical wiring switch, and more particularly, to a network configuring apparatus that can enhance a flexibility in establishing a network system.

2. Description of the Related Art

Recently, more and more companies have been adopting a business style of outsourcing an operation management of their corporate information system to a data center provider, to save a cost for information technology (IT)-related facility.

A need from a user includes an establishment of a system in response to a change of a market, such as a system for dealing with an event that happens on a short-term basis or a load occurring on a periodic basis and a system that would be needed in the future for which it is difficult to predict. The data center provider prepares a variety of IT resources and provides a service with which the user can use the IT resources, to meet various needs from the user.

When providing the service, the data center provider divides the IT resources in compliance with an access condition of each user, a usage time of each user, a usage season of each user, etc., to meet a request from the user for using the IT resources.

To realize such services, it is extremely important to operate the IT resources efficiently, and to reduce an operation cost effectively. For that purpose, a method of dynamically changing an allocation of resources to a user in response to a load, when the load of the user is changed in a data center, has been proposed (see, for example, Japanese Patent Application Laid-Open No. 2003-124976).

In addition, in an optical-electrical convergence network that is configured with an optical core network and an electrical sub-network, a method of performing a setting or a releasing of an optimum optical-path in response to a traffic amount between the electrical sub-networks in an automatic manner has been proposed (see, for example, Japanese Patent Application Laid-Open No. 2003-258862).

However, with the above conventional technologies, it is difficult to enhance a flexibility in configuring a network system. For instance, in the conventional technology disclosed in Japanese Patent Application Laid-Open No. 2003-124976, a network switch is connected to each of the IT resources, and a reduction or a reinforcement of the IT resources is performed by controlling the network switch. However, the IT resources cannot be reinforced more than the number of ports of the network switch, and as a result, a size of a system depends on a capacity of a pre-installed network switch.

Therefore, when it is predicted that there would be a necessity to expand the size of the system in the future, it is required to estimate the size of the system that would be necessary in the future from the time of introducing the system, and to use a network switch that can cover the estimated size of the system, which results in an increase of a cost for an initial installation of the network switch.

In the conventional technology disclosed in Japanese Patent Application Laid-Open No. 2003-258862, when a usage rate of an optical path on the optical core network is over a predetermined value, the optical path is additionally set to suppress an occurrence of a congestion, and when the usage rate of the optical path is below a predetermined value so that there is a slim chance of the occurrence of the congestion, the optical path is released. However, the technology is not helpful for a new addition of an IT equipment or an easy change of a network topology.

SUMMARY OF THE INVENTION

It is an object of the present invention to at least partially solve the problems in the conventional technology.

A network configuring apparatus according to one aspect of the present invention includes an optical wiring switching unit that includes a first connection interface; a packet switch that includes a second connection interface; a resource that includes a third connection interface, the resource being formed with at least one of a server and a storage device; and a control device that controls the optical wiring switching unit to perform a switching of connection between the connection interfaces. The packet switch and the resource are connected to the optical wiring switching unit via the connection interfaces. The network configuring apparatus configures a network by connecting the packet switch and the resource with a control of the optical wiring switching unit.

A network configuring method according to another aspect of the present invention includes controlling an optical wiring switching unit that includes a first connection interface, a packet switch that includes a second connection interface, a resource that includes a third connection interface, and is formed with at least one of a server and a storage device, to perform a switching of connection between the connection interfaces; and configuring a network by connecting the packet switch and the resource with a control of the optical wiring switching unit.

A computer-readable recording medium according to still another aspect of the present invention stores therein a computer program for configuring a network. The computer program causes a computer to execute controlling an optical wiring switching unit that includes a first connection interface, a packet switch that includes a second connection interface, a resource that includes a third connection interface, and is formed with at least one of a server and a storage device, to perform a switching of connection between the connection interfaces; and configuring a network by connecting the packet switch and the resource with a control of the optical wiring switching unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a schematic diagram for illustrating an example of resource information to be stored in a storing unit;

FIG. 24 is a schematic diagram for illustrating an example of a traffic matrix;

FIG. 27 is a schematic diagram for illustrating an example of middle-switch information acquired by the control device;

FIG. 28 is a schematic diagram for illustrating an example of node data created for each middle switch;

FIG. 33A and FIG. 33B are schematic diagrams for illustrating an example of the process of determining connection configuration between nodes;

FIG. 35A and FIG. 35B are schematic diagrams for illustrating an example of the process of determining connection configuration between nodes in the communication system including the middle switch that has the layer 3 switching function;

FIG. 37 is a schematic diagram for illustrating an example of connection configuration data between nodes;

FIG. 43 is a schematic diagram for illustrating a topology of the middle switches after changing the network configuration;

FIG. 44 is a schematic diagram for illustrating an example of network configuration data stored in a storing unit of the control device;

FIG. 45 is a schematic diagram for illustrating an example of a routing table to be set to the middle switch;

DETAILED DESCRIPTION OF THE PREFERRED EMBODIMENTS

Exemplary embodiments of a network configuring apparatus according to the present invention will be explained in detail below with reference to the accompanying drawings.

Figure 1:
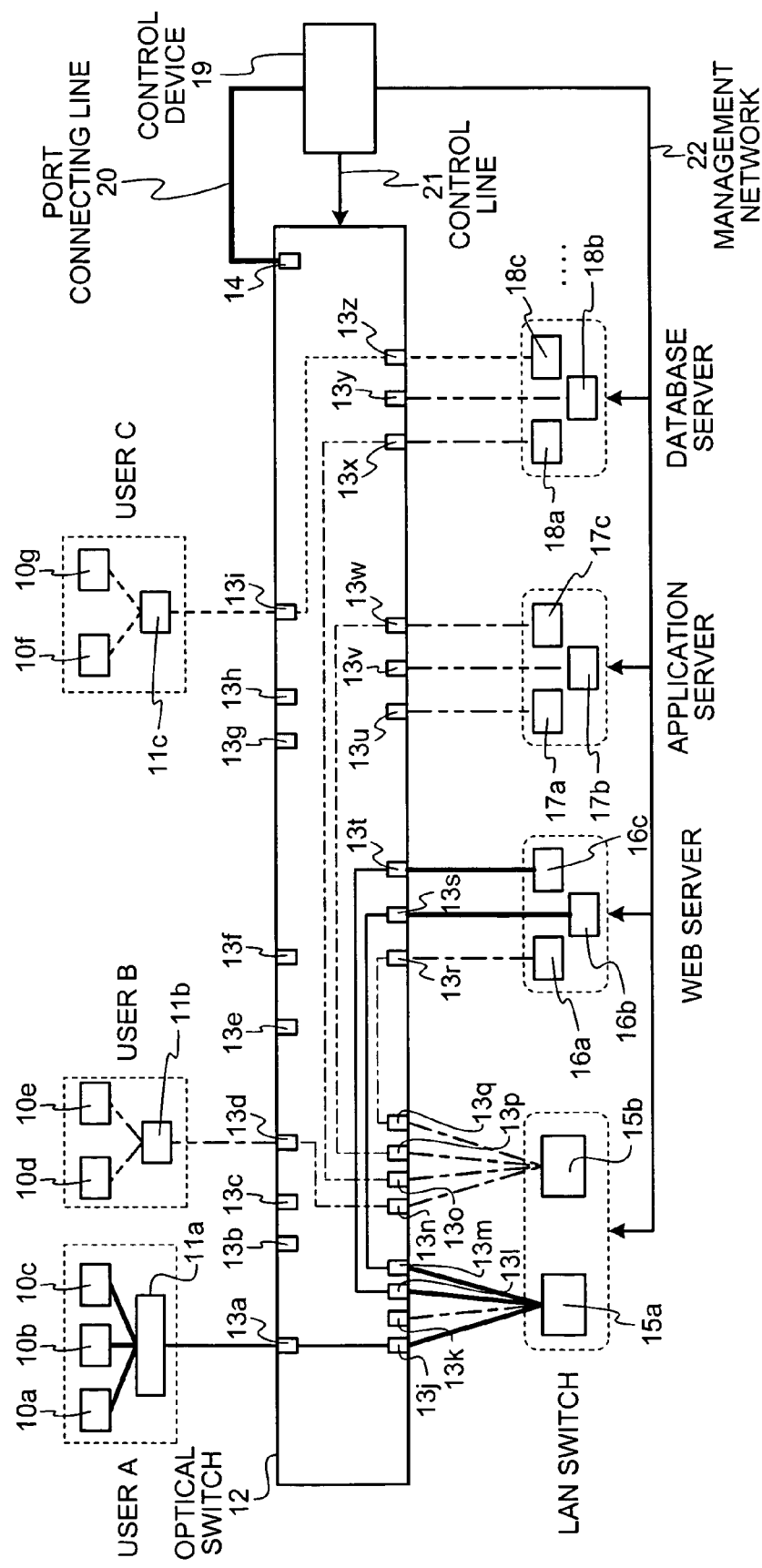
FIG. 1 is a schematic diagram for illustrating a functional configuration of a communication system according to a first embodiment of the present invention.

FIG. 1 is a schematic diagram for illustrating a functional configuration of a communication system according to a first embodiment of the present invention. In the communication system according to the first embodiment, an optical switch 12 that includes ports 13a to 13z, 14, local area network (LAN) switches 15a, 15b, web servers 16a to 16c, application servers 17a to 17c, and database servers 18a to 18c are connected through at least one connection interface.

Furthermore, the optical switch 12 and LAN switches 11a to 11c are also connected through a connection interface, so that the LAN switches 11a to 11c and the LAN switches 15a, 15b are connected each other in a cascaded manner. The LAN switches 11a to 11c and the LAN switches 15a, 15b in the communication system according to the first embodiment can be constituted with a packet switch that can support from a layer 2 to a layer 7.

The communication system according to the first embodiment further includes a control device 19 that is connected to the optical switch 12, the LAN switches 15a, 15b, the web servers 16a to 16c, the application servers 17a to 17c, and the database servers 18a to 18c through a port connection line 20, a control line 21, and a management network 22.

Although only one of the management network 22 is shown in FIG. 1 with respect to the pools of the web servers 16a to 16c, the application servers 17a to 17c, and the database servers 18a to 18c, in a practical case, the management network 22 is configured in such a manner that the control device 19 can communicate with the web servers 16a to 16c, the application servers 17a to 17c, and the database servers 18a to 18c by using a network switch and the like.

A plurality of client devices 10a to 10g of a plurality of users (a user A, a user B, and a user C) are connected to the LAN switches 11a to 11c, and therefore, it is possible to connect the client devices 10a to 10g to the ports 13a to 13z of the optical switch 12. In the communication system according to the first embodiment shown in FIG. 1, different sub-networks are represented by a solid line, a dotted line, a dashed line, and a double-dashed line.

Figure 2:
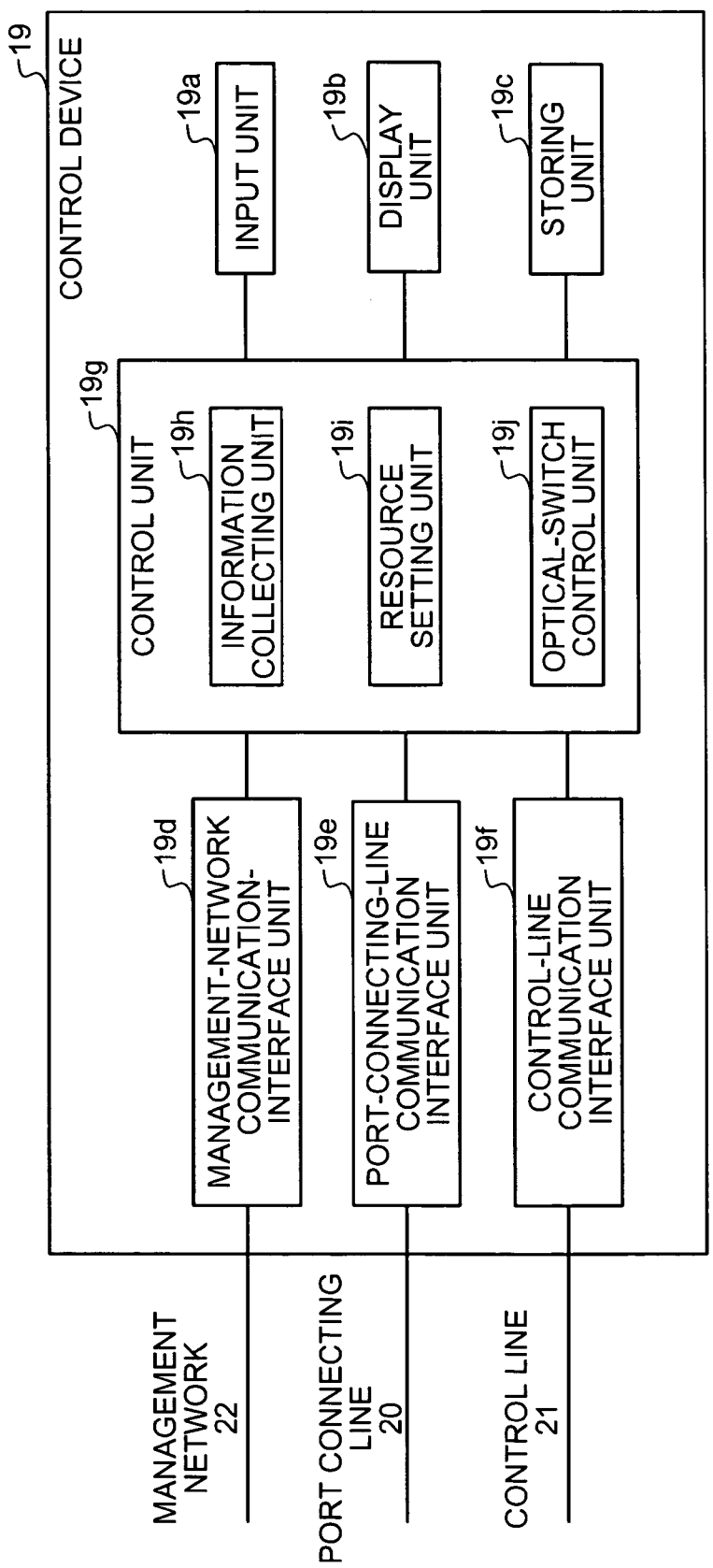
FIG. 2 is a block diagram for illustrating a functional configuration of a control device according to the first embodiment.

The control device 19 controls the optical switch 12. FIG. 2 is a block diagram for illustrating a functional configuration of the control device 19 according to the first embodiment. The control device 19 includes an input unit 19a, a display unit 19b, a storing unit 19c, a management-network communication-interface unit 19d, a port-connection-line communication-interface unit 19e, a control-line communication-interface unit 19f, and a control unit 19g.

The input unit 19a is an input device such as a keyboard and a mouse. The display unit 19b is a display device such as a monitor display. The storing unit 19c is a storage device such as a hard disk device for storing a variety of pieces of information.

The management-network communication-interface unit 19d is a communication interface to transfer data between the LAN switches 15a, 15b, the web servers 16a to 16c, the application servers 17a to 17c, and the database servers 18a to 18c, via the management network 22.

The port-connection-line communication-interface unit 19e is a communication interface to transfer data between devices connected to the ports 13a to 13z of the optical switch 12, via the port connection line 20 connected to the port 14 of the optical switch 12. The control-line communication-interface unit 19f is a communication interface to exchange data with the optical switch 12, via the control line 21.

The control unit 19g controls the control device 19, and controls a data transfer between each of the function units. The control unit 19g includes an information collecting unit 19h, a resource setting unit 19i, and an optical-switch control unit 19j.

The information collecting unit 19h is a processing unit that collects information on each device from the LAN switches 15a, 15b, the web servers 16a to 16c, the application servers 17a to 17c, and the database servers 18a to 18c, via the management network 22.

The resource setting unit 19i is a processing unit that sets a communication address to the LAN switches 15a, 15b, the web servers 16a to 16c, the application servers 17a to 17c, and the database servers 18a to 18c, via the management network 22 or the port connection line 20. The optical-switch control unit 19j is a processing unit that transmits a control signal to the optical switch 12, and performs a switch of wiring between the ports 13a to 13z, 14.

In this manner, in the communication system shown in FIG. 1, each of the client devices 10a to 11e of the user A and the user B is connected through the web servers 16a to 16c, the application servers 17a to 17c, the database servers 18a to 18c, the LAN switches 11a, 11b, the optical switch 12, and the LAN switches 15a, 15b.

With this scheme, it is possible to connect the web servers 16a to 16c, the application servers 17a to 17c, and the database servers 18a to 18c to each of the ports 13a and 13d to which the client devices 10a to 10e of the user A and the user B are connected, and because a server configuration can be easily changed by switching the wiring of the optical switch 12, it is possible to increase the flexibility of network system configuration.

To increase the number of servers used by the client devices 10a to 10e, an additional server can be connected to an empty port of the optical switch 12. Alternatively, a virtual large-scale switch can be built by connecting a plurality of LAN switches to increase the number of servers.

Figure 3:
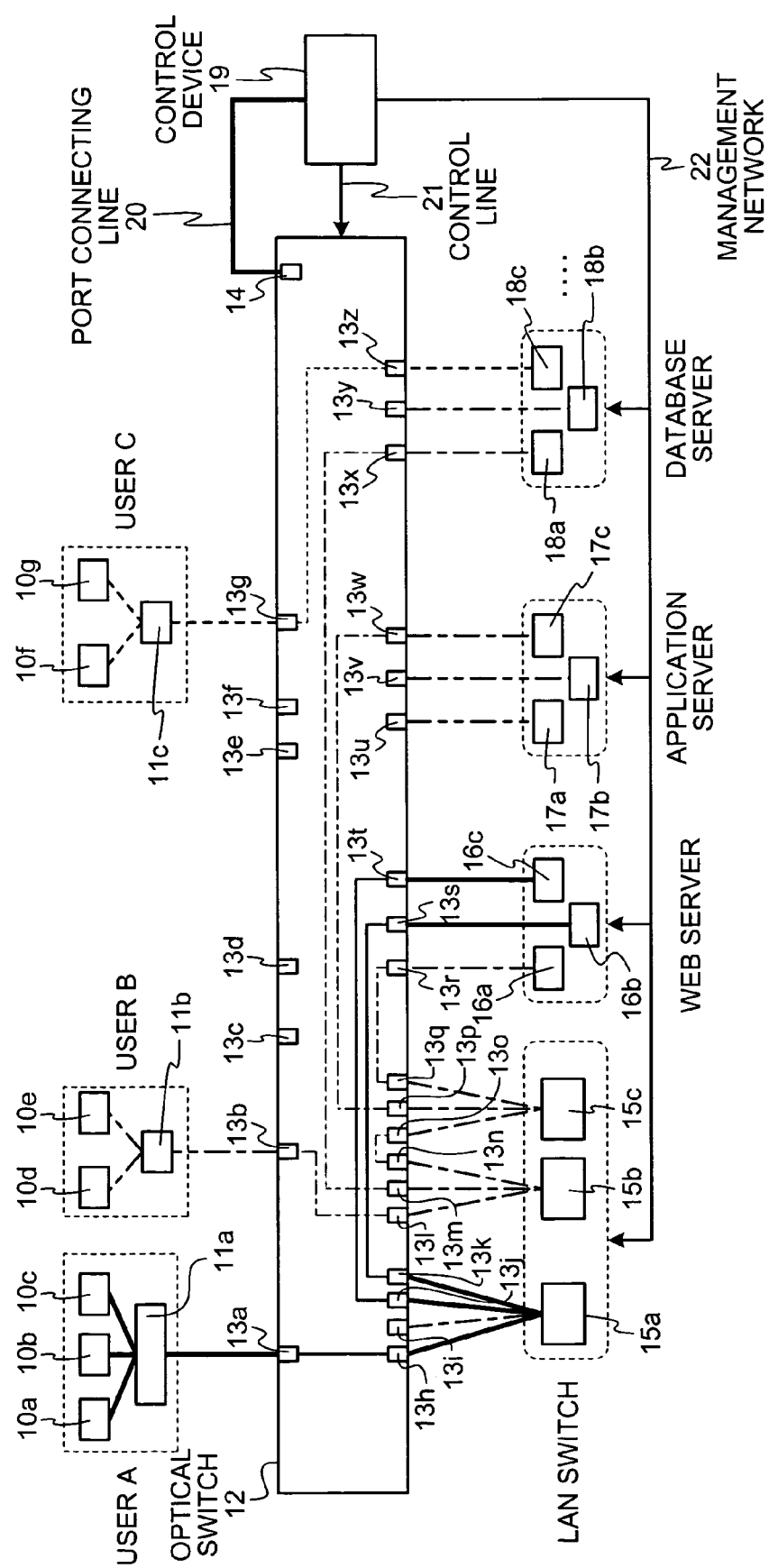
FIG. 3 is a schematic diagram for illustrating a method of establishing a virtual large-scale switch by connecting a plurality of LAN switches.
Figure 4:
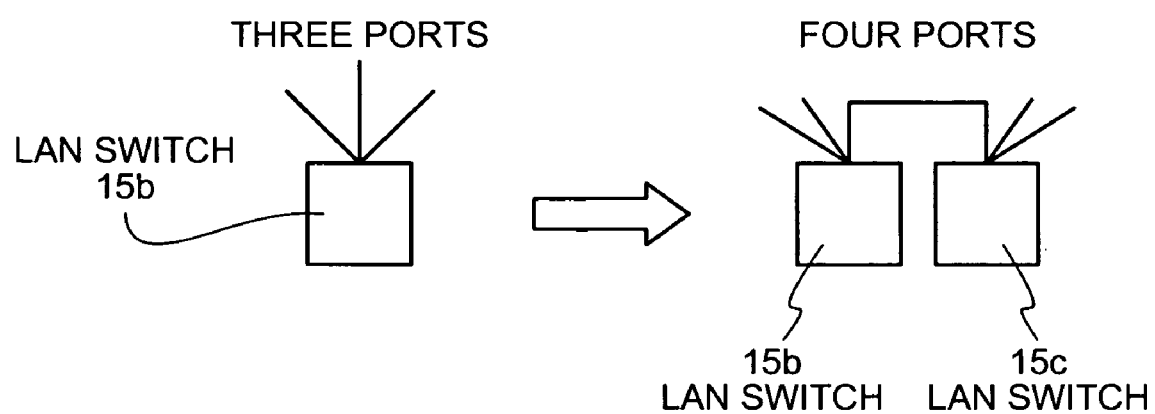
FIG. 4 is a schematic diagram for illustrating an increase of the number of ports by using a plurality of LAN switches.

FIG. 3 is a schematic diagram for illustrating a method of building the virtual large-scale switch by connecting an additional LAN switch 15c with the LAN switch 15b. FIG. 4 is a schematic diagram for illustrating an increase of the number of ports by using the LAN switch 15c. As shown in FIG. 3, in this example, the LAN switch 15b and the LAN switch 15c are connected each other through the port 13n and the port 13o.

With this scheme, as shown in FIG. 4, a virtual LAN switch having four ports is implemented from the LAN switch 15b having three ports. As a result, the number of severs that can be used by the user B is increased by one, as shown in FIG. 3.

Figure 5:
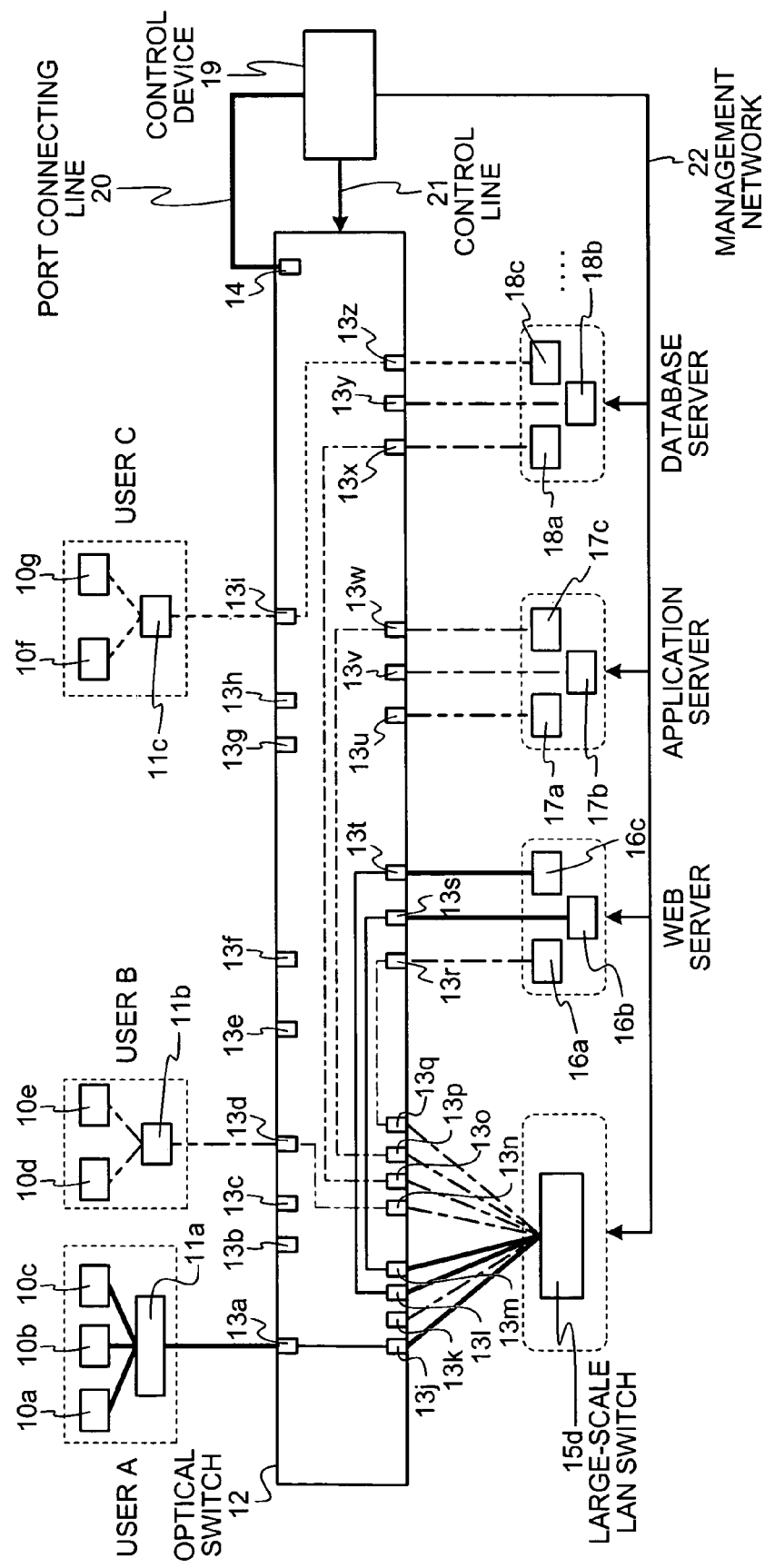
FIG. 5 is a schematic diagram for illustrating a method of increasing the number of usable servers by using a large-scale LAN switch.

In addition, it is also possible to increase the number of servers that can be connected by a user by replacing the LAN switches 15a, 15b with a large-scale LAN switch. FIG. 5 is a schematic diagram for illustrating a method of increasing the number of usable servers by using a large-scale LAN switch 15d.

Comparing the large-scale LAN switch 15d shown in FIG. 5 with the LAN switches 15a, 15b shown in FIG. 1, the number of ports of the optical switch 12 to which the large-scale LAN switch 15d is connected is eight, and the number of ports of the optical switch 12 to which the LAN switches 15a, 15b are connected is also eight.

On the other hand, comparing the number of servers that can be used by switching the wiring of the optical switch 12 and setting a subnet by the client devices 10a to 10c of the user A, the case shown in FIG. 5 indicates a maximum number of six, while the case shown in FIG. 5 indicates a maximum number of three.

Furthermore, although the large-scale LAN switch 15d is used by the user A and the user B in the example shown in FIG. 5, it is possible to change the number of servers that can be used by the client devices 10a to 10c of the user A and the number of servers that can be used by the client devices 10d, 10e of the user B without any interference between the users, by setting a virtual local area network (VLAN) at the large-scale LAN switch 15d.

The optical-switch control unit 19j of the control device 19 receives a request for switching the wiring between the ports 13a to 13z, 14 of the optical switch 12 from a user, and switches the wiring between the ports 13a to 13z, 14.

Alternatively, by storing a network configuration and date and time for switching the wiring in the storing unit 19c, the optical-switch control unit 19j switches the wiring between the ports 13a to 13z, 14 based on information on the network configuration at a designated date and time.

Figure 6:
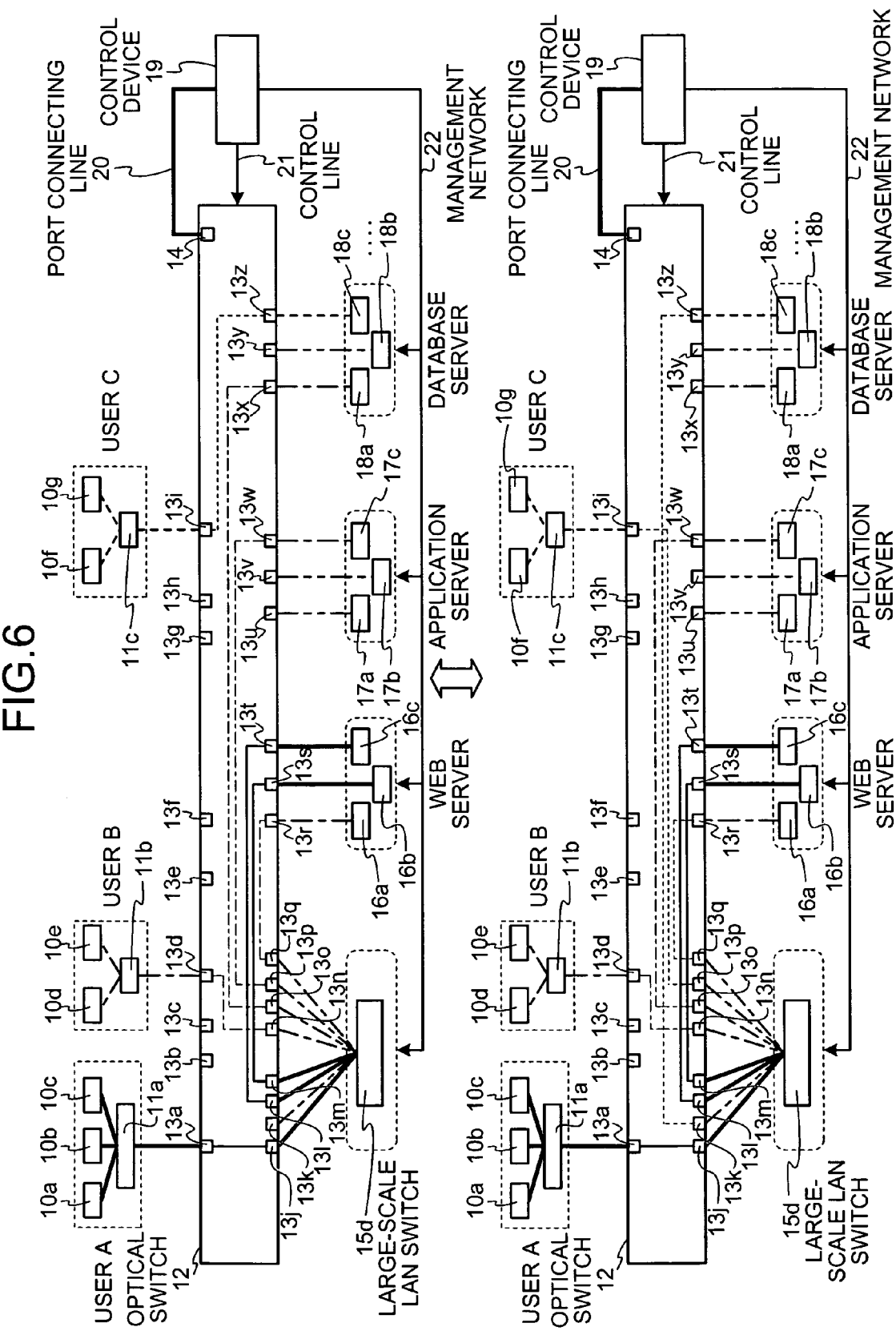
FIG. 6 is a schematic diagram for illustrating an example of switching wirings performed by an optical switch.

FIG. 6 is a schematic diagram for illustrating an example of switching the wiring performed by the optical switch 12. The connection relation between the ports 13a to 13z, 14 of the optical switch 12 is changed so that the user can use the ports 13j to 13q of the optical switch 12 to which the large-scale LAN switch 15d is connected in a time-division manner. With this scheme, it is possible to decrease the number of units of the large-scale LAN switch 15d that is required to meet the request for using the servers by the user.

Figure 7:
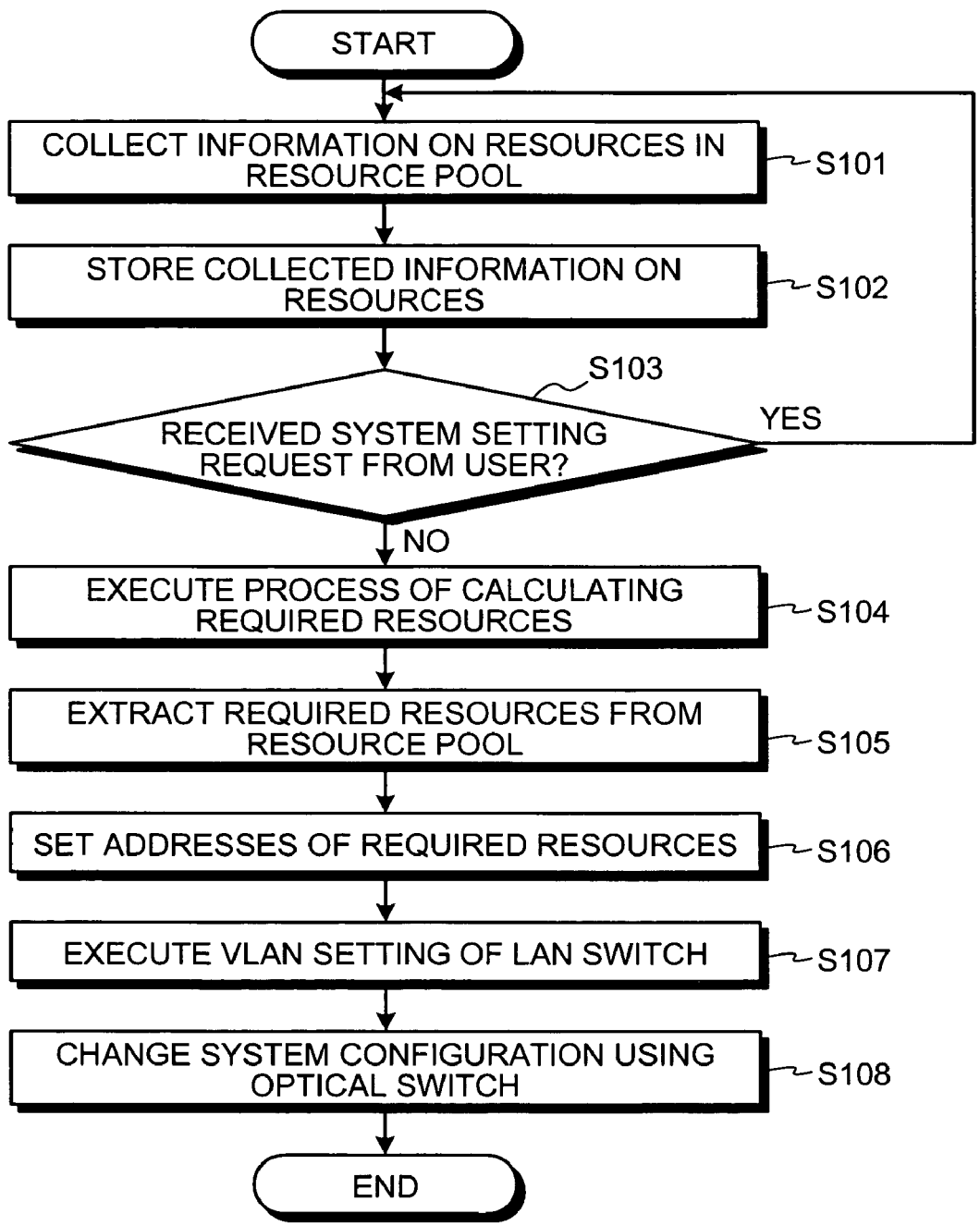
FIG. 7 is a flowchart of a processing procedure for a process of configuring a system according to the first embodiment.

FIG. 7 is a flowchart of a processing procedure for a process of configuring a system according to the first embodiment. The information collecting unit 19h of the control device 19 collects resource information of the web servers 16a to 16c, the application servers 17a to 17c, and the database servers 18a to 18c in a resource pool, via the management network 22 (Step S101), and stores the collected information in the storing unit 19c as resource information 30 (Step S102).

FIG. 8 is a schematic diagram for illustrating an example of the resource information 30 to be stored in the storing unit 19c. The resource information 30 includes ""port number of optical switch", "type of resource to be connected", and "performance of resource to be connected".

The "port number of optical switch" indicates a port number that is allocated to the ports 13a to 13z of the optical switch 12 to which a resource is connected. The "type of resource to be connected" is information on a resource that is connected to the ports 13a to 13z. The "performance of resource to be connected" is information on performance of a resource that is connected to the ports 13a to 13z, such as a variety of pieces of information including an operating system (OS) used by the resource, a central processing unit (CPU), a memory capacity, a hard disk capacity, a type of an interface, etc.

In addition to the above pieces of information, some useful information can be additionally registered for a system administrator to manage a communication system effectively, such as "address of each of the resources", "protocol to be used", "bit rate at a time of communication", "group number", "floor number", "rack number", "pool number", "protocol", etc.

Referring back to FIG. 7, after Step S102 is processed, the resource setting unit 19i of the control device 19 checks if a system setting request is received from a user (Step S103). The system setting request includes information on the ports 13a to 13z of the optical switch 12 to which the client devices 10a to 10g of the user are connected, information on a type and a performance of a resource that is required by the user, etc.

When the system setting request is not received ("NO" at Step S103), the process is moved to Step S101 to continue to collect the information on the resources. On the other hand, when the system setting request is not received at Step S103 ("YES" at Step S103), the resource setting unit 19i executes a process for determining a required resource that satisfies the type and the performance requested by the user by referring to the resource information 30 stored in the storing unit 19c (Step S104), and extracts the required resource from the resource pool (Step S105).

The resource setting unit 19i allocates a communication address to the required resource that is extracted from the resource pool, and sets the address to the required resource via the management network 22 (Step S106). Furthermore, the resource setting unit 19i performs a setting of the VLAN at the LAN switches 15a, 15b via the management network 22, so that a communication with the user from whom the system setting request is received and a communication with other user do not interfere with each other (Step S107).

The optical-switch control unit 19j changes the system configuration by transmitting a control signal to the optical switch 12 via the control line 21, so that the ports 13a to 13z to which the client devices 10a to 10g of the user from whom the system setting request is received are connected with the ports 13a to 13z to which the required resource that is extracted from the resource pool, via the LAN switches 15a, 15b (Step S108), and ends the process of configuring the system.

The control device 19 changes the system configuration based on the system setting request received from the user in the above example, however, the system configuration can be dynamically changed based on a condition of loads of resources in the resource pool.

Figure 9:
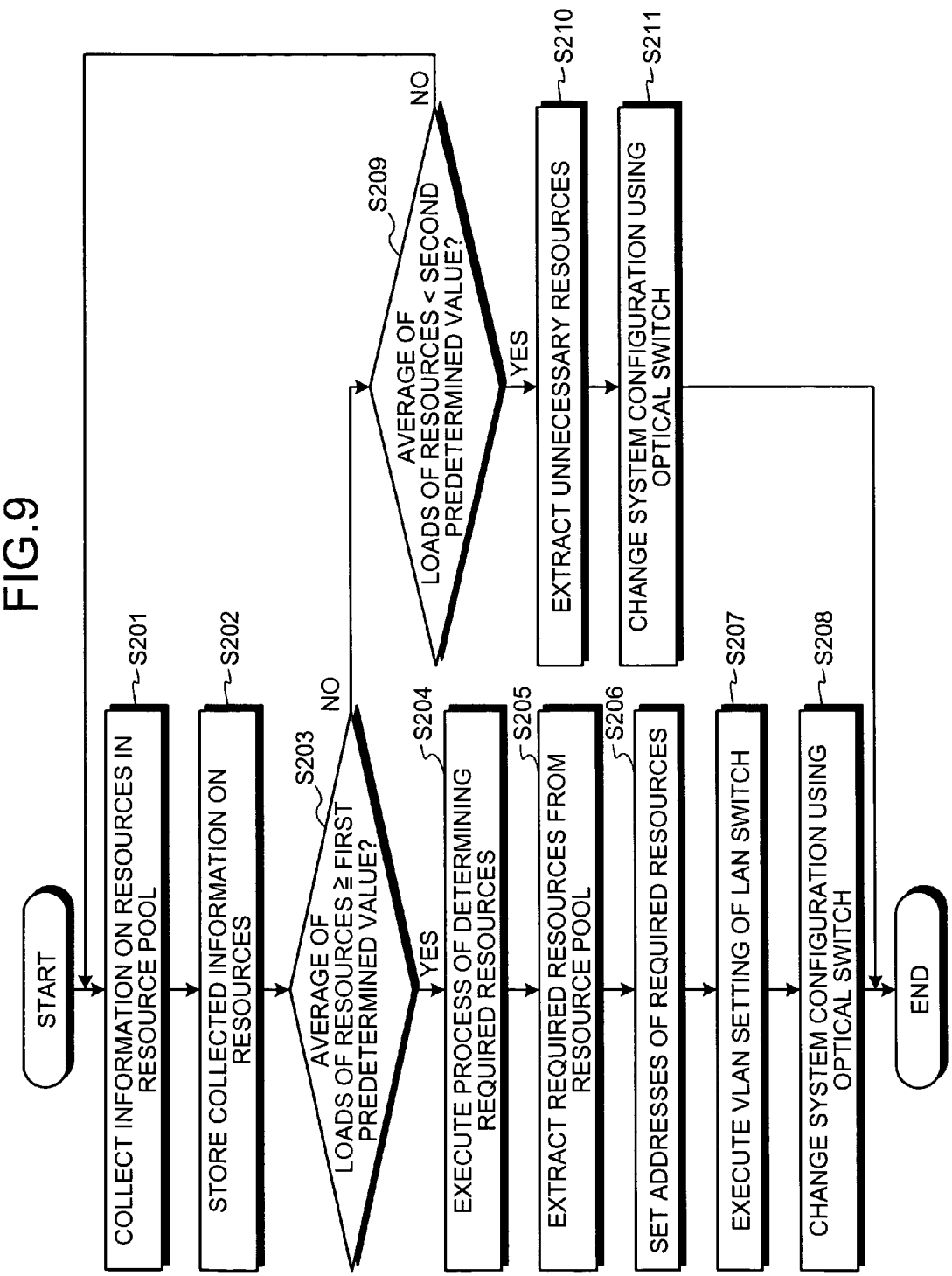
FIG. 9 is a flowchart of a processing procedure for a process of configuring a system that dynamically changes a system configuration based on a condition of loads of resources.

FIG. 9 is a flowchart of a processing procedure for a process of configuring the system that dynamically changes the system configuration based on the condition of loads of resources. The information collecting unit 19h of the control device 19 collects the resource information of the web servers 16a to 16c, the application servers 17a to 17c, and the database servers 18a to 18c in the resource pool, via the management network 22 (Step S201), and stores the collected information in the storing unit 19c as the resource information 30 (Step S202).

The resource setting unit 19i of the control device 19 collects information on a load of the CPU (for example, a usage rate of the CPU) from each of the resources in the resource pool, and checks if an average of the loads of each of the resources used by the client devices 10 to 10g of a specific user is equal to or more than a first predetermined value (Step S203). Alternatively, the information on the load of the CPU can be obtained from a load balancer that distributes the load of each of the resources.

When the average of the loads of each of the resources is equal to or more than the first predetermined value ("YES" at Step S203), the resource setting unit 19i executes a process for determining a resource to be newly added, to make the average become less than the first predetermined value, by referring to the resource information 30 stored in the storing unit 19c (Step S204), and extracts the required resource from the resource pool (Step S205).

The resource setting unit 19i allocates a communication address to the required resource that is extracted from the resource pool, and sets the address to the required resource via the management network 22 (Step S206). Furthermore, the resource setting unit 19i performs a setting of the VLAN at the LAN switches 15a, 15b via the management network 22, so that a communication with the user from whom the system setting request is received and a communication with other user do not interfere with each other (Step S207)

The optical-switch control unit 19j changes the system configuration by transmitting a control signal to the optical switch 12 via the control line 21, so that the ports 13a to 13z to which the client devices 10a to 10g of the user from whom the system setting request is received are connected with the ports 13a to 13z to which the required resource that is extracted from the resource pool, via the LAN switches 15a, 15b (Step S208), and ends the process of configuring the system.

When the average of the loads of each of the resources is less than the first predetermined value ("NO" at Step S203), the resource setting unit 19i checks if the average of the loads of each of the resources used by the client devices 10 to 10g of the user is less than a second predetermined value (Step S209). In this case, the second predetermined value is set to be smaller than the first predetermined value.

When the average of the loads of each of the resources is not less than the second predetermined value ("NO" at Step S209), the process is moved to Step S201 to continue to the subsequent processes. On the other hand, when the average of the loads of each of the resources is less than the second predetermined value at Step S209 ("YES" at Step S209), the resource setting unit 19i extracts an unnecessary resource, so that the average becomes equal to or more than the second predetermined value (Step S210).

In this case, the extraction of the unnecessary resource is performed based on information on a priority of a resource to be removed that is received from the user in advance and stored in the storing unit 19c.

The optical-switch control unit 19j changes the system configuration by transmitting a control signal to the optical switch 12 via the control line 21, so that the ports 13a to 13z to which the extracted unnecessary resource is connected is disconnected from the ports 13a to 13z to which the client devices 10a to 10g of the user are connected (Step S211), and ends the process of configuring the system.

Although the control device 19 sets the address to the required resource via the management network 22 at Step S106 shown in FIG. 7 and at Step S206 shown in FIG. 9, the address of the required resource can also be set by performing a communication with an address of the control device 19 set to the same address as a subnet address of the required resource.

Alternatively, it is possible to make the control device 19 function as a dynamic host configuration protocol (DHCP) server, so that the control device 19 sets the address to the required resource. In other words, the resource setting unit 19i of the control device 19 determines a range of the address to be distributed to the required resource that is extracted, and sets the address to the required resource by transmitting an address within the determined range to the required resource.

In addition, although the control device 19 collects the information on the resources via the management network 22 at Step S101 shown in FIG. 7 and at Step S201 shown in FIG. 9, it is also possible to collect the information on the resources by using a physical wiring switch.

Figure 10:
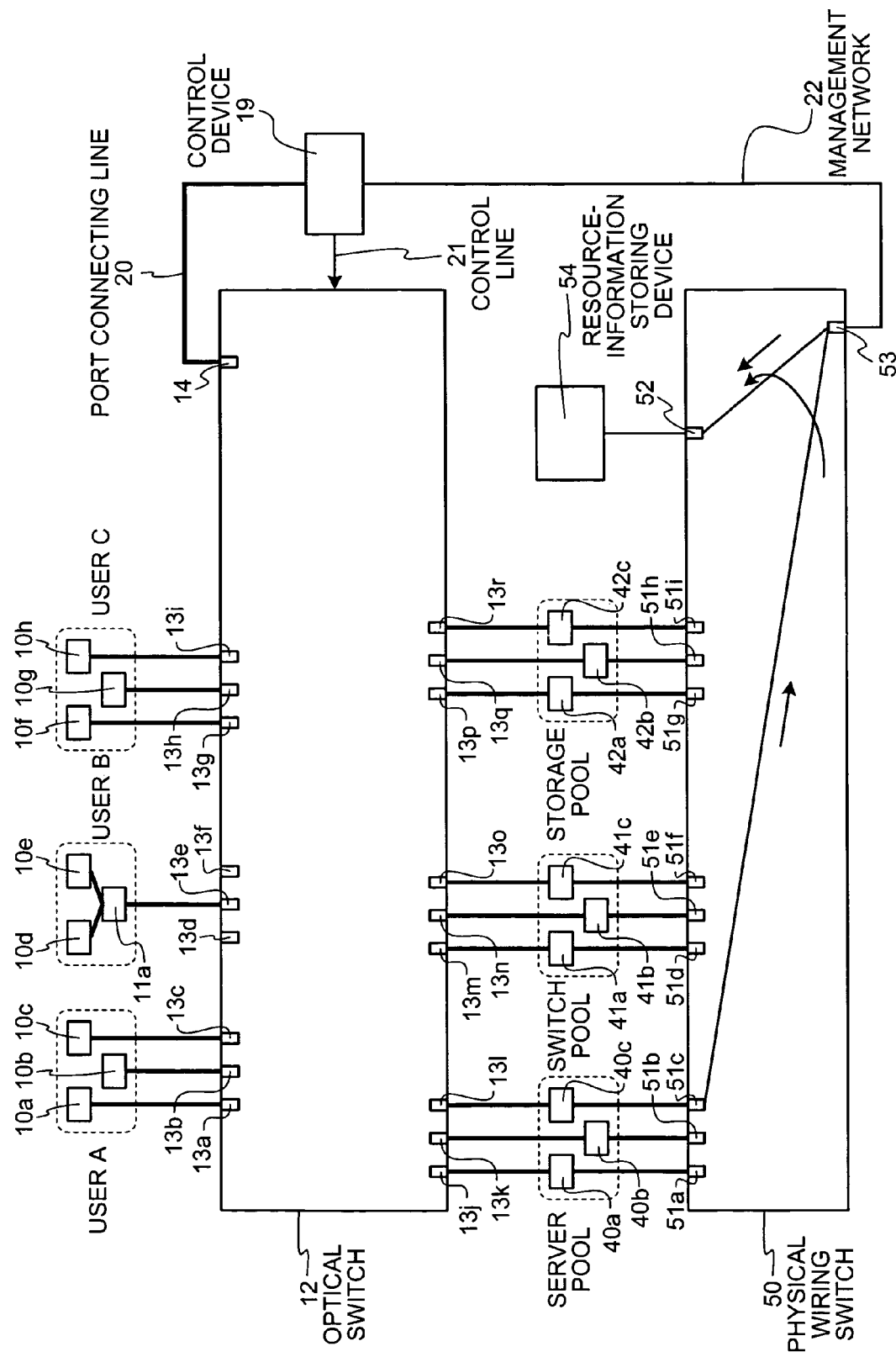
FIG. 10 is a schematic diagram for illustrating a method of collecting resource information by using a physical wiring switch.

FIG. 10 is a schematic diagram for illustrating a method of collecting resource information by using a physical wiring switch 50. In the example shown in FIG. 10, client devices 10a to 10h of a user A, a user B, and a user C, and the LAN switch 11a are connected to the ports 13a to 13c, 13e, 13g to 13i of the optical switch 12. Furthermore, server devices 40a to 40c, LAN switches 41a to 41c, and storage devices 42a to 42c are connected to the ports 13j to 13r of the optical switch 12 to form a server pool, a switch pool, and a storage pool, respectively.

Furthermore, the communication system shown in FIG. 10 includes the physical wiring switch 50 and a resource-information storing device 54. The server devices 40a to 40c, the LAN switches 41a to 41c, and the storage devices 42a to 42c are connected to ports 51a to 51i of the physical wiring switch 50, the resource-information storing device 54 is connected to a port 52, and the management network 22 is connected to a port 53.

The physical wiring switch 50 is an electric switch or an optical switch that connects devices connected to each of the ports 51a to 51i, 52, 53 by internally connecting the ports 51a to 51i, 52, 53 in one-to-one manner.

The physical wiring switch 50 connects each of the ports 51a to 51i, to which the server devices 40a to 40c, the LAN switches 41a to 41c, and the storage devices 42a to 42c are connected, with the port 53 to which the management network 22 is connected, to make the control device 19 collect the resource information.

Furthermore, the physical wiring switch 50 connects the port 52 with the port 53 of the physical wiring switch 50, so that the control device 19 can transmit the resource information to the resource-information storing device 54 to store the resource information.

The resource-information storing device 54 receives the resource information of the server devices 40a to 40c, the LAN switches 41a to 41c, and the storage devices 42a to 42c, stores the received resource information, and transmits the stored resource information to the control device 19 in response to a request from the control device 19.

Figure 11:
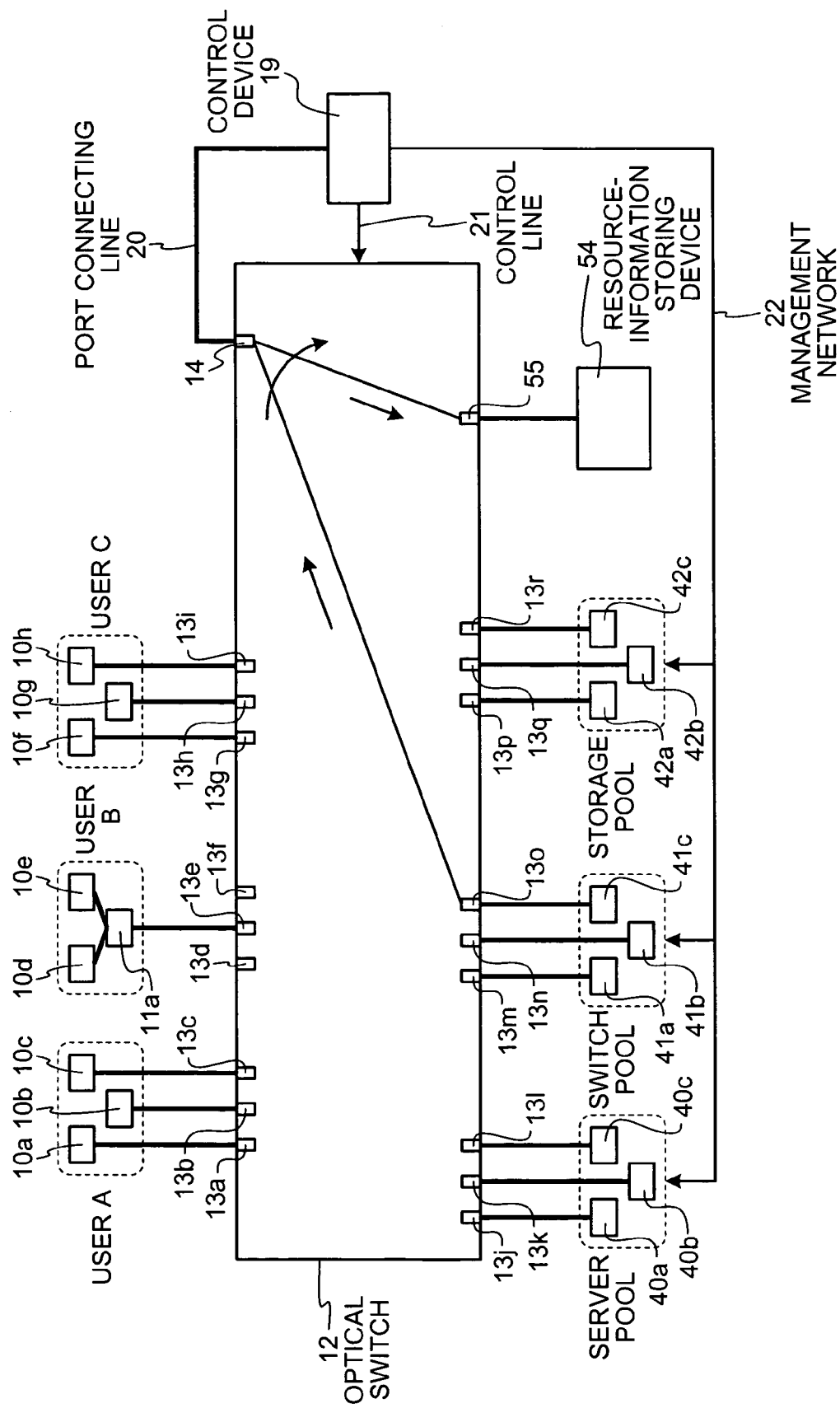
FIG. 11 is a schematic diagram for illustrating a process of collecting resource information by changing physical wirings of the optical switch.

The process of collecting the resource information can also be executed by changing physical wirings of the optical switch 12. FIG. 11 is a schematic diagram for illustrating the process of collecting resource information by changing the physical wirings of the optical switch 12.

In the example shown in FIG. 11, the control device 19 connects each of the ports 13j to 13r, to which the server devices 40a to 40c, the LAN switches 41a to 41c, and the storage devices 42a to 42c are connected, with a port 14 to which the port connection line 20 is connected, by controlling the optical switch 12 with a transmission of a control signal through the control line 21, and collects the resource information from the server devices 40a to 40c, the LAN switches 41a to 41c, and the storage devices 42a to 42c.

In addition, the control device 19 connects a port 55, to which the resource-information storing device 54 is connected, with the port 14 to which the port connection line 20 is connected, by controlling the optical switch 12 with a transmission of a control signal through the control line 21, and transmits the resource information to the resource-information storing device 54.

The resource-information storing device 54 receives the resource information of the server devices 40a to 40c, the LAN switches 41a to 41c, and the storage devices 42a to 42c, stores the received resource information, and transmits the stored resource information to the control device 19 in response to a request from the control device 19.

Although the control device 19 sets the address of the resource via the management network 22 at Step S101 shown in FIG. 7 and at Step S201 shown in FIG. 9, the address of the resource can also be set by using a physical wiring switch.

Figure 12:
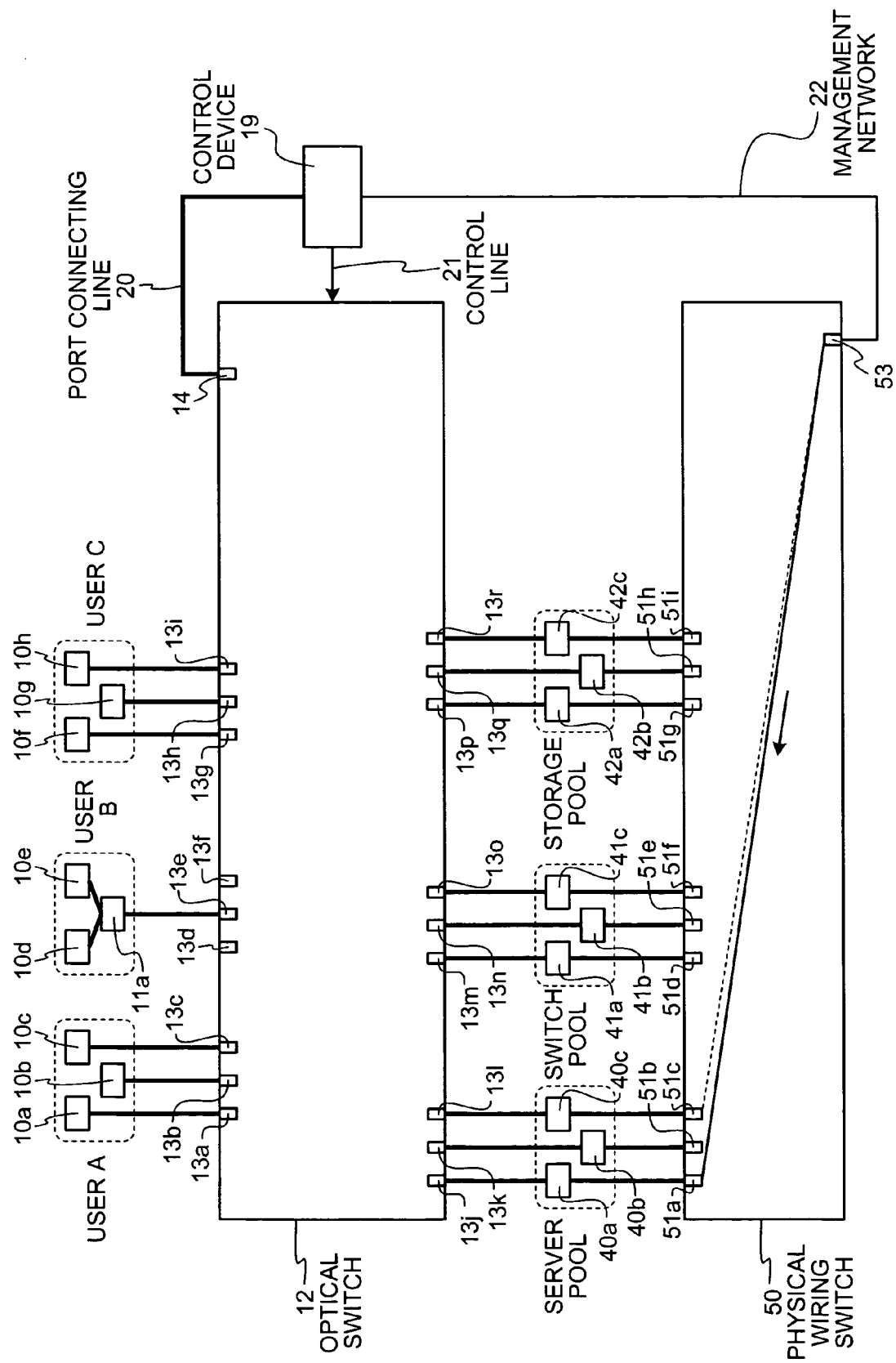
FIG. 12 is a schematic diagram for illustrating a method of setting an address by using the physical wiring switch.

FIG. 12 is a schematic diagram for illustrating a method of setting an address by using the physical wiring switch 50. In the example shown in FIG. 12, the physical wiring switch 50 connects each of the ports 51a to 51i, to which the server devices 40a to 40c, the LAN switches 41a to 41c, and the storage devices 42a to 42c are connected, with a port 53 to which the management network 22 is connected, so that the control device 19 can set the address of the resource.

After a connection between the ports 51a to 51i and the port 53 is established, the control device 19 transmits address information to the server devices 40a to 40c, the LAN switches 41a to 41c, and the storage devices 42a to 42c, and sets the address to the server devices 40*a* to 40*c*, the LAN switches 41*a* to 41*c*, and the storage devices 42*a* to 42*c*.

Figure 13:
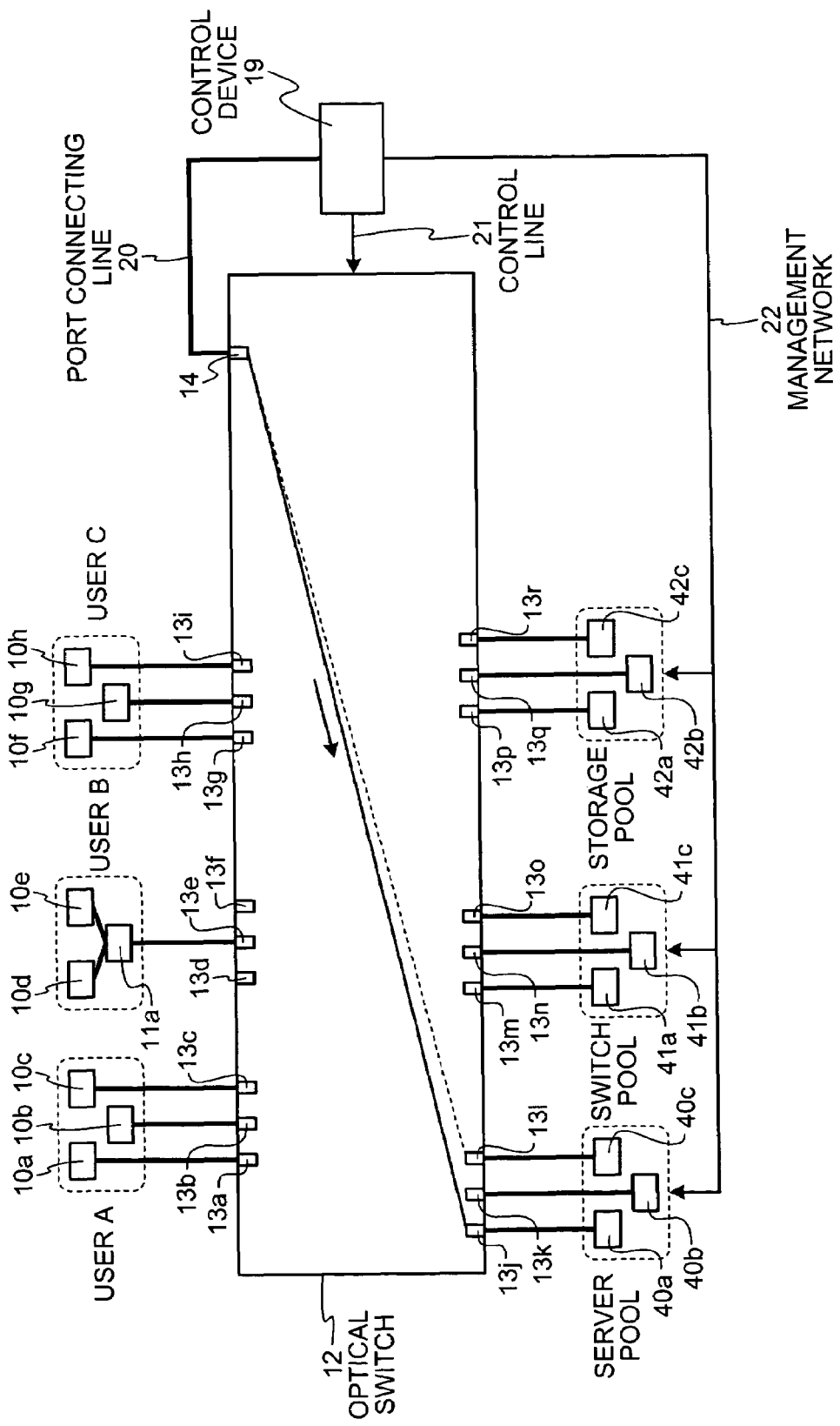
FIG. 13 is a schematic diagram for illustrating a process of setting an address by changing physical wirings of the optical switch.

In addition, the process of setting an address can be executed by changing physical wirings of the optical switch 12. FIG. 13 is a schematic diagram for illustrating a process of setting an address by changing the physical wirings of the optical switch 12.

In the example shown in FIG. 13, the control device 19 controls the optical switch 12 by transmitting a control signal via the control line 21, and connects each of the ports 13*j* to 13*r*, to which the server devices 40*a* to 40*c*, the LAN switches 41*a* to 41*c*, and the storage devices 42*a* to 42*c* are connected, with the port 14 to which the port connection line 20 is connected, to set the address to the server devices 40*a* to 40*c*, the LAN switches 41*a* to 41*c*, and the storage devices 42*a* to 42*c*.

The examples explained so far is for a case in which a communication interface of a user system configured with the client devices 10*a* to 10*h* and the LAN switch 11*a* is the same as a communication interface of the server devices 40*a* to 40*c*, the LAN switches 41*a* to 41*c*, and the storage devices 42*a* to 42*c*. However, even when the communication interfaces are different from each other, a communication can be performed by using a communication-interface converting device.

Figure 14:
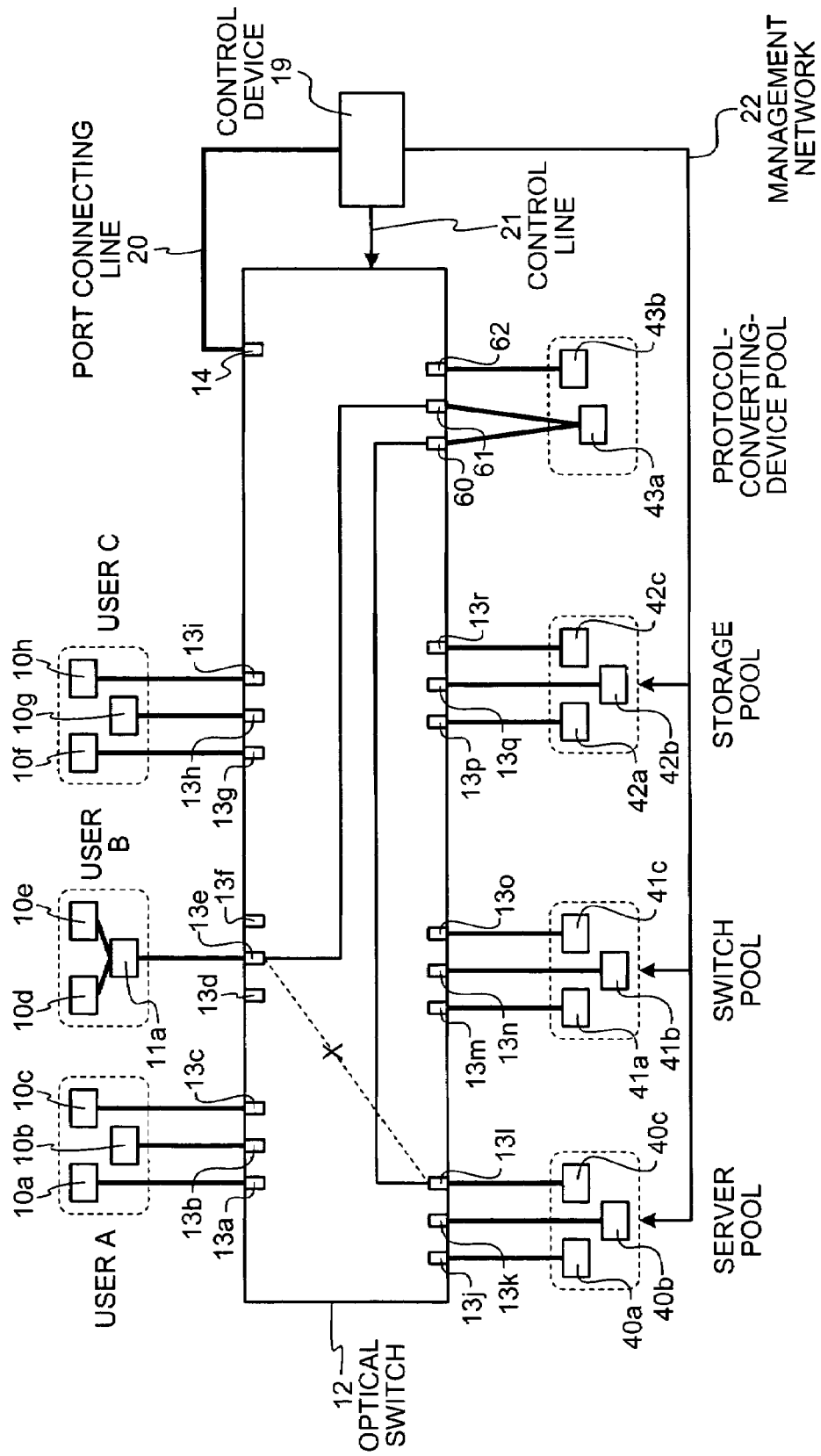
FIG. 14 is a schematic diagram for illustrating a communication system that performs a protocol conversion.

FIG. 14 is a schematic diagram for illustrating a communication system that performs a protocol conversion. In the example shown in FIG. 14, the client devices 10*a* to 10*h* of the users and the LAN switch 11*a* are connected to the ports 13*a* to 13*c*, 13*e*, 13*g* to 13*i* of the optical switch 12. Furthermore, the server devices 40*a* to 40*c*, the LAN switches 41*a* to 41*c*, the storage devices 42*a* to 42*c*, and protocol converting devices 43*a*, 43*b* are connected to ports 13*j* to 13*r*, 60 to 62 of the optical switch 12, to configure a server pool, a switch pool, a storage pool, and a protocol-converting-device pool, respectively.

It is assumed that a protocol used in the client devices 10*a* to 10*h* and the LAN switch 11*a* is different from a protocol used in the server devices 40*a* to 40*c*, the LAN switches 41*a* to 41*c*, and the storage devices 42*a* to 42*c*.

In such a case, the information collecting unit 19*h* of the control device 19 collects information on a protocol used by the devices from the server devices 40*a* to 40*c*, the LAN switches 41*a* to 41*c*, and the storage devices 42*a* to 42*c*, and stores the collected information on the protocol.

When a system setting request including information on a protocol used by a user system is received from a user, the resource setting unit 19*i* of the control device 19 extracts a required resource from the resource pool, following the method explained in FIG. 7, and determines whether the protocol used by the user system is the same as a protocol used by the required resource.

When both of the protocols are the same, the optical-switch control unit 19*j* of the control device 19 changes the system configuration to meet the request from the user, by transmitting a control signal to the optical switch 12. On the other hand, when both of the protocols are not the same, the optical-switch control unit 19*j* connects the user system with the required resource via the protocol converting device 43*a*, instead of connecting them directly, by controlling the optical switch 12.

When data is received from the user system, the protocol converting device 43*a* converts a protocol of the data into a protocol used by a resource at a transmission destination, and transmits the protocol-converted data to the resource at the transmission destination.

Likewise, when data is received from a resource at the resource pool, the protocol converting device 43*a* converts a protocol of the data into a protocol used by a user system at a transmission destination, and transmits the protocol-converted data to the user system at the transmission destination.

Therefore, because the optical switch 12 can perform a switching of the connection between the ports 13*a* to 13*r*, 60 to 62 regardless of the protocol, it is possible to build a network system with flexibility.

Figure 15:
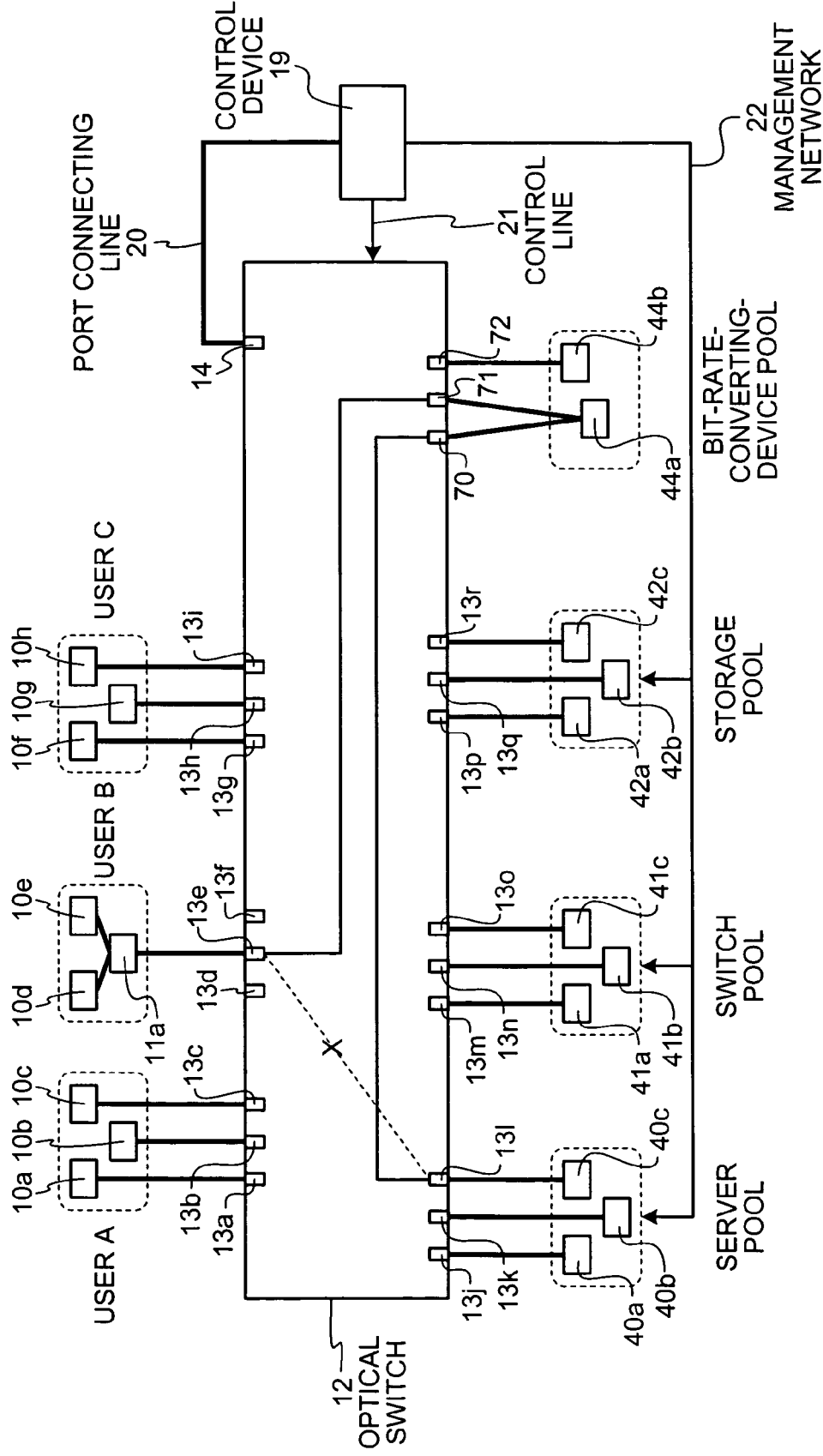
FIG. 15 is a schematic diagram for illustrating a communication system that performs a bit-rate conversion.

FIG. 15 is a schematic diagram for illustrating a communication system that performs a bit-rate conversion. In the example shown in FIG. 15, the client devices 10*a* to 10*h* of the users and the LAN switch 11*a* are connected to the ports 13*a* to 13*c*, 13*e*, 13*g* to 13*i* of the optical switch 12. Furthermore, the server devices 40*a* to 40*c*, the LAN switches 41*a* to 41*c*, the storage devices 42*a* to 42*c*, and bit-rate converting devices 44*a*, 44*b* are connected to ports 13*j* to 13*r*, 70 to 72 of the optical switch 12, to configure a server pool, a switch pool, a storage pool, and a bit-rate-converting-device pool, respectively.

It is assumed that a bit rate used in the client devices 10*a* to 10*h* and the LAN switch 11*a* is different from a bit rate used in the server devices 40*a* to 40*c*, the LAN switches 41*a* to 41*c*, and the storage devices 42*a* to 42*c*, at a time of communication.

In such a case, the information collecting unit 19*h* of the control device 19 collects information on a bit rate at a time of communication by the devices from the server devices 40*a* to 40*c*, the LAN switches 41*a* to 41*c*, and the storage devices 42*a* to 42*c*, and stores the collected information on the bit rate.

When a system setting request including information on a bit rate at a time of communication by a user system is received from a user, the resource setting unit 19*i* of the control device 19 extracts a required resource from the resource pool, following the method explained in FIG. 7, and determines whether the bit rate used by the user system is the same as a bit rate used by the required resource.

When both of the bit rates are the same, the optical-switch control unit 19*j* of the control device 19 changes the system configuration to meet the request from the user, by transmitting a control signal to the optical switch 12. On the other hand, when both of the bit rates are not the same, the optical-switch control unit 19*j* connects the user system with the required resource via the bit-rate converting device 44*a*, instead of connecting them directly, by controlling the optical switch 12.

The bit-rate converting device 44*a* has a flow control function, and resolves the difference in the bit rate by adjusting an amount of communication between the connected user system and the required resource. Because the optical switch 12 can perform a switching of the connection between the ports 13*a* to 13*r*, 70 to 72 regardless of the bit rate, it is possible to build a network system with flexibility.

Although the protocol conversion and the bit-rate conversion are performed in the above explanations, the two processes can be combined by connecting the protocol converting device 43*a* and the bit-rate converting device 44*a* in a cascaded manner. In addition, the number of the protocol converting device 43*a* and the bit-rate converting device 44*a* to be used is optional, so that plural number of the protocol converting device 43*a* and the bit-rate converting device 44*a* can be used if necessary.

As described above, according to the first embodiment, the control device 19 controls the optical switch 12 including a first connection interface to which the LAN switches 15*a*, 15*b*, 41*a* to 41*c* including a second connection interface, and resources, which are formed with at least one of the server devices 16*a* to 16*c*, 17*a* to 17*c*, 18*a* to 18*c*, 40*a* to 40*c* and the storage devices 42*a* to 42*c*, including a third connection interface are connected via the above connection interfaces, and performs a switching of the connection between the connection interfaces. In this manner, the control device 19 connects the LAN switches 15a, 15b, 41a to 41c with at least one of the server devices 16a to 16c, 17a to 17c, 18a to 18c, 40a to 40c and the storage devices 42a to 42c, to configure a network, and as a result, it is possible to effectively enhance a flexibility in establishing a network system.

Furthermore, according to the first embodiment, at least one of the protocol converting devices 43a, 43b and the bit-rate converting devices 44a, 44b, which include a fourth connection interface and performs a communication interface conversion, are further provided in the communication system. The control device 19 performs a connection between the connection interfaces to connect the LAN switches 15a, 15b, 41a to 41c, at least one of the server devices 16a to 16c, 17a to 17c, 18a to 18c, 40a to 40c and the storage devices 42a to 42c, and at least one of the protocol converting devices 43a, 43b and the bit-rate converting devices 44a, 44b, by controlling the optical switch 12, to configure a network, and it is possible to establish a network system with a capability of performing a communication between devices having different communication interfaces.

Moreover, according to the first embodiment, the control device 19 performs a VLAN setting to the LAN switches 15a, 15b, 41a to 41c, at a time of controlling a switching of the connection between the connection interfaces. Therefore, a plurality of users can use the LAN switches 15a, 15b, 41a to 41c, and as a result, it is possible to effectively enhance a flexibility in establishing a network system according to a request from each user.

Furthermore, according to the first embodiment, the control device 19 performs a switching of the connection between the connection interfaces according to a time. Therefore, each the users can use each of the devices in a time-division manner, and as a result, it is possible to reduce the number of required devices.

Moreover, according to the first embodiment, the control device 19 extracts the LAN switches 15a, 15b, 41a to 41c, at least one of the server devices 16a to 16c, 17a to 17c, 18a to 18c, 40a to 40c and storage devices 42a to 42c, which satisfy a predetermined condition, from among the LAN switches 15a, 15b, 41a to 41c, at least one of the server devices 16a to 16c, 17a to 17c, 18a to 18c, 40a to 40c and the storage devices 42a to 42c connected to the optical switch 12, at a time of performing a switching of the connection between the connection interfaces, and performs the switching of the connection between the connection interfaces based on information on the extracted LAN switches 15a, 15b, 41a to 41c, at least one of the server devices 16a to 16c, 17a to 17c, 18a to 18c, 40a to 40c and the storage devices 42a to 42c. Therefore, it is possible to establish a network system including devices that satisfy the predetermined condition in an automatic manner.

Furthermore, according to the first embodiment, the control device 19 collects characteristic information relating to the LAN switches 15a, 15b, 41a to 41c, at least one of the server devices 16a to 16c, 17a to 17c, 18a to 18c, 40a to 40c and the storage devices 42a to 42c connected to the optical switch 12, and extracts the LAN switches 15a, 15b, 41a to 41c, at least one of the server devices 16a to 16c, 17a to 17c, 18a to 18c, 40a to 40c and the storage devices 42a to 42c, which satisfy the predetermined condition, based on the collected characteristic information. Therefore, it is possible to perform an extraction of the devices satisfying the predetermined condition with efficiency.

Moreover, according to the first embodiment, the control device 19 registers the characteristic information relating to the LAN switches 15a, 15b, 41a to 41c, at least one of the server devices 16a to 16c, 17a to 17c, 18a to 18c, 40a to 40c and the storage devices 42a to 42c connected to the optical switch 12 as the resource information 30, and extracts the LAN switches 15a, 15b, 41a to 41c, at least one of the server devices 16a to 16c, 17a to 17c, 18a to 18c, 40a to 40c and the storage devices 42a to 42c, which satisfy the predetermined condition, based on the resource information 30 that is registered. Therefore, it is possible to perform an extraction of the devices satisfying the predetermined condition with efficiency.

Figure 16:
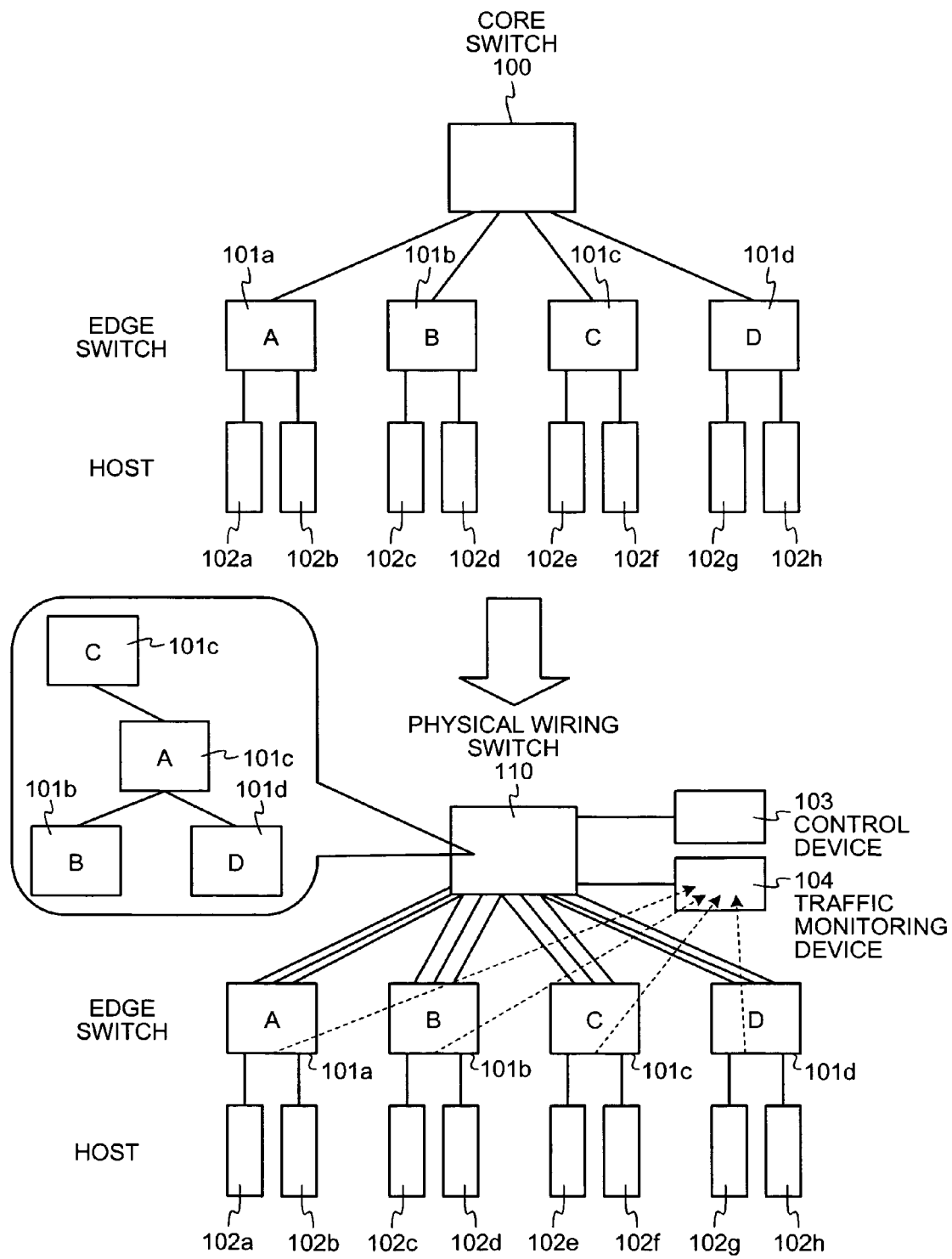
FIG. 16 is a schematic diagram for illustrating a comparison between a network system according to a conventional technology and a network system according to a second embodiment of the present invention.

FIG. 16 is a schematic diagram for illustrating a comparison between a network system according to a conventional technology and a network system according to a second embodiment of the present invention. In the network system according to the conventional technology, a core switch 100 and edge switches 101a to 101d (in some cases, middle switches) are connected in a star topology.

The core switch 100 is a full-mesh connectable switch that detects a destination of a packet transmitted by hosts 102a to 102h, and transfers the packet by switching paths in a high speed based on the destination. The hosts 102a to 102h represent server devices or storage devices, such as a web server, an application server, and a database server.

The core switch 100 having a full-mesh connectable configuration is relatively expensive, and if a network interface becomes speeding up in the future, the core switch 100 that should have a large-scale full-mesh connection capability becomes more expensive. Furthermore, from a technical point of view, with an increase in speed of data transmission, the number of full-mesh connectable ports may be limited due to a distortion or a loss of a signal or an interference between signals in the core switch 100.

On the other hand, in an intranet system to which the configuration shown in FIG. 16 is applied, a communication between information-technology (IT) devices, such as the edge switches 101a to 101d connected to the core switch 100, is mainly a communication between the IT devices belonging to the same section. Therefore, it is considered that a rate of a full-mesh communication of the whole lines at an almost same timing is quite low. For this reason, if the core switch 100 having a full-mesh connectable configuration is applied to the network system in the conventional way, the performance becomes excessive with respect to the demand, and the system may become expensive more than necessary.

In the network system according to the second embodiment, the core switch 100 in a conventional network system is replaced by a physical wiring switch 110 that is less expensive. The physical wiring switch 110 is an electric switch or an optical switch that connects between IT devices by internally connecting connection interfaces of different IT devices in one-to-one manner.

An internal connection configuration of the physical wiring switch 110 can be optionally changed, so that it is possible to change a topology of the network system. The physical wiring switch 110 cannot perform a switching of connection based on destination information in a packet, and in that sense, is differentiated from the core switch 100 that can switch connection in a high speed based on the destination information in the packet.

The edge switches 101a to 101d are connected to make a tree topology by a wiring switch process performed by the physical wiring switch 110. The tree topology is established in such a manner that the edge switches 101a to 101d of which a mutual traffic amount is large are arranged close to each other.

To establish the tree topology, a plurality of connection interfaces are provided to connect the physical wiring switch 110 and the edge switches 101a to 101d. A traffic monitoring device 104 receives a mirror packet from the edge switches 101a to 101d, and analyzes traffic amounts of all pairs of the edge switches 101a to 101d.

A control device 103 calculates an optimum topology of the edge switches 101a to 101d based on the analyzed traffic amount. A method of calculating the topology will be explained in detail below.

Figure 17:
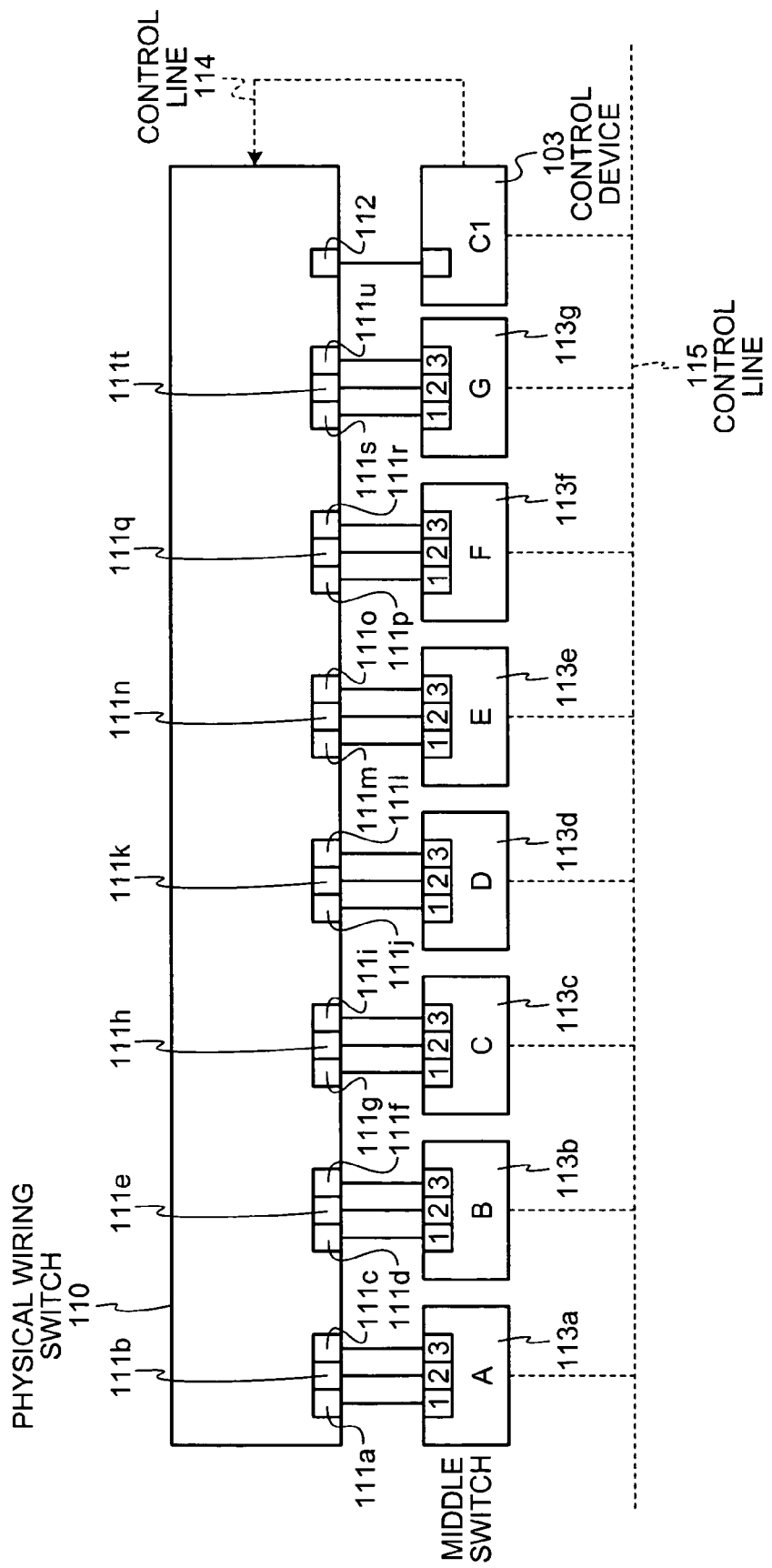
FIG. 17 is a schematic diagram for illustrating a functional configuration of a communication system according to the second embodiment.

FIG. 17 is a schematic diagram for illustrating a functional configuration of a communication system according to the second embodiment. The communication system according to the second embodiment includes the physical wiring switch 110, middle switches 113a to 113g, and the control device 103. Although the following explanation is for a case in which the middle switches 113a to 113g are connected to the physical wiring switch 110, the edge switches can be used instead, as shown in FIG. 16. In addition, the server devices or the storage devices such as the web server, the application server, and the database server are connected to each of the middle switches 113a to 113g via the connection interfaces through the edge switches and the like.

Each of ports 111a to 111u, 112 of the physical wiring switch 110 and each of the middle switches 113a to 113g are connected by three connection interfaces, and the control device 103 controls an internal connection of the physical wiring switch 110 and a setting of the middle switches 113a to 113g via a control line 114 and a control line 115, respectively, to change the topology of the network.

In other words, the control device 103 can establish networks of a variety of topologies by controlling the physical wiring switch 110 to internally connect the connection interfaces of different middle switches 113a to 113g in one-to-one manner and by controlling the middle switches 113a to 113g to change the setting.

The control device 103 changes the topology based on a traffic matrix representing an amount of communication between the middle switches 113a to 113g. For instance, by directly connecting the middle switches 113a to 113g having large traffic amounts with each other, a load to other of the middle switches 113a to 113g is reduced. The traffic matrix will be explained in detail later.

In addition, although the physical wiring switch 110 and each of the middle switches 113a to 113g are connected with three connection interfaces in the example shown in FIG. 17, the number of connection interfaces can be an optional value according to characteristics of the network system.

Figure 18:
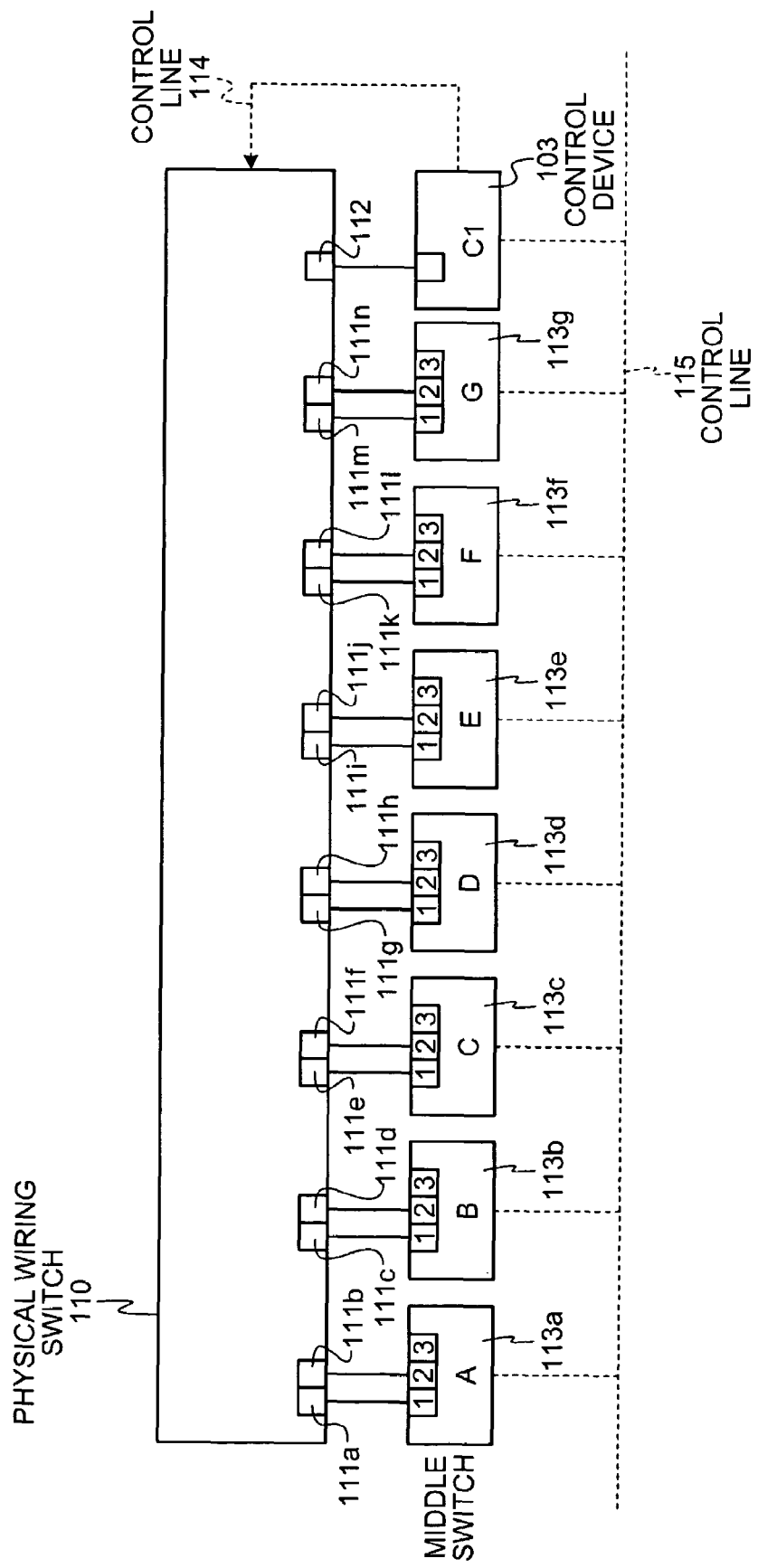
FIG. 18 is a schematic diagram for illustrating a functional configuration of the communication system according to the second embodiment when the number of connection interfaces is two.

FIG. 18 is a schematic diagram for illustrating a functional configuration of the communication system according to the second embodiment when the number of connection interfaces is two. The whole network system can be configured as a bus-type network by connecting the physical wiring switch 110 and each of the middle switches 113a to 113g with two connection interfaces. In this manner, by reducing the number of connection interfaces from three to two, it is possible to establish a network with a lower cost.

Figure 19:
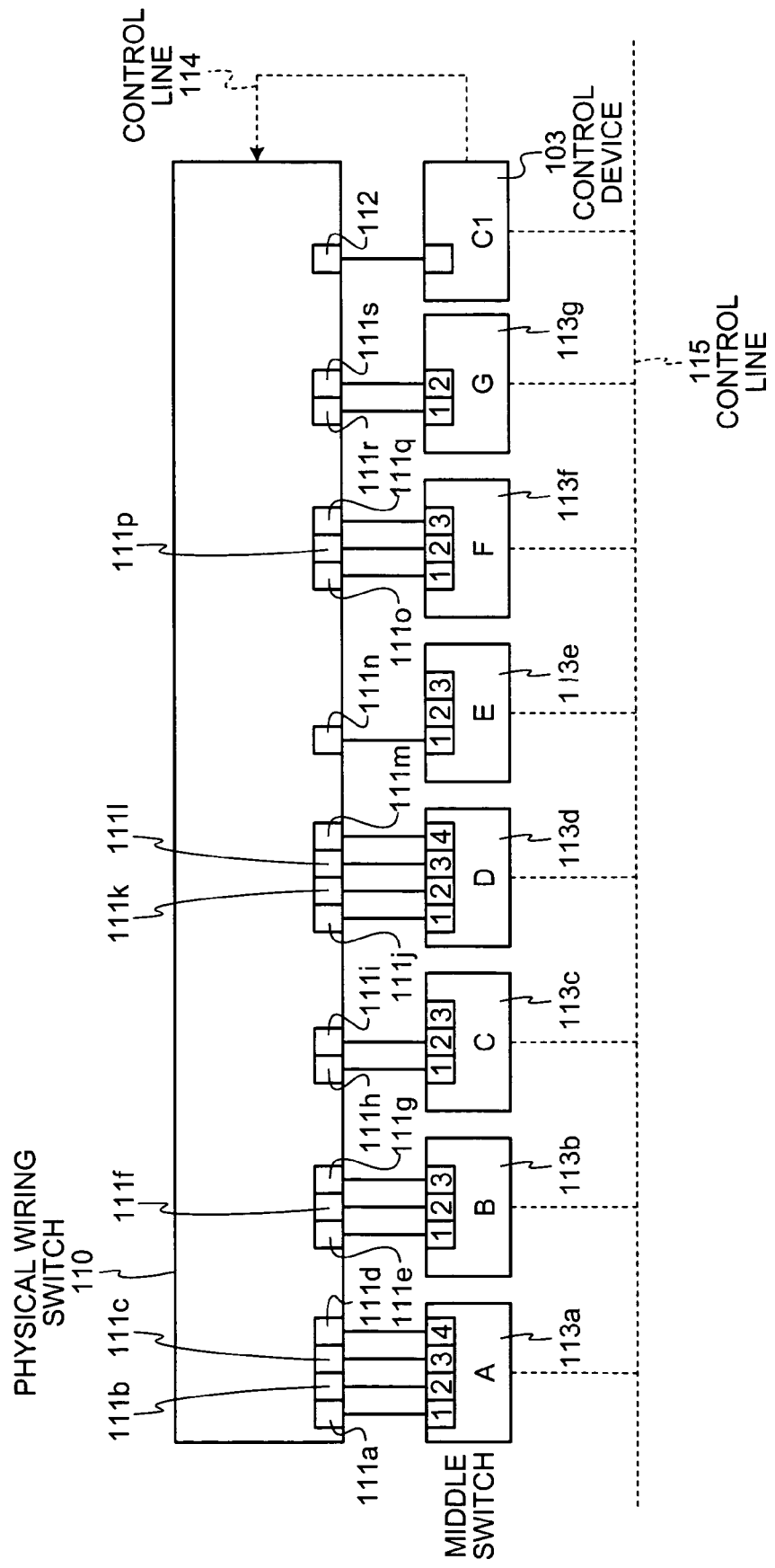
FIG. 19 is a schematic diagram for illustrating a functional configuration of the communication system according to the second embodiment when the number of connection interfaces is different for each middle switch.

FIG. 19 is a schematic diagram for illustrating a functional configuration of the communication system according to the second embodiment when the number of connection interfaces is different for each of the middle switches 113a to 113g. In this manner, the number of connection interfaces of each of the middle switches 113a to 113g can be optionally changed according to the characteristics of the communication system and availability of devices.

Figure 20:
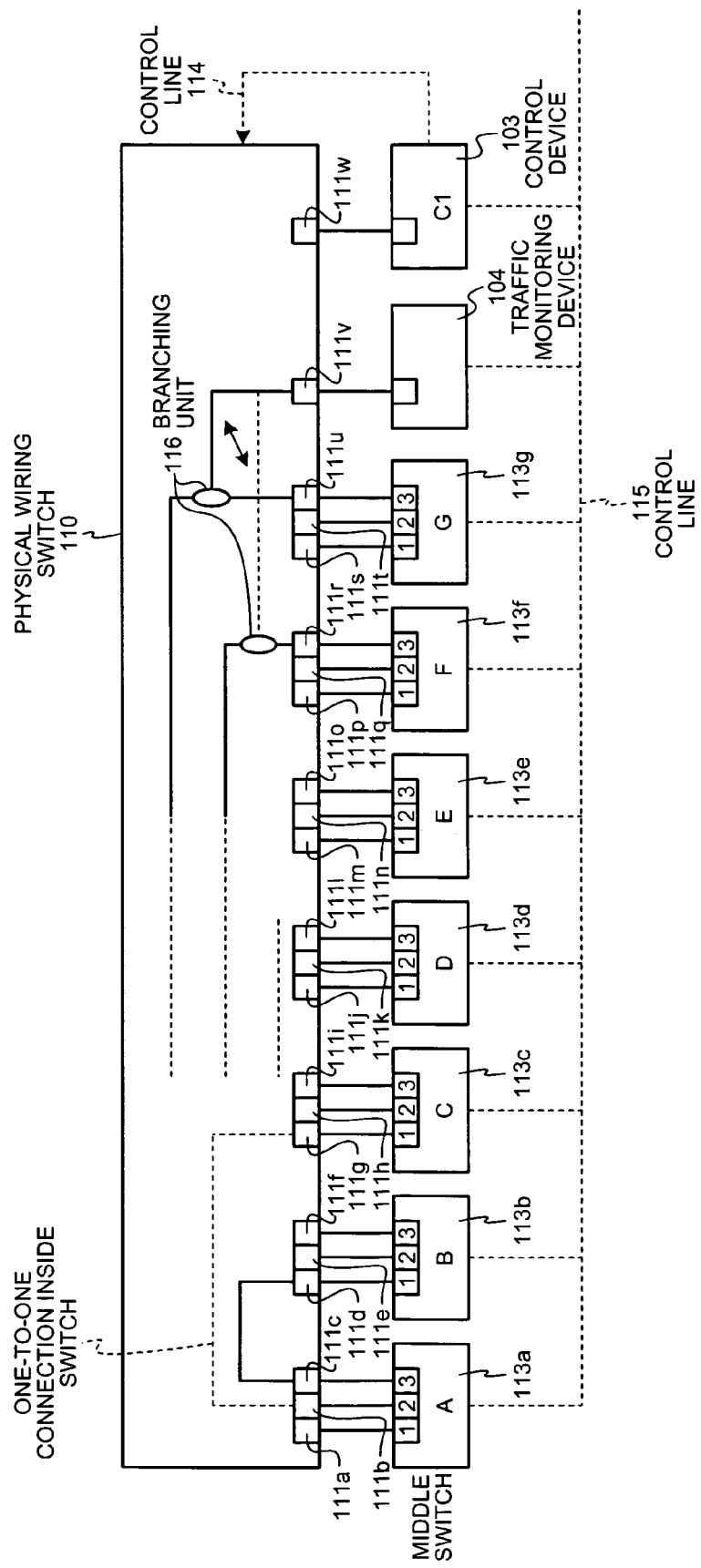
FIG. 20 is a schematic diagram for illustrating a first connection example of a traffic monitoring device.

The detection of the traffic amount is performed as follows. FIG. 20 is a schematic diagram for illustrating a first connection example of the traffic monitoring device 104. The traffic monitoring device 104 is connected to the physical wiring switch 110, and creates a traffic matrix by branching an internal signal of the physical wiring switch 110 using a branching unit 116.

For instance, by branching an output signal of the middle switch 113a using the branching unit 116, connecting the branched signal to the traffic monitoring device 104, and changing the output signal to be branched in order at regular intervals, it is possible to sample and measure the traffic state.

Figure 21:
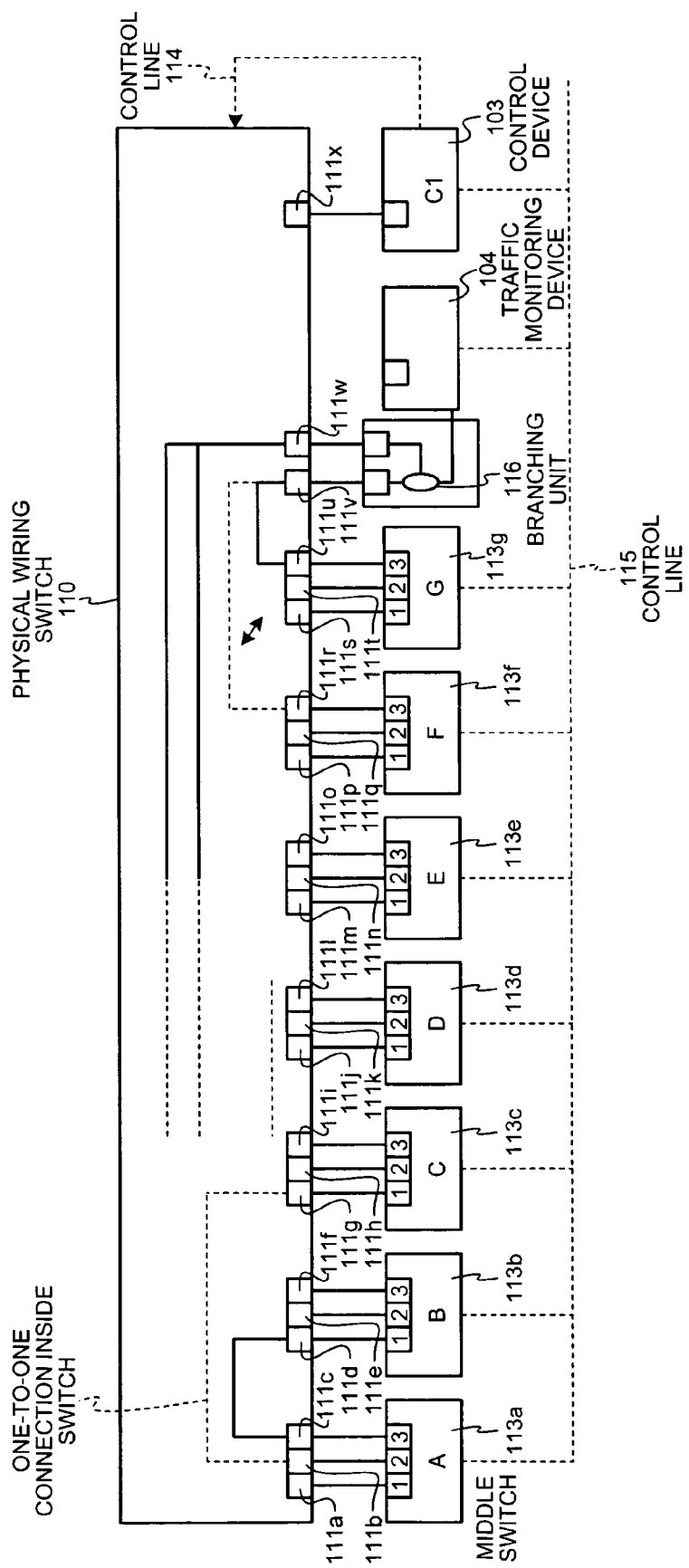
FIG. 21 is a schematic diagram for illustrating a second connection example of the traffic monitoring device.

FIG. 21 is a schematic diagram for illustrating a second connection example of the traffic monitoring device 104. By connecting the branching unit 116, to which the traffic monitoring device 104 is connected, to a branching port 111v of the physical wiring switch 110, and connecting the branching port 111v to the ports 111a to 111u to which the middle switches 113a to 113g are connected in regular intervals, it is possible to sample and measure the traffic state.

Figure 22:
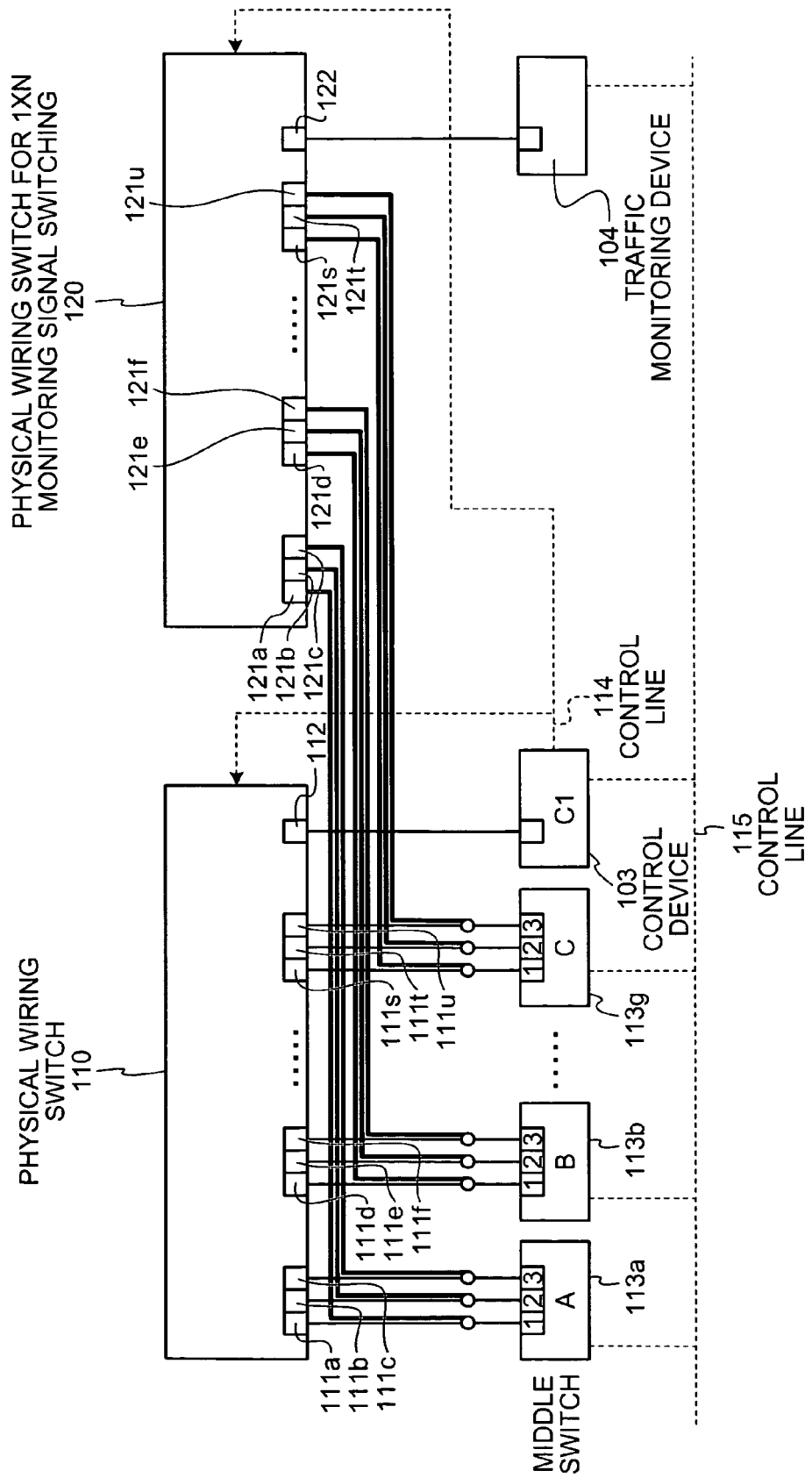
FIG. 22 is a schematic diagram for illustrating a third connection example of the traffic monitoring device.

FIG. 22 is a schematic diagram for illustrating a third connection example of the traffic monitoring device 104. The communication system shown in FIG. 22 includes a physical wiring switch for 1×N monitoring-signal switching 120, and receives branching signals of output signals of each of the middle switches 113a to 113g through each of ports 121a to 121u of the physical wiring switch for 1×N monitoring-signal switching 120.

The physical wiring switch for 1×N monitoring-signal switching 120 switches its internal wiring based on a control by the control device 103, and sequentially outputs the branching signals from each of the middle switches 113a to 113g from a port 122 to the traffic monitoring device 104; and the traffic monitoring device 104 measures a traffic amount.

Figure 23:
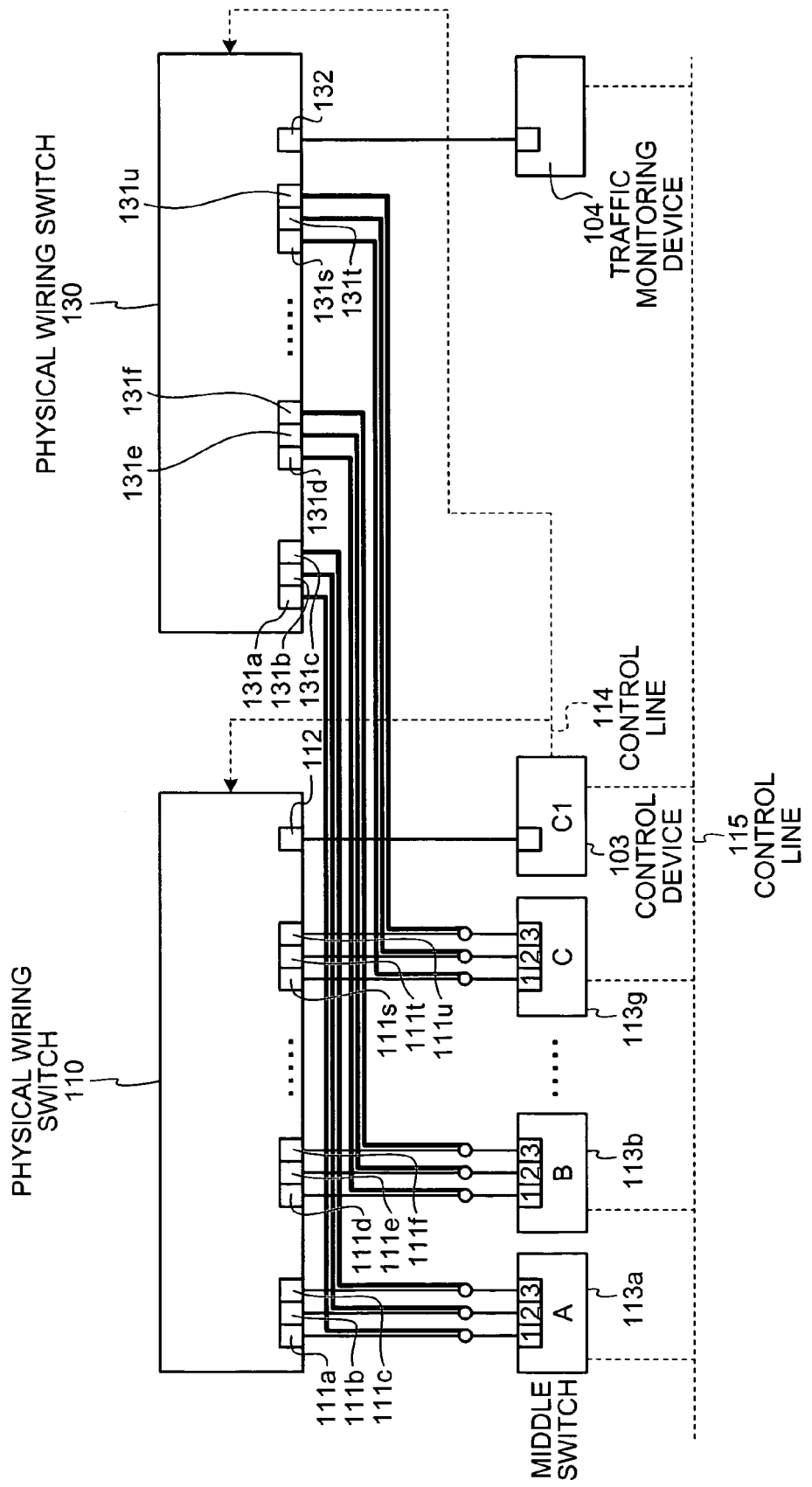
FIG. 23 is a schematic diagram for illustrating a fourth connection example of the traffic monitoring device.

FIG. 23 is a schematic diagram for illustrating a fourth connection example of the traffic monitoring device 104. The communication system shown in FIG. 23 includes a physical wiring switch 130, and receives the branching signals of the output signals of each of the middle switches 113a to 113g through each of ports 131a to 131u of the physical wiring switch 130.

The physical wiring switch 130 switches its internal wiring based on a control by the control device 103, and sequentially outputs the branching signals from each of the middle switches 113a to 113g from a port 132 to the traffic monitoring device 104; and the traffic monitoring device 104 measures a traffic amount.

In addition, the physical wiring switch 130 functions as a redundancy switch that establishes, when a failure occurs at the physical wiring switch 110, a connection between the middle switches 113a to 113g like the physical wiring switch 110, to avoid a blackout of a main signal.

FIG. 24 is a schematic diagram for illustrating an example of the traffic matrix. Each of the middle switches 113a to 113g is allocated to a row and a column of the traffic matrix (A to G), so that information on a traffic amount between the middle switches 113a to 113g specified by each row and each column.

Figure 25:
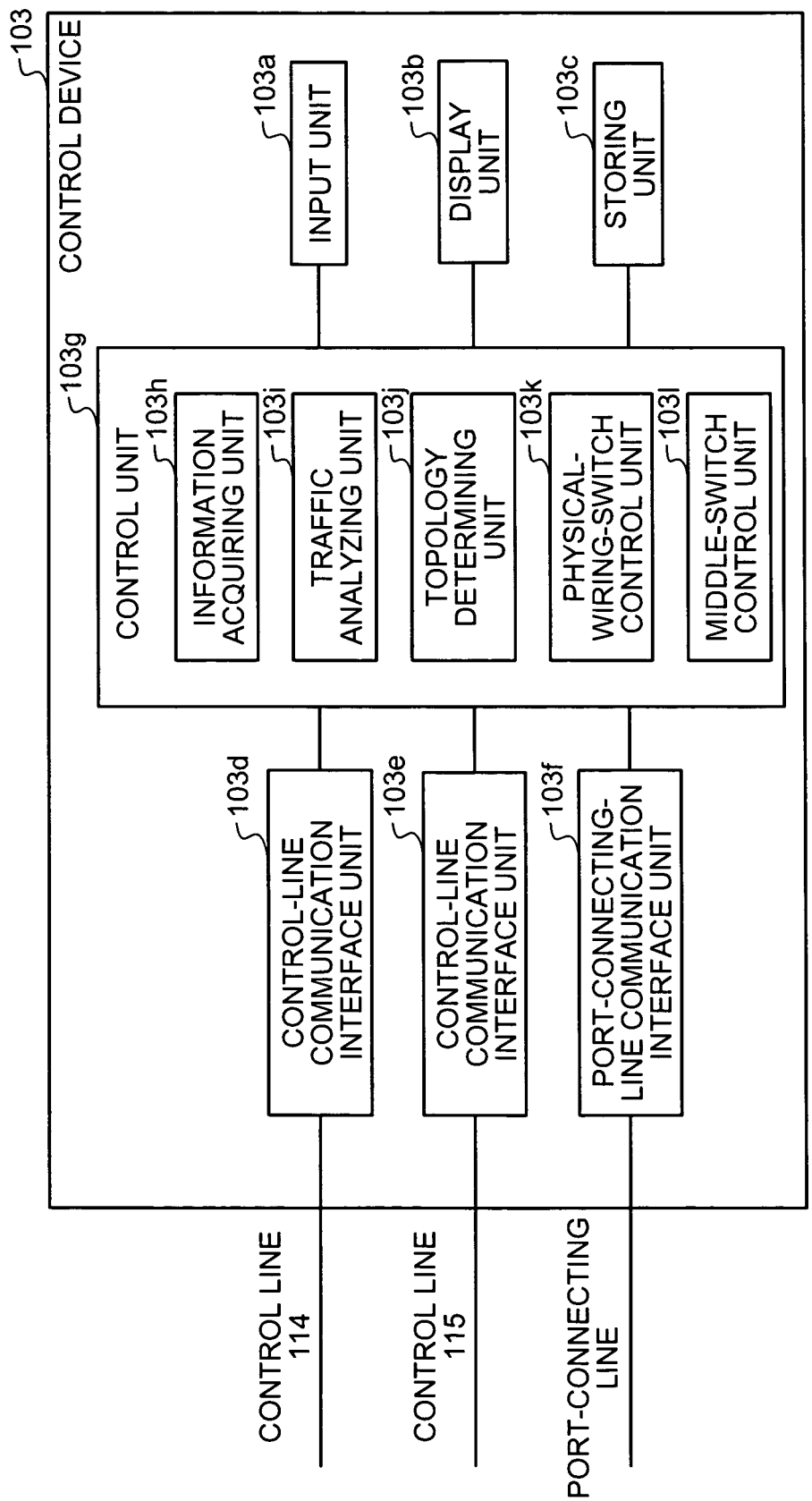
FIG. 25 is a block diagram for illustrating a functional configuration of a control device according to the second embodiment.

FIG. 25 is a block diagram for illustrating a functional configuration of the control device 103 according to the second embodiment. The control device 103 includes an input unit 103a, a display unit 103b, a storing unit 103c, a control-line communication interface unit 103d, a control-line communication interface unit 103e, a port-connection-line communication interface unit 103f, and a control unit 103g.

The input unit 103a is an input device such as a keyboard and a mouse. The display unit 103b is a display device such as a monitor display. The storing unit 103c is a storage device such as a hard disk device for storing a variety of pieces of information.

The control-line communication interface unit 103d is a communication interface to transfer data with the physical wiring switch 110 via the control line 114. The control-line communication interface unit 103e is a communication interface to transfer data between the middle switches 113a to 113g and the traffic monitoring device 104 via the control line 115.

The port-connection-line communication interface unit 103f is a communication interface to transfer data between devices connected to other of the ports 111a to 111u of the physical wiring switch 110 via a port connection line connected to the port 112 of the physical wiring switch 110.

The control unit 103g controls the whole control device 103, and controls a data transfer between each of the function units. The control unit 103g includes an information acquiring unit 103h, a traffic analyzing unit 103i, a topology determining unit 103j, a physical-wiring-switch control unit 103k, and a middle-switch control unit 103l.

The information acquiring unit 103h is a processing unit that acquires information on each of the middle switches 113a to 113g. The traffic analyzing unit 103i receives information on the traffic matrix from the traffic monitoring device 104, and analyzes an amount of traffic between the middle switches 113a to 113g.

The topology determining unit 103j determines an optimum topology between the middle switches 113a to 113g based on a result of analyzing the traffic by the traffic analyzing unit 103i.

The physical-wiring-switch control unit 103k is a processing unit that outputs an instruction for changing the internal connection of the physical wiring switch 110. In particular, the physical-wiring-switch control unit 103k outputs the instruction for changing the internal connection of the physical wiring switch 110 based on a result of determining the optimum topology by the topology determining unit 103j.

The middle-switch control unit 103l is a processing unit that transmits setting information to the middle switches 113a to 113g, and performs a setting of the middle switches 113a to 113g. In particular, the middle-switch control unit 103l transmits the setting information to the middle switches 113a to 113g based on the result of determining the optimum topology by the topology determining unit 103j.

Figure 26:
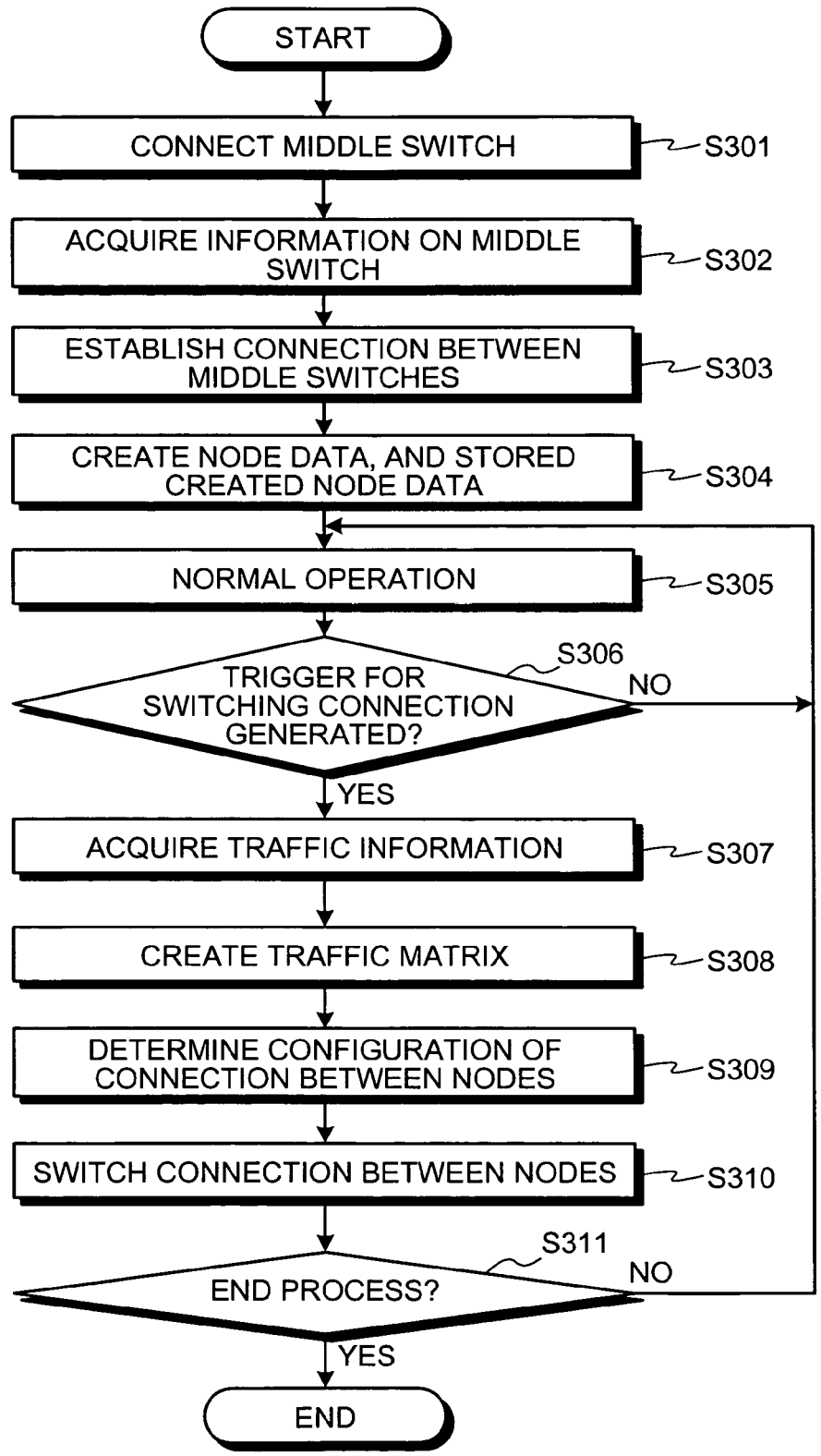
FIG. 26 is a flowchart of a processing procedure for a process of changing a topology according to the second embodiment.

FIG. 26 is a flowchart of a processing procedure for a process of changing the topology according to the second embodiment. First of all, the middle switches 113a to 113g are connected to the physical wiring switch 110 via a single signal line or a plurality of signal lines (Step S301).

The information acquiring unit 103h of the control device 103 acquires information on the middle switches 113a to 113g (Step S302). The information on the middle switches 113a to 113g can be acquired by receiving an input of the information from an administrator or by receiving the information from the middle switches 113a to 113g after establishing a connection with each of the middle switches 113a to 113g.

FIG. 27 is a schematic diagram for illustrating an example of middle-switch information acquired by the control device 103. The middle-switch information includes information on "middle-switch ID", "number of signal lines", "switching capacity", "link capacity", and "layer 2/3 switching capability".

The "middle-switch ID" is identification information for identifying each of the middle switches 113a to 113g. As for the middle-switch ID, an Internet-protocol (IP) address or a media-access-control (MAC) address can be used.

The "number of signal lines" is the number of signal lines for connecting the physical wiring switch 110 and each of the middle switches 113a to 113g. The "switching capacity" and the "link capacity" are the switching capacity and the link capacity of each of the middle switches 113a to 113g.

The "layer 2/3 switching capability" is a switching capability of each of the middle switches 113a to 113g, which is information indicating whether a layer 3 routing is possible.

The middles switches 113a to 113g that can make the layer 3 routing are the middle switches 113a to 113g that are equipped with a layer 3 routing function in advance with the layer 3 routing function enabled, or the middle switches 113a to 113g to which the layer 3 routing function is added by adding an external device or a module with the layer 3 routing function enabled.

Referring back to FIG. 26, the physical-wiring-switch control unit 103k of the control device 103 receives an input of setting information on an initial topology from a user, and establishes a connection between the middle switches 113a to 113g by controlling the physical wiring switch 110 (Step S303).

The information acquiring unit 103h creates node data for each of the middle switches 113a to 113g from the middle-switch information acquired at Step S302 and the setting information on the initial topology acquired at Step S303, and stores the node data in the storing unit 103c (Step S304).

FIG. 28 is a schematic diagram for illustrating an example of the node data created for each of the middle switches 113a to 113g. The node data includes "node characteristic information" and "network configuration information".

The "node characteristic information" includes information on "middle-switch ID", "number of signal lines", "switching capacity", "link capacity", and "layer 2/3 switching capability". The information included in the "node characteristic information" is the same as the information on the "middle-switch ID", the "number of signal lines", the "switching capacity", the "link capacity", and the "layer 2/3 switching capability" described in FIG. 27.

The "network configuration information" includes information on "link-connection-destination information", "isRoot", "isL3", "right-side sub-node", and "left-side sub-node". The "link-connection-destination information" is information for specifying a connection relation between each link of the middle switches 113a to 113g and the ports 111a to 111u of the physical wiring switch 110.

The "isRoot" is information indicating whether one of the middle switches 113a to 113g is a root node of a tree topology. The "isL3" is information indicating whether the layer 3 routing function of the middle switches 113a to 113g is turned ON.

The "right-side sub-node" is information on a middle-switch ID for identifying a sub-node on a right side of the middle switches 113a to 113g in the tree topology. The "left-side sub-node" is information on a middle-switch ID for identifying a sub-node on a left side of the middle switches 113a to 113g in the tree topology.

The node data is created as much as the number of the middle switches 113a to 113g connected to the physical wiring switch 110. In addition, attribute values of a variety of the middle switches 113a to 113g used for calculating the topology are further included in the node data.

Referring back to FIG. 26, after Step S304, a normal operation is performed by the physical wiring switch 110 and each of the middle switches 113a to 113g (Step S305). The normal operation means a state in which the middle switches 113a to 113g are connected with each other via the physical wiring switch 110 to establish a single network or a plurality of networks, and communication devices under the middle switches 113a to 113g perform a communication with each other to provide a communication service.

In the normal operation, a switching of paths by the physical wiring switch 110 is not performed, and a communication is performed by a packet switching of each of the middle switches 113a to 113g.

The physical-wiring-switch control unit 103k of the control device 103 checks if a trigger for switching connection is generated (Step S306). The trigger for switching connection includes a time trigger and a capacity trigger.

The time trigger is a trigger that is generated at a preset time, and when the time trigger is generated, the physical wiring switch 110 performs a switching of connection between the middle switches 113a to 113g. In addition, the trigger can be generated at a preset date and time instead of the preset time.

Figure 29:
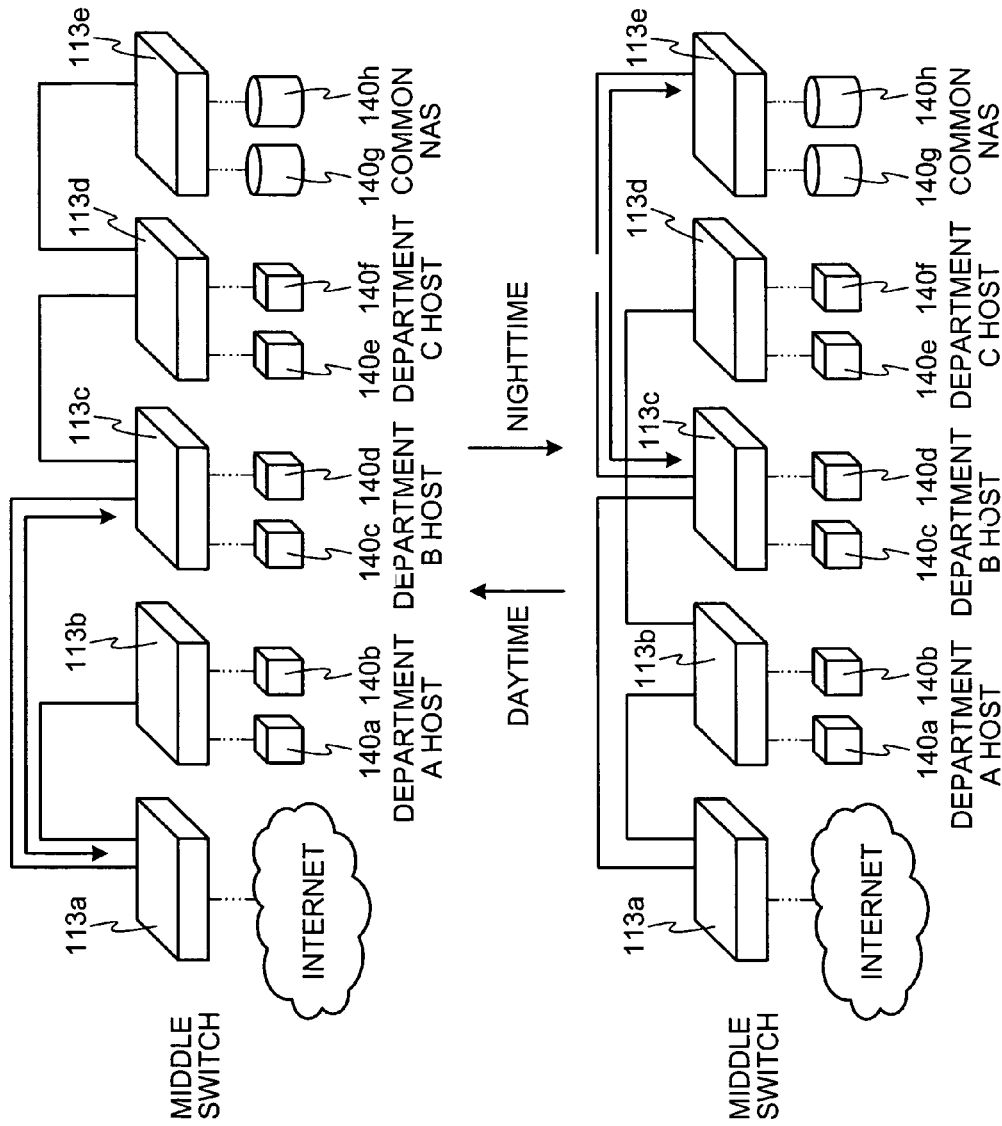
FIG. 29 is a schematic diagram for illustrating a method of switching connections between the middle switches by a time trigger.

FIG. 29 is a schematic diagram for illustrating a method of switching the connection between the middle switches 113a to 113g by the time trigger. For instance, it is assumed that hosts 140c, 140d of a department B mainly performs an Internet communication with almost no connection with common network attached storages (NASs) 140g, 140h during daytime hours.

In this case, the hosts 140c, 140d of the department B are directly connected to the middle switch 113a that is a gate to the Internet, and connected to the common NASs 140g, 140h, which are rarely used, via the middle switch 113d, so that a communication between host 140e, 140f of a department C and the common NASs 140g, 140h is not inhibited.

With the onset of night, when the hosts 140c, 140d of the department B mainly performs a communication with the common NASs 140g, 140h for an operation such as a data backup, the network configuration is changed in such a manner that the middle switch 113c that accommodates the hosts 140c, 140d of the department B is directly connected to the middle switch 113e that accommodates the common NASs 140g, 140h, so that communications of other departments are not affected.

In this manner, in a network that is changed according to a time or a data and time, such as a daytime, a start of month, and an end of month, an efficient operation of the network is possible by performing a switching of the network using the time trigger of the data and time trigger.

On the other hand, the capacity trigger is a trigger that is generated when the switching capacity or the link capacity of the middle switches 113a to 113g exceeds a predetermined ratio of a tolerance of the switching capacity or the link capacity.

When the switching capacity or the link capacity exceeds the tolerance, a packet is discarded by the middle switches 113a to 113g, and a serious network delay disturbance is occurred due to a retransmission process of the packet. Therefore, the network configuration is changed so that the network can be operated in a range that the switching capacity or the link capacity does not exceed the tolerance.

Referring back to FIG. 26, when the trigger for switching connection is not generated ("NO" at Step S306), the process is moved to Step S305 to continue the normal operation. On the other hand, when the trigger for switching connection is generated at Step S306 ("YES" at Step S306), the traffic monitoring device 104 acquires traffic information by sampling packets (Step S307).

The traffic monitoring device 104 creates a traffic matrix based on the acquired traffic information (Step S308). A creation of the traffic matrix is explained below. Although a case in which a network of an ordinary IP over Ethernet (Registered Trademark) is assumed is explained, the network can adopt other protocol.

Figure 30:
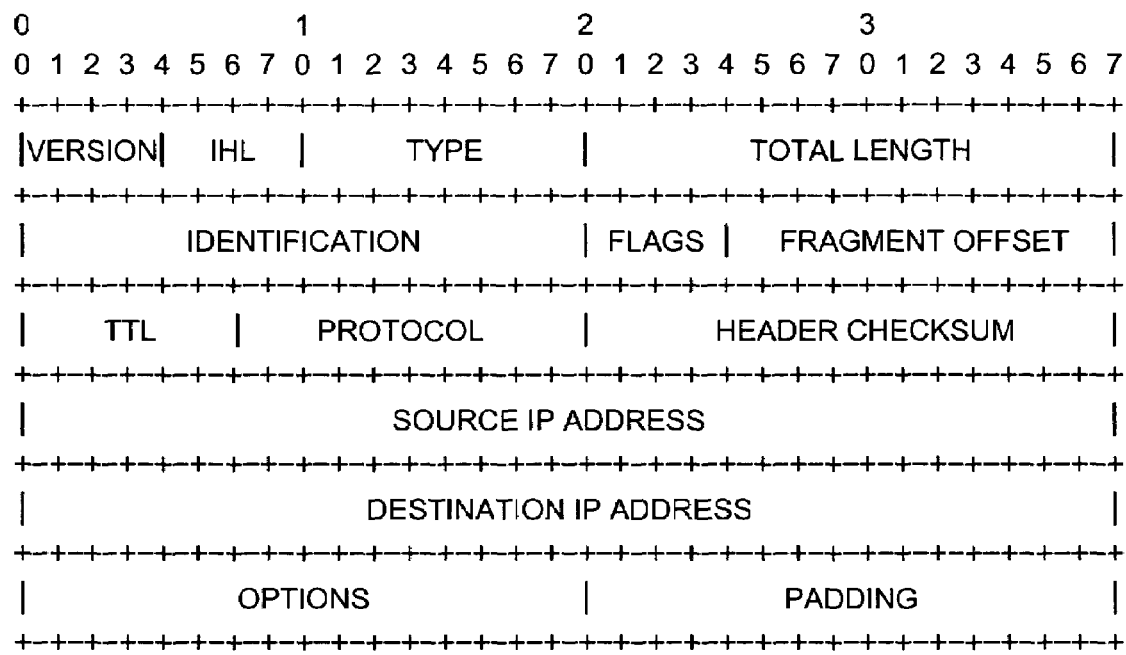
FIG. 30 is a schematic diagram for illustrating an IP header of an ordinary IP packet.

FIG. 30 is a schematic diagram for illustrating an IP header of an ordinary IP packet. The traffic monitoring device 104 acquires a source IP address and a destination IP address from the IP header. The source IP address acquired from a packet p is set as p-sip, and the destination IP address is set as p-dip.

In addition, the traffic monitoring device 104 acquires information on IP addresses of devices under each of the middle switches 113a to 113g and subnet masks in advance, and stores a correspondence relation between an IP address of a specific device, one of the middle switches 113a to 113g under which the device is accommodated, and a subnet mask.

These pieces of information can be acquired by receiving an input from a network administrator, or from each of the middle switches 113a to 113g or the devices under each of the middle switches 113a to 113g.

Then, the traffic monitoring device 104 sets a middle switch that accommodates a device having an IP address of p_sip as "ns", a middle switch that accommodates a device having an IP address of p_dip as "nd", and the subnet mask as mask_dip.

When there is only a single subnet in the network, it is enough to create a single traffic matrix. Namely, the traffic monitoring device 104 adds "1" to a value of a matrix of which the transmission-source middle switch is "ns", and the destination middle switch is "nd" in the traffic matrix shown in FIG. 24. The traffic monitoring device 104 completes the traffic matrix by performing the same process for all the acquired packets.

On the other hand, when there is a plurality of subnets in the network, it is necessary to create two kinds of traffic matrices corresponding to an intra-subnet communication and an inter-subnet communication, respectively. In this case, p_sip & mask_sip,
p_dip & mask_dip is calculated (where, "&" represents an AND operation), and a network address to which a respective IP address belongs is obtained.

When (p_sip & mask_sip)==(p_dip & mask_dip), because the transmission-source IP address and the destination IP address belong to the same subnet, it is determined that the packet is a communication packet for the intra-subnet. Therefore, "1" is added to a value of a matrix of which the transmission-source middle switch is "ns", and the destination middle switch is "nd", in the traffic matrix inside the subnet.

When (p_sip & mask_sip)!=(p_dip & mask_dip), because the transmission-source IP address and the destination IP address belong to different subnets, it is determined that the packet is a communication packet for the inter-subnet. Therefore, "1" is added to a value of a matrix of which the transmission-source middle switch is "ns", and the destination middle switch is "nd", in the traffic matrix between the subnets.

Figure 31:
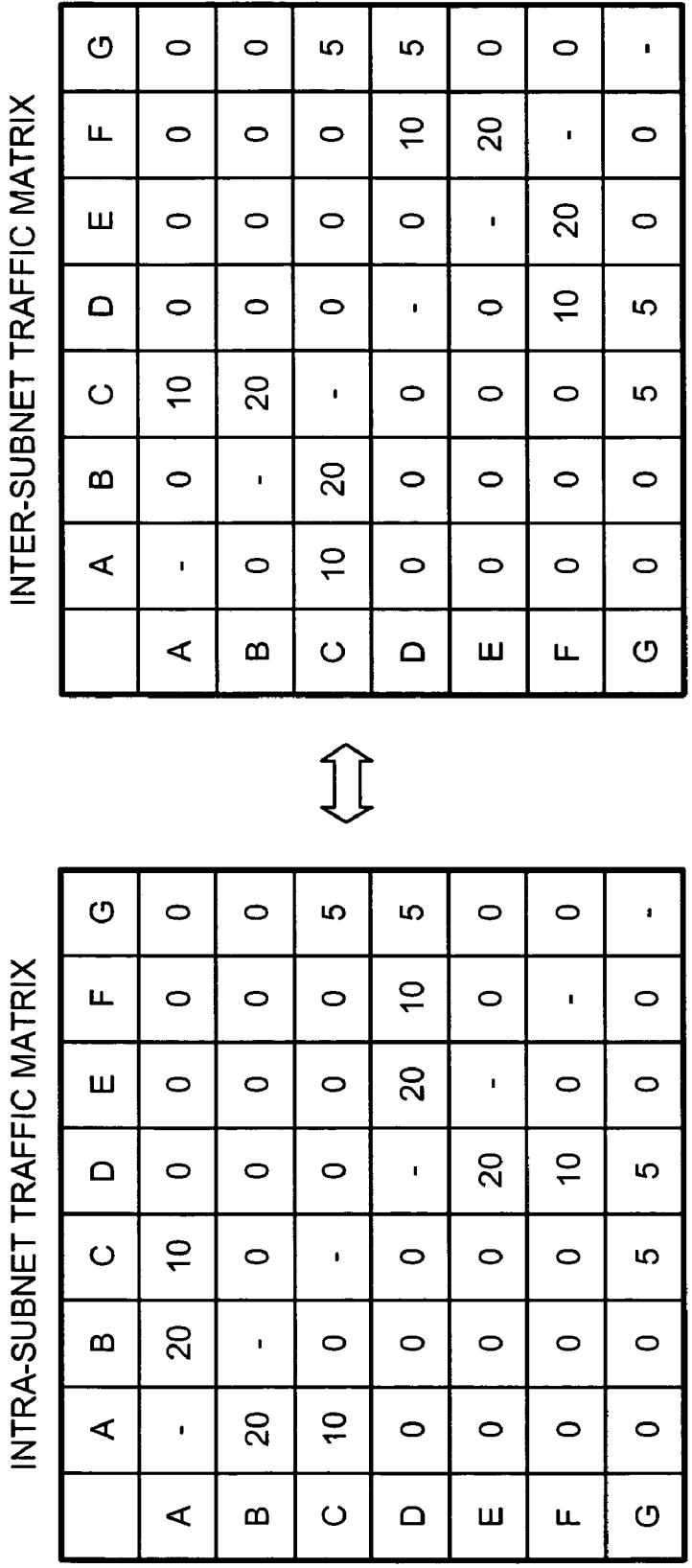
FIG. 31 is a schematic diagram for illustrating an example of an intra-subnet traffic matrix and an inter-subnet traffic matrix.

With the above procedures, the traffic monitoring device 104 can create the traffic matrix for the intra-subnet/inter-subnet from the acquired packet data. FIG. 31 is a schematic diagram for illustrating an example of an intra-subnet traffic matrix and an inter-subnet traffic matrix.

Referring back to FIG. 26, after Step S308 is processed, the topology determining unit 103j of the control device 103 determines a connection configuration between optimum nodes (middle switches 113a to 113g) based on the created traffic matrix (Step S309).

The physical-wiring-switch control unit 103k performs a switching of connection between the nodes by controlling the physical wiring switch 110 based on a result of determination by the topology determining unit 103j (Step S310), and after that, checks if a request for ending the topology changing process is received from the user (Step S311).

When the request for ending the topology changing process is not received ("NO" at Step S311), the process is moved to Step S305 to continue the subsequent process. On the other hand, when the request for ending the topology changing process is received at Step S311 ("YES" at Step S311), the topology changing process is ended.

Figure 32A:
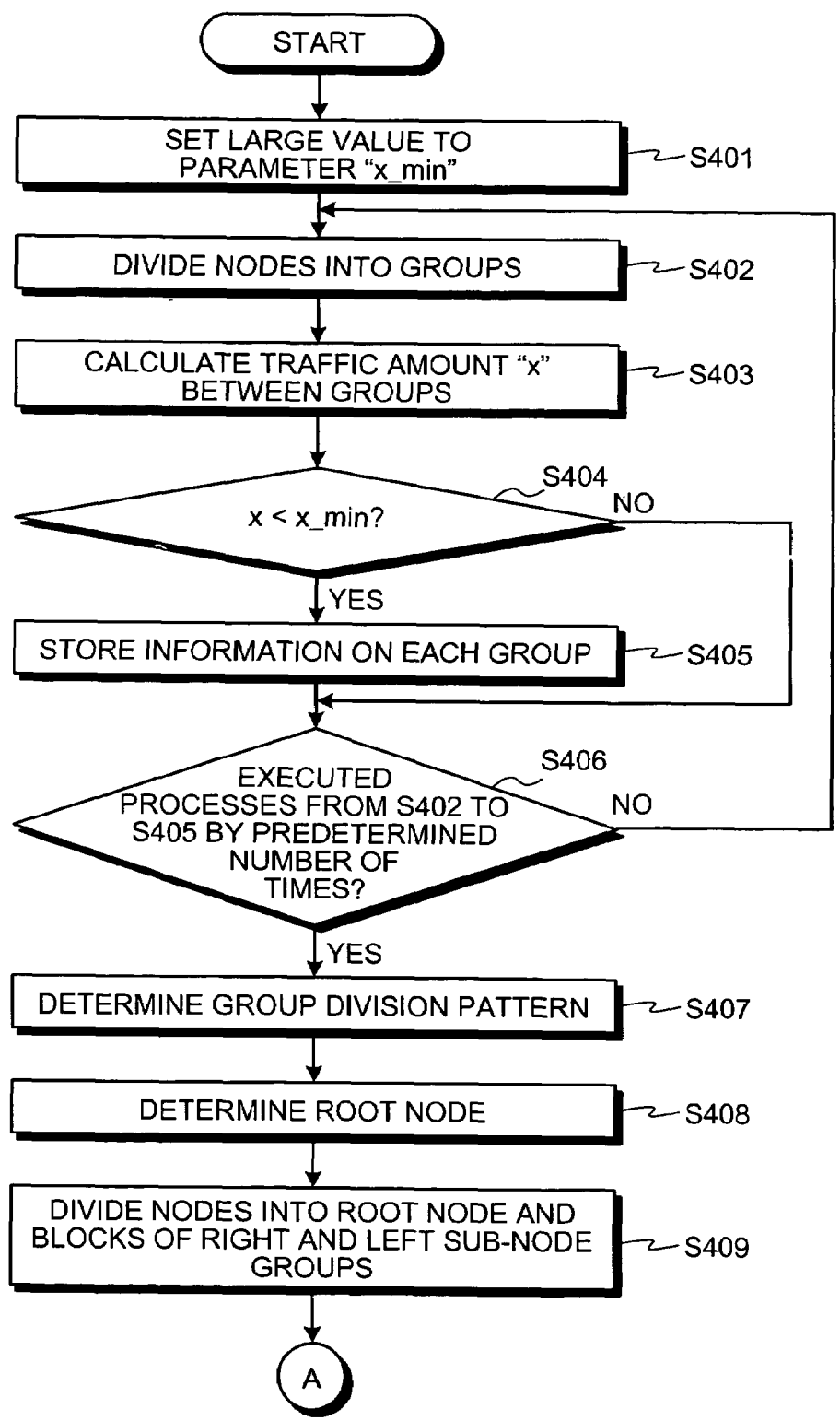
FIG. 32A is a flowchart of a processing procedure for a first part of a process of determining connection configuration between nodes shown in FIG. 26.
Figure 32B:
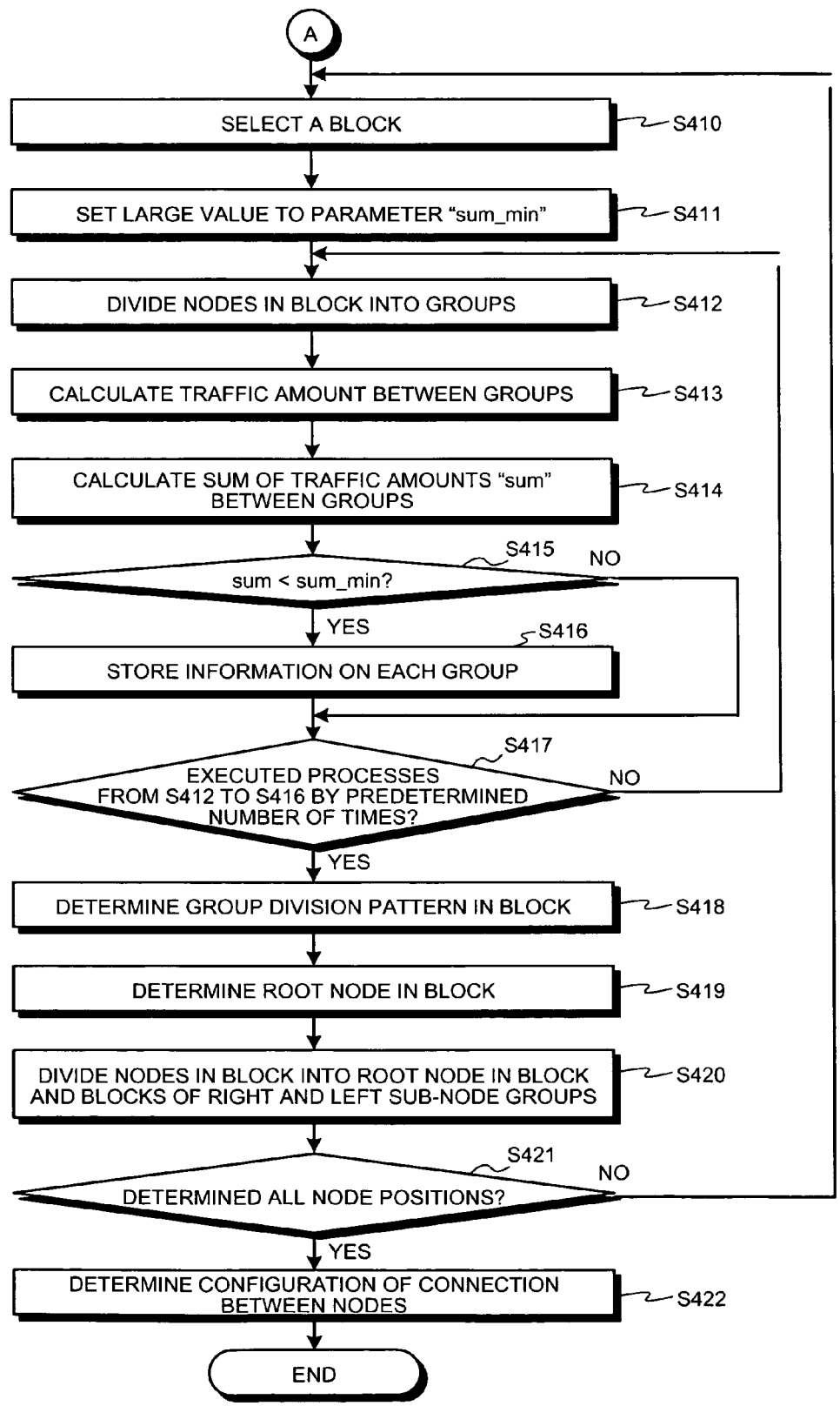
FIG. 32B is a flowchart of a processing procedure for a second part of a process of determining connection configuration between nodes shown in FIG. 26

FIG. 32A and FIG. 32B are flowcharts of a processing procedure for a process of determining a connection configuration between nodes shown in FIG. 26.

In the example shown in FIG. 32A and FIG. 32B, a procedure for a case in which a binary tree topology is configured is explained; however, by changing a group division pattern, it is possible to handle other types of tree structures with ease.

As shown in FIG. 32A, the topology determining unit 103j of the control device 103 sets a large value to a parameter "x_min" that is used for comparing traffic amounts (Step S401). Then, the topology determining unit 103j divides the group of nodes (middle switches 113a to 113g) into three groups each of which having i nodes, 1 node, and j nodes (i+1+j=N, N is total number of nodes) (Step S402).

A node that is selected for the 1 node group becomes a candidate for a root node. A division of the group can be performed by shuffling the N nodes on an array and scanning all possible division patterns, or by executing a calculation using other algorithm with efficiency.

Figure 33B:
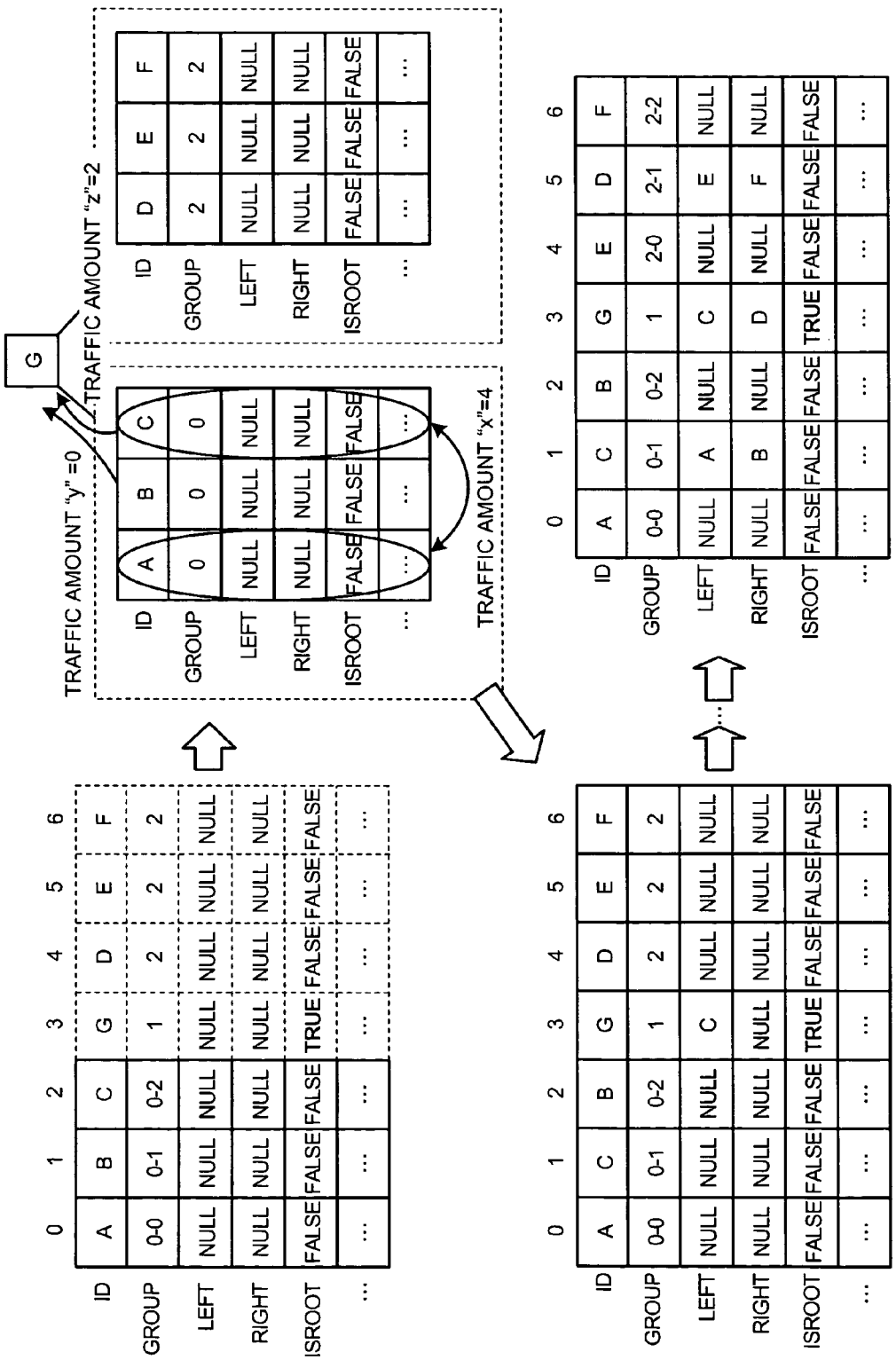

FIG. 33A and FIG. 33B are schematic diagrams for illustrating an example of the process of determining the connection configuration between the nodes. Each of the tables shown in FIG. 33A and FIG. 33B includes information on "ID", "group", "left", "right", and "isRoot".

The "ID" is information on the IDs (A to G) of the middle switches 113a to 113g. The "group" is information on a group that is created by dividing the node group. The "left" is information on the ID of one of the middle switches 113a to 113g that becomes a left-side sub-node of one of the middle switches 113a to 113g that is identified by the "ID". The "right" is information on the ID of one of the middle switches 113a to 113g that becomes a right-side sub-node of one of the middle switches 113a to 113g that is identified by the "ID". The "isRoot" is information indicating whether one of the middle switches 113a to 113g that is identified by the "ID" is the root node.

In the example shown in FIG. 33A, the middle switches 113a to 113c with the "ID" A to C are divided into a group 0, the middle switch 113d with the "ID" D is divided into a group 1, and the middle switches 113e to 113g with the "ID" E to G are divided into a group 2.

The topology determining unit 103j calculates a traffic amount "x" between the groups (Step S403). In the example shown in FIG. 33A, the topology determining unit 103j calculates the traffic amount "x" transferred between the group 0 and the group 2.

Then, the topology determining unit 103j checks if the traffic amount "x" is smaller than the parameter "x_min" (Step S404). When the traffic amount "x" is smaller than the parameter "x_min" ("YES" at Step S404), the topology determining unit 103j stores information on the middle switches 113a to 113g that belong to each of the groups (Step S405).

The topology determining unit 103j checks if the processes from Step S402 to Step S405 are executed for a predetermined number of times (Step S406). When the processes from Step S402 to Step S405 are not executed for the predetermined number of times ("NO" at Step S406), the process is moved to Step S402 to continue the subsequent processes.

On the other hand, when the traffic amount "x" is not smaller than the parameter "x_min" at Step S404 ("NO" at Step S404), Step S405 is skipped, and the process is moved to Step S406. By performing the above procedures, a group division pattern with which the traffic amount "x" is minimized can be obtained.

When the processes from Step S402 to Step S405 are executed for the predetermined number of times at Step S406 ("YES" at Step S406), the topology determining unit 103j determines the group division pattern based on the information stored at Step S405 (Step S407).

The topology determining unit 103j determines the node of the group that consists of a single node (the middle switch 113g having the "ID" G in FIG. 33A) as the root node, and sets "true" to the "isRoot", as shown in FIG. 33A (Step S408).

The topology determining unit 103j divides the node group into the root node, a block of a left-side sub-node group, and a block of a right-side sub-node group (a block of the group 0 and a block of the group 2 shown in FIG. 33A) (Step S409)

After that, as shown in FIG. 33B, the topology determining unit 103j selects one of the blocks (in the example shown in FIG. 33B, the block consisting of the middle switches 113a to 113c having the "IDs" A, B, and C) (Step S410), and sets a large value to a parameter "sum_min" that is used for comparing traffic amounts (Step S411).

Subsequently, the topology determining unit 103j divides the node group in the block into three groups of m nodes, 1 node, and n nodes (m+1+n=M, where M is the total number of nodes in the block) (Step S412). In the example shown in FIG. 33B, the middle switch 113a having the "ID" A is set to a group 0-0, the middle switch 113b having the "ID" B is set to a group 0-1, and the middle switch 113c having the "ID" C is set to a group 0-2.

A division of the group can be performed by shuffling the M nodes on an array and scanning all the possible division pattern, or by executing a calculation using other algorithm with efficiency.

The topology determining unit 103j calculates the traffic amount between the groups (Step S413). In the example shown in FIG. 33B, the traffic amount "x" transferred between the group 0-0 and the group 0-2 is calculated.

Considering an actual tree structure, as shown in FIG. 33B, it is configured such that the block consisting of the middle switches 113a to 113c having the "IDs" A, B, and C is connected with the block consisting of the middle switches 113d to 113f having the "IDs" D, E, and F, via the root node having the "ID" G.

Upon the above consideration, a traffic amount "y" and a traffic amount "z" between a node inside the group and a node outside the group are defined. The traffic amount "y" is an amount of communication between the group 0-0 and outside of the block (in the example shown in FIG. 33B, a sum of the amounts of communication between the middle switch 113a having the "ID" A and the middle switches 113g, 113d, 113e, 113f having the "IDs" G, D, E, and F).

The traffic amount "z" is an amount of communication between the group 0-2 and outside of the block (in the example shown in FIG. 33B, a sum of the amounts of communication between the middle switch 113c having the "ID" C and the middle switches 113g, 113d, 113e, 113f having the "IDs" G, D, E, and F).

The topology determining unit 103j calculates a sum of the traffic amounts between the groups "sum" (in the example shown in FIG. 33B, a sum of the traffic amounts "x", "y", and "z") (Step S414), and checks if the sum of the traffic amounts "sum" is smaller than the parameter "sum_min" (Step S415).

When the sum of the traffic amounts "sum" is smaller than the parameter "sum_min" ("YES" at Step S415), the topology determining unit 103j stores information on the middle switches 113a to 113g that belong to each of the groups (Step S416).

The topology determining unit 103j checks if the processes from Step S412 to Step S416 are executed for a predetermined number of times (Step S417). When the processes from Step S412 to Step S416 are not executed for the predetermined number of times ("NO" at Step S417), the process is moved to Step S412 to continue the subsequent processes.

On the other hand, when the sum of the traffic amounts "sum" is not smaller than the parameter "sum_min" at Step S415 ("NO" at Step S415), Step S416 is skipped, and the process is moved to Step S417. By performing the above procedures, a group division pattern with which the sum of the traffic amounts "sum" is minimized can be obtained.

When the processes from Step S412 to Step S416 are executed for the predetermined number of times at Step S417 ("YES" at Step S417), the topology determining unit 103j determines the group division pattern in the block based on the information stored at Step S416 (Step S418).

The topology determining unit 103j determines the node of the group that consists of a single node (the middle switch 113c having the "ID" C in FIG. 33B) as the root node, and sets the root node in the block as a left-side sub-node (or a right-side sub-node) of the higher root node (Step S419). In the example shown in FIG. 33B, the middle switch 113c having the "ID" C is set as the left-side sub-node of the higher root node having the "ID" G.

The topology determining unit 103j divides the node group into the root node in the block, a block of a left-side sub-node group, and a block of a right-side sub-node group (a block of the group 0-0 and a block of the group 0-2 shown in FIG. 33B) (Step S420).

Then, the topology determining unit 103j checks if positions of all of the nodes (middle switches 113a to 113g) are determined (Step S421). If the positions of all of the nodes are not determined ("NO" at Step S421), the process is moved to Step S410 to continue the subsequent processes.

On the other hand, if the positions of all of the nodes are determined ("YES" at Step S421), the topology determining unit 103j determines the tree structure between the nodes obtained from the above processes, as a connection configuration between the nodes (Step S422), and the process of determining the connection between the nodes.

The example explained above is for a case in which the number of connection interfaces of the middle switches 113a to 113g is three. However, even when the number of connection interfaces is increased or decreased, it can be handled with ease by changing the method of dividing the middle switches into groups.

In addition, the connection configuration of the middle switches 113a to 113g can be calculated for a plurality of times, based on the above procedures, by changing the method of dividing the middle switches into groups and the like, to select a connection configuration with which the traffic amount to be processed by the middle switches 113a to 113g is minimized.

After determining the connection configuration of the middle switches 113a to 113g, a total sum "S" of the traffic amounts to be processed by each of the middle switches when the determined connection configuration is implemented is calculated, based on the traffic matrix.

The calculations of the connection configuration of the middle switches and the total sum "S" is repeated for a plurality of times, and by selecting a connection configuration with which the total sum "S" of the traffic amounts to be processed by each of the middle switches is less than other connection configurations or is minimized, as a solution, a network configuration with a high performance can be obtained. In the similar way, the traffic amount to be a comparison parameter can be a total sum of traffic amounts flowing on a link between the middle switches.

When there is a plurality of subnets belonging to the middle switches 113a to 113g connected to the physical wiring switch 110, the layer 3 switching function can be added to the middle switches 113a to 113g to execute a routing between the subnets.

Figure 34:
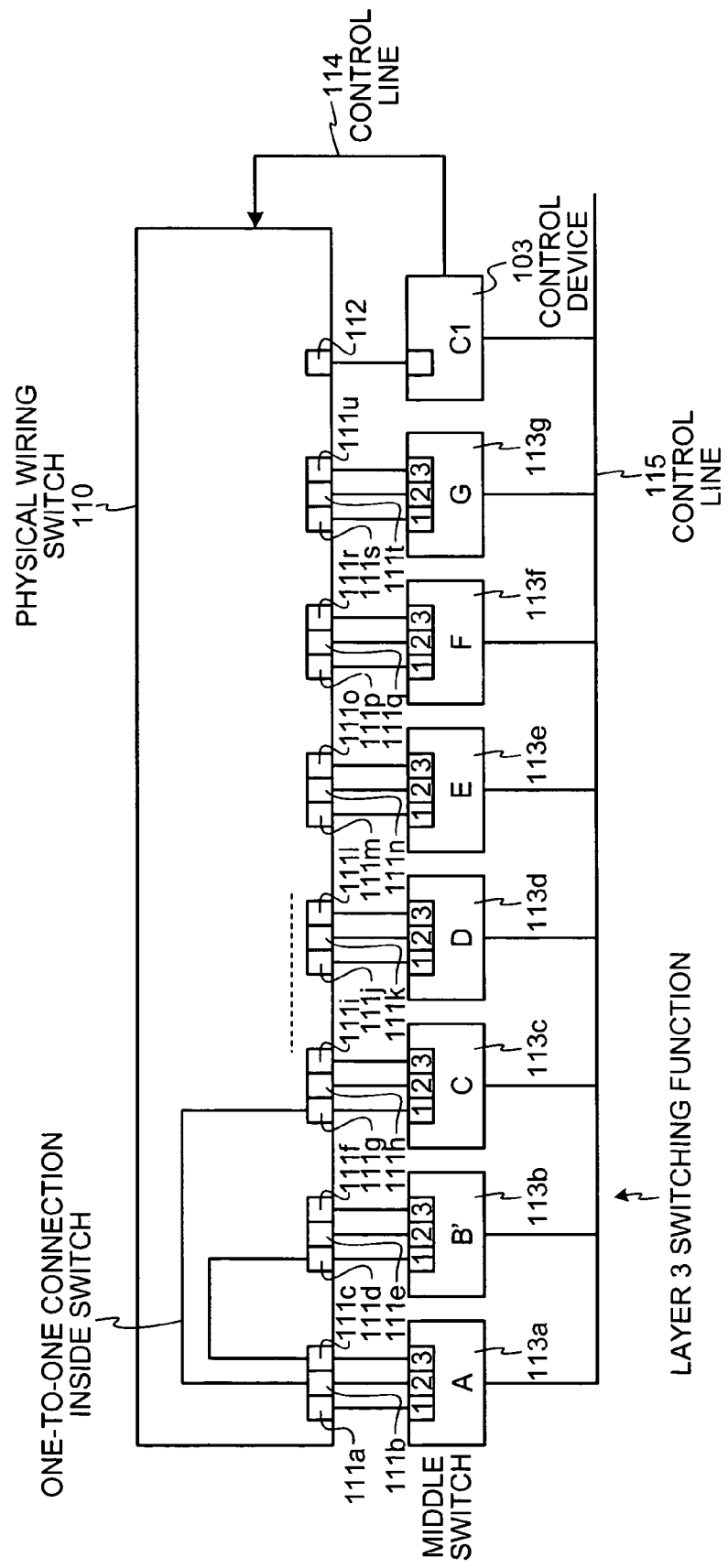
FIG. 34 is a schematic diagram for illustrating a functional configuration of the communication system according to the second embodiment including a middle switch that has a layer 3 switching function.

FIG. 34 is a schematic diagram for illustrating a functional configuration of the communication system that includes the middle switch 113b having the layer 3 switching function. A routing table used in the middle switch 113b is changed by a control signal output from the control device 103 every time the topology is changed according to the traffic matrix.

The control signal can be supplied by connecting the control device 103 and the middle switch 113b through the physical wiring switch 110. Alternatively, the control signal can be supplied through the control line 115 by connecting the control device 103 and the middle switch 113b with the control line 115.

As for the traffic matrix, two types of traffic matrices are prepared: one for the intrasubnet communication amount and the other for the intersubnet communication amount, from among the communication amounts between the middle switches 113a to 113g. For the intrasubnet communication, the same process as the one explained with reference to FIG. 32A and FIG. 32B is executed.

When considering the intersubnet communication, a middle switch having the layer 3 switching/routing function is prepared. It can be implemented by setting the layer 3 switching function to "ON" at the middle switch already connected to the physical wiring switch 110, or by newly connecting a layer 3 switch or a router to the physical wiring switch 110.

The following explanation is for a case in which only one middle switch having the layer 3 switching function or router is connected in the network; however, the number of middle switches having the layer 3 switching function or routers is optional. All of the middle switches can have the layer 3 switching function, or only a specific number of middle switches can have the layer 3 switching function.

In the following example, a procedure of determining a middle switch configuration is explained for a case in which the number of connection interfaces of the middle switches 113a to 113g is three in a network system in which a plurality of subnets belongs to the middle switches 113a to 113g.

Figure 35B:
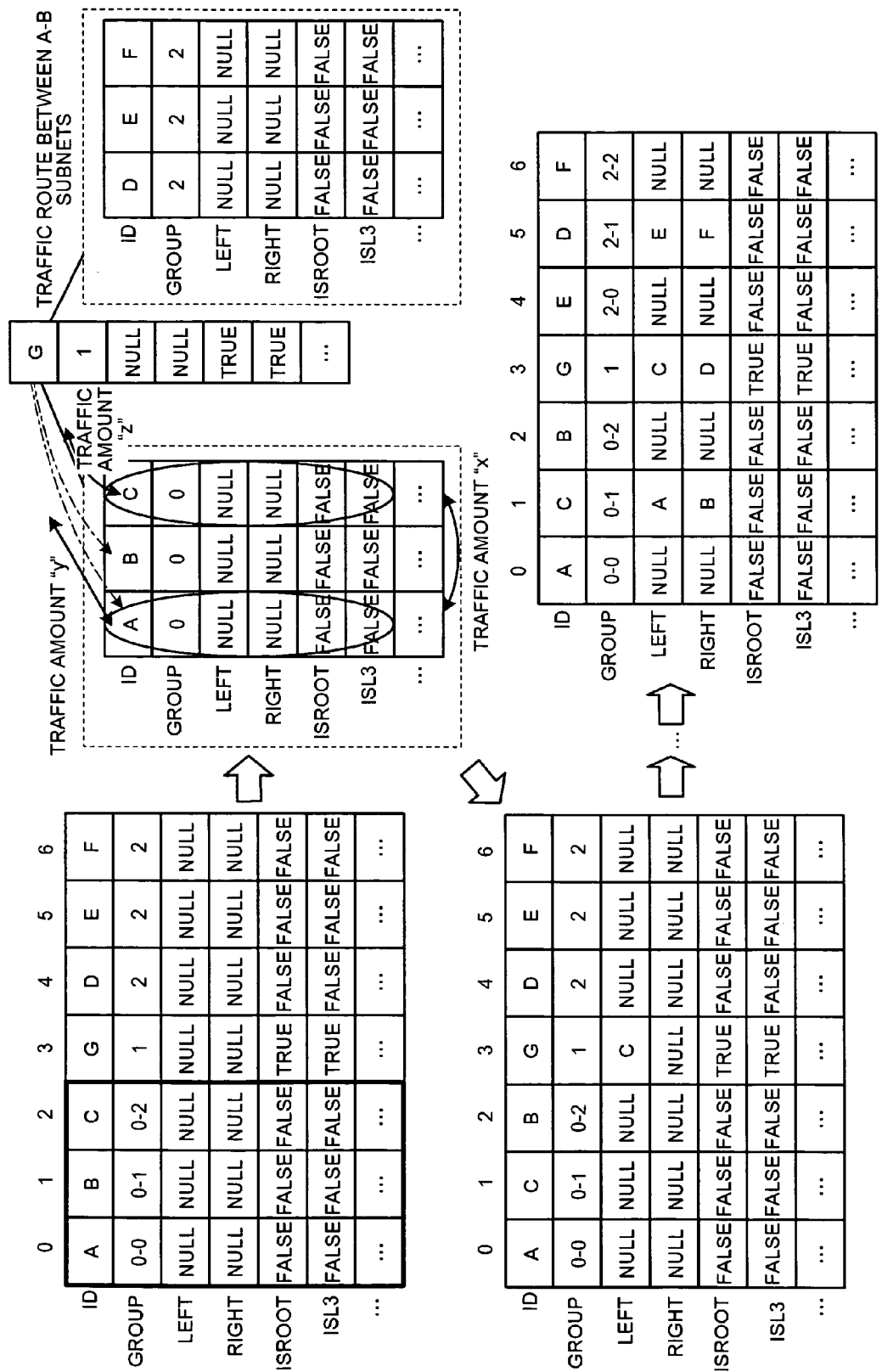

FIG. 35A and FIG. 35B are schematic diagrams for illustrating an example of the process of determining the connection configuration between the nodes in the communication system including the middle switches 113a to 113g having the layer 3 switching function.

Each of the tables shown in FIG. 35A and FIG. 35B includes information on "isL3" in addition to the information on the "ID", the "group", the "left", the "right", and the "isRoot" included in each of the tables shown in FIG. 33A and FIG. 33B. The "isL3" is information indicating whether the middle switches 113a to 113g take a layer 3 routing process.

In the example shown in FIG. 35A and FIG. 35B, the "isL3" is set to "true" for the middle switch 113g having the "ID" G, which means that the middle switch 113g takes the layer 3 routing process.

Even when the middle switches 113a to 113g have the layer 3 switching function, the process of determining the connection between nodes is basically executed the same as the processing procedure shown in FIG. 32A and FIG. 32B.

A difference from the processing procedure shown in FIG. 32A and FIG. 32B is that it is necessary to take the intersubnet communication into consideration when calculating the traffic amount "x" between the groups at Step S403.

First of all, the topology determining unit 103j of the control device 103 calculates the traffic amount "x" between the groups in the same way as Step S403 by using a traffic matrix representing the intrasubnet communication amount.

Then, the topology determining unit 103j adds a traffic amount obtained based on a traffic matrix representing the intersubnet communication amount to the calculated traffic amount. For instance, when there is an intersubnet communication, a communication from the middle switch 113a having the "ID" A toward the middle switch 113b having the "ID" B is considered.

In the case of the intranet communication, because the middle switch 113a having the "ID" A and the middle switch 113b having the "ID" B belong to the same group 0, a contribution to the traffic amount "x" is zero. On the other hand, in the case of the intersubnet communication, a layer 3 switch or a router that performs a routing of a signal over the subnet is required.

Therefore, a signal path becomes a path routing through the middle switch 113g having the "ID" G that is capable of executing a layer 3 switching, as shown in FIG. 35A. In this case, because a traffic is generated between the group 0 and the group 2, it is necessary to add an amount of the traffic to the traffic amount "x". Following the above procedures, the topology determining unit 103j calculates the traffic amount "x".

Another difference is that, when calculating the traffic amount "x" between the groups at Step S413, it is necessary to take the intersubnet communication into consideration. First of all, the topology determining unit 103j of the control device 103 the traffic amounts "x", "y", and "z" between the groups in the same way as Step S413 by using a traffic matrix representing the intrasubnet communication amount.

Then, the topology determining unit 103j adds a traffic amount obtained based on a traffic matrix representing the intersubnet communication amount to the calculated traffic amount. For instance, when there is an intersubnet communication, a communication from the middle switch 113a having the "ID" A toward the middle switch 113b having the "ID" B is considered.

In the case of the intranet communication, because the middle switch 113a having the "ID" A and the middle switch 113b having the "ID" B belong to the same group 0, a contribution to the traffic amounts "x", "y", and "z" is zero. On the other hand, in the case of the intersubnet communication, a layer 3 switch or a router that performs a routing of a signal over the subnet is required.

Therefore, a signal path becomes a path routing through the middle switch 113g having the "ID" G that is capable of executing a layer 3 switching, as shown in FIG. 35B. In this case, because a traffic is generated from the middle switch 113a having the "ID" A to the middle switch 113g having the "ID" G that is positioned outside the block, an amount of the traffic is added to the traffic amount "y". Following the above procedures, the traffic amounts "x", "y", and "z" are calculated, and a total of the traffic amounts "sum" is obtained.

In this manner, even when the middle switches 113a to 113g having the layer 3 switching function are included in the communication system, it is possible to appropriately perform a determination of the connection between nodes.

Although, in the processes explained with reference to FIG. 33A, FIG. 33B, FIG. 35A, and FIG. 35B, a group division of the middle switches 113a to 113g is performed after arranging the middle switches 113a to 113g in order of the "ID", the order of arranging the middle switches 113a to 113g can be determined based on the traffic amount.

Figure 36:
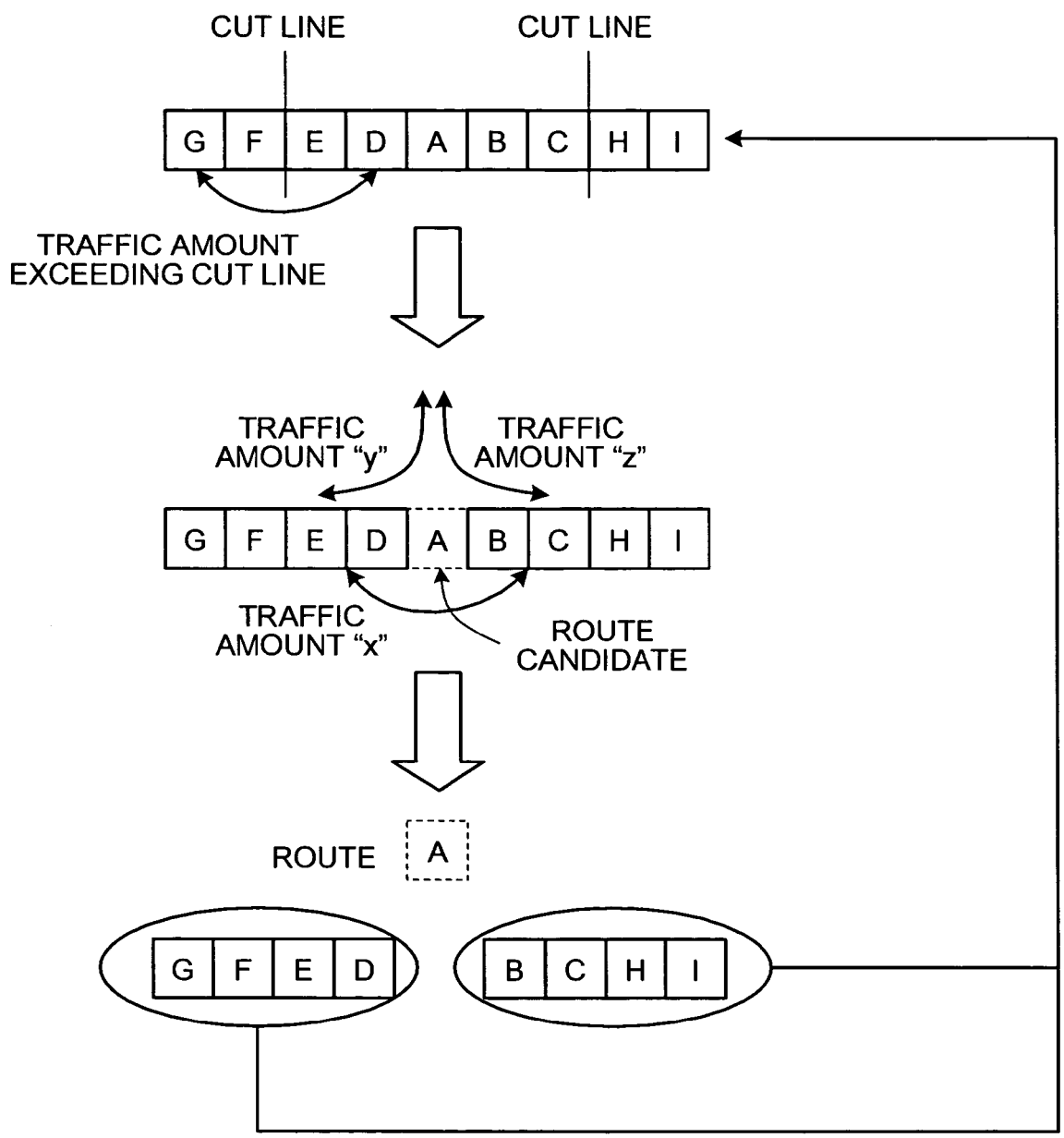
FIG. 36 is a schematic diagram for illustrating a process of arranging the middle switches based on a traffic amount before performing a group division.

FIG. 36 is a schematic diagram for illustrating a process of arranging the middle switches based on a traffic amount before performing the group division. In the example shown in FIG. 36, the number of middle switches is nine (middle switches A to I).

First of all, the topology determining unit 103j of the control device 103 sets two cut lines at random, and calculates a traffic amount that exceeds the cut line based on the traffic amount measured by the traffic monitoring device 104.

After that, the topology determining unit 103j sorts the middle switches in order in which the traffic amount calculated from the cut line becomes small. The topology determining unit 103j performs the sorting of the middle switches for a plurality of times by changing positions of the cut lines. In this manner, it is possible to arrange middle switches having a large traffic amount close to each other, and efficiently search for an optimum topology.

From then on, the topology determining unit 103j selects a middle switch that becomes a candidate for a root node in the same way as explained with reference to FIG. 33A, FIG. 33B, FIG. 35A, and FIG. 35B, and calculates the traffic amount "x" between a left-side node group and a right-side node group of the middle switch that becomes the candidate for the root node.

In addition, the topology determining unit 103j calculates the traffic amount "y" between the left-side node group of the middle switch that becomes the candidate for the root node and an upper node, and the traffic amount "z" between the right-side node group of the middle switch that becomes the candidate for the root node and an upper node, and calculates a sum of the traffic amounts "x", y and "z".

The topology determining unit 103j calculates the sum of the traffic amounts "x", "y", and "z" for every middle switch that becomes the candidate for the root node, and selects a middle switch having a minimum sum as the root node.

Then, the topology determining unit 103j can obtain an appropriate topology of the middle switches by repeating the above procedures for the left-side node group and the right-side node group of the root node.

By executing the above processes, connection configuration data between nodes as shown in FIG. 37 is generated, and stored in the storing unit 103c. FIG. 37 is a schematic diagram for illustrating an example of the connection configuration data between nodes.

As shown in FIG. 37, the connection configuration data between nodes includes information on "link connection destination", "number of signal lines", "switching capacity", "link capacity", and "layer 2/3 switching capability" in addition to the information on the "ID", the "group", the "left", the "right", and the "isRoot".

The "link connection destination" is identification information for identifying the ports 111a to 111u of the physical wiring switch 110 to which the middle switches 113a to 113g are connected. Based on the connection configuration data between nodes, the physical-wiring-switch control unit 103k of the control device 103 executes an actual network switching by controlling the physical wiring switch 110.

Figure 38:
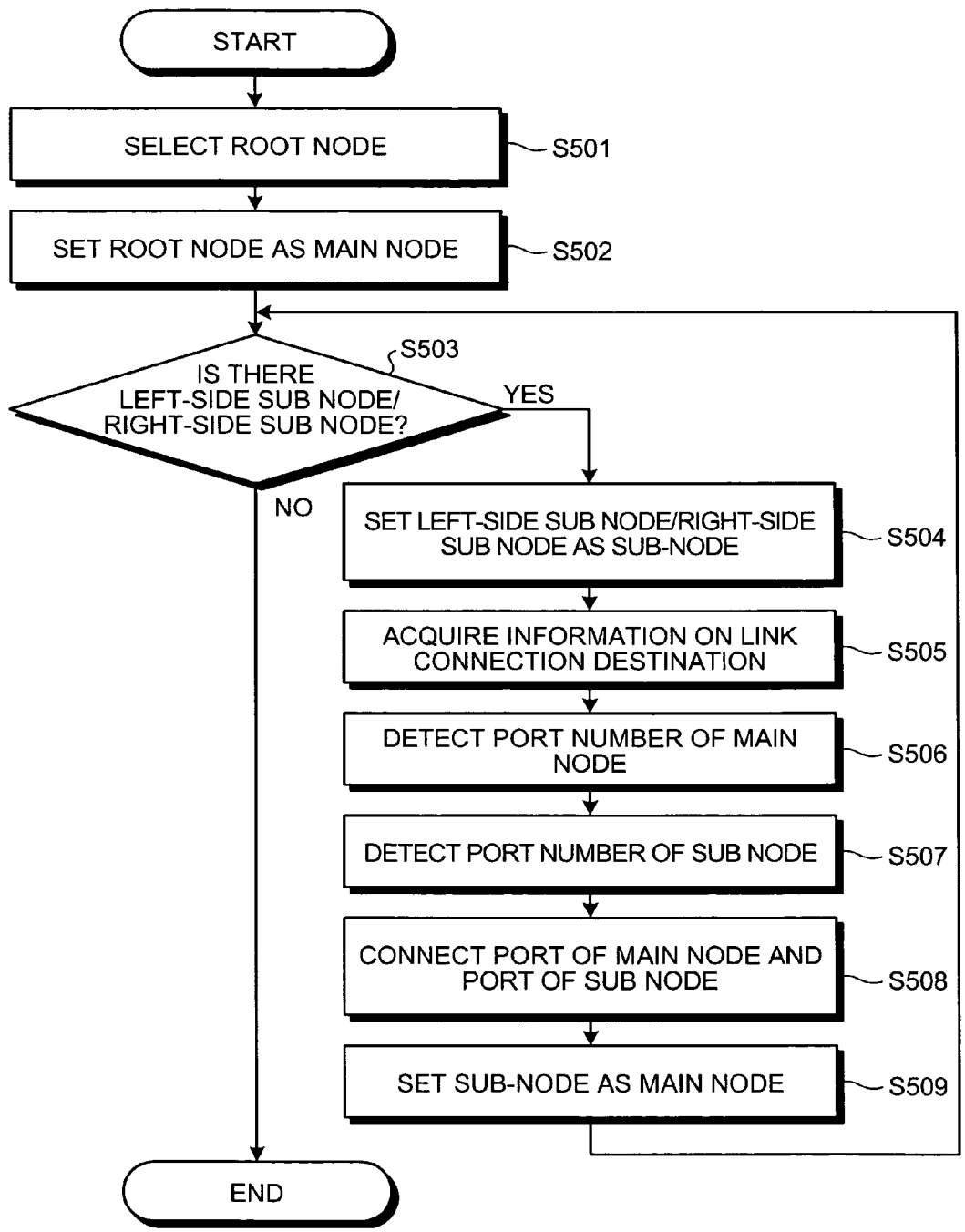
FIG. 38 is a flowchart of a processing procedure for a process of switching physical wirings.

FIG. 38 is a flowchart of a processing procedure for a process of switching the physical wiring. The physical-wiring-switch control unit 103k of the control device 103 selects a root node by referring to the connection configuration data between nodes (Step S501), and sets the root node as a main node (Step S502).

Then, the physical-wiring-switch control unit 103k checks whether there is a left-side sub-node/right-side sub-node of the main node (Step S503). When there is no left-side sub-node/right-side sub-node ("NO" at Step S503), the physical-wiring-switch control unit 103k ends the process of switching the physical wiring.

On the other hand, when there is a left-side sub-node/right-side sub-node ("YES" at Step S503), the physical-wiring-switch control unit 103k sets the left-side sub-node/right-side sub-node as a sub node (Step S504).

After that, the physical-wiring-switch control unit 103k acquires information on the "link connection destination" from the connection configuration data between nodes (Step S505). The physical-wiring-switch control unit 103k detects a port number of the main node (Step S506), and further detects a port number of the sub node (Step S507).

Subsequently, the physical-wiring-switch control unit 103k connects ports 111a to 111u of the main node and ports 111a to 111u of the sub node by controlling the physical wiring switch 110 based on the detected port numbers (Step S508).

Then, the physical-wiring-switch control unit 103k sets the sub node as the main node (Step S509), moves to Step S503 to execute the process of checking whether there is the left-side sub-node/right-side sub-node of the main node, and continue the subsequent processes.

When executing the switching of the physical wiring only in a network of a layer 2 switch, there may be a mismatch in a forwarding database (FDB) of the switch.

Figure 39:
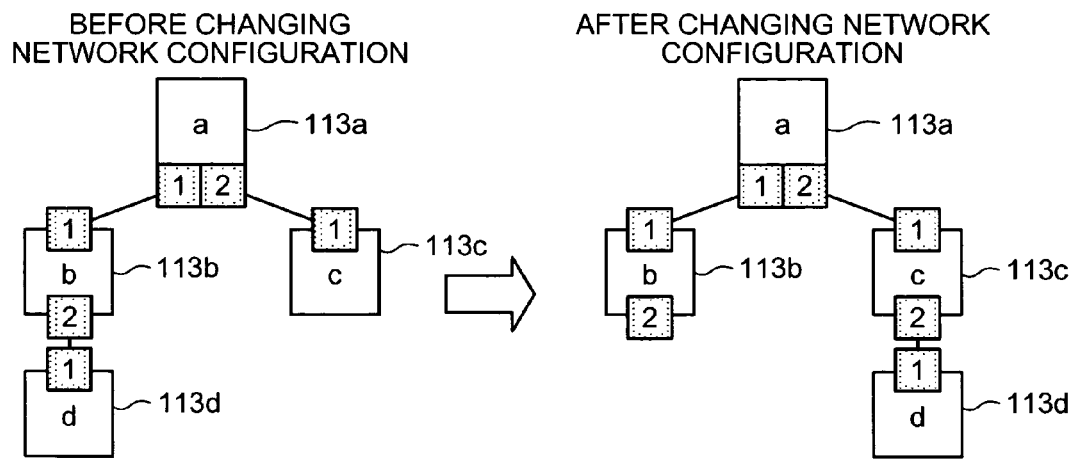
FIG. 39 is a schematic diagram for illustrating a mismatch of a forwarding database.

FIG. 39 is a schematic diagram for illustrating a mismatch of the forwarding database. Before changing the network configuration, the middle switch 113b is connected as the left-side sub-node of the middle switch 113a that is the root node, the middle switch 113c is connected as the right-side sub-node of the root node, and the middle switch 113d is connected as a sub node of the middle switch 113b.

After changing the network configuration, the middle switch 113d that was connected to the middle switch 113b is connected as a sub node of the middle switch 113c.

In this case, the middle switch 113b can recognize that the middle switch 113d is does not exist at an interface 2 of the middle switch 113b because a link between the middle switch 113b and the middle switch 113d is disconnected. However, the middle switch 113a still recognizes that the interface for the middle switch 113d is an interface 1 of the middle switch 113a even after changing the network configuration, unless a data frame is transmitted from the middle switch 113d to the middle switch 113a.

Similarly, the middle switch 113c holds only information that the middle switch 113d exists ahead of an interface 1 of the middle switch 113c. This is the mismatch of the forwarding database. Although a timeout value is generally set in the forwarding database, the set value is 300 seconds in most switches.

In other words, as shown in FIG. 39, it causes a situation in which the communication is not possible for up to 300 seconds after changing the network configuration, unless there is a data frame from the middle switch 113d. If this happens, it is necessary to correct the forwarding database. A method of correcting the forwarding database is as follows. By correcting the forwarding database, a possibility of resuming the communication on the network promptly becomes high.

The middle-switch control unit 103l of the control device 103 detects the middle switches 113a to 113g in which the mismatch of the forwarding database occurs with a change of the network configuration, based on the connection configuration data between nodes shown in FIG. 37, and deletes all entry information of the forwarding database stored in the detected middle switches 113a to 113g. In the example shown in FIG. 39, the middle switch 113a and the middle switch 113c become targets for deleting the entry information of the forwarding database.

With this scheme, the middle switch 113a and the middle switch 113c can learn a correct forwarding database in a new network configuration, and normally perform the communication.

Figure 40:
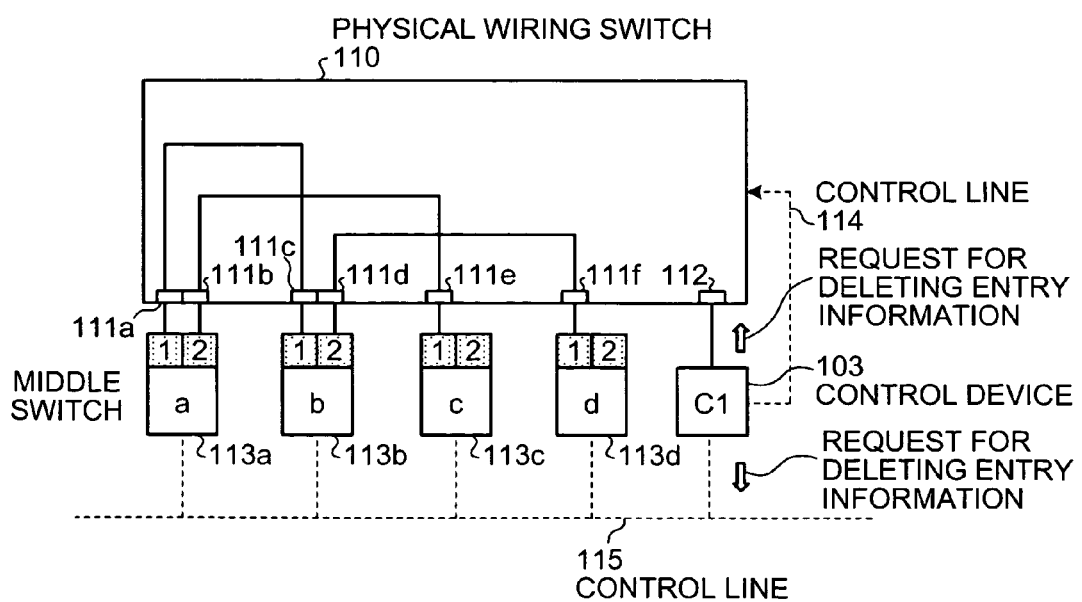
FIG. 40 is a schematic diagram for illustrating a process of deleting entry information of the forwarding database.

FIG. 40 is a schematic diagram for illustrating a process of deleting entry information of the forwarding database. In the example shown in FIG. 40, the middle-switch control unit 103l of the control device 103 causes the middle switches 113a to 113d to delete the entry information by transmitting a request for deleting the entry information to the middle switches 113a to 113d via the control line 115.

Alternatively, the physical-wiring-switch control unit 103k of the control device 103 connects the port 112, to which the control device 103 is connected, with the ports 111a to 111f to which the middle switches 113a to 113d are connected, by controlling the physical wiring switch 110, so that the middle-switch control unit 103l transmits the request for deleting the entry information to the middle switches 113a to 113d via the port 112, to cause the middle switches 113a to 113d to delete the entry information.

Although the middle switches 113a to 113d in which the mismatch of the forwarding database occurs with a change of the network configuration are the targets for deleting the entry information of the forwarding database in the above example, the entry information of all of the middle switches 113a to 113d in the network can be taken as the targets for deleting the entry information of the forwarding database.

An ordinary layer 2 switch has a function of deleting entry information of a forwarding database when a link of an interface is down. Therefore, the entry information of the forwarding database having the mismatch can also be deleted by using the function of the layer 2 switch.

Figure 41:
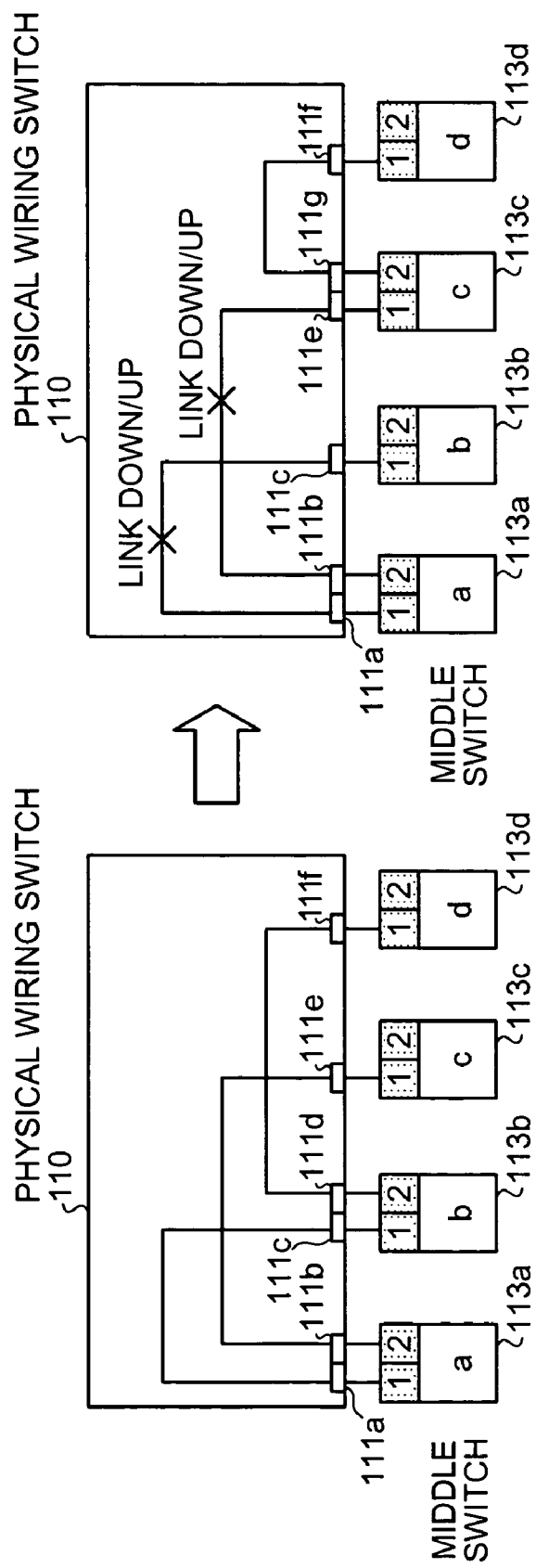
FIG. 41 is a schematic diagram for illustrating a process of deleting entry information of the forwarding database by a forced link down.

FIG. 41 is a schematic diagram for illustrating a process of deleting entry information of the forwarding database by a forced link down. In the example shown in FIG. 41, the network configuration is changed in such a manner that the middle switch 113d is changed from a sub node of the middle switch 113b to a sub node of the middle switch 113c.

In this case, the physical-wiring-switch control unit 103k of the control device 103 instantaneously brings down a link between an interface 1 of the middle switch 113a and an interface 1 of the middle switch 113b, and a link between an interface 1 of the middle switch 113c and an interface 2 of the middle switch 113a, by controlling the physical wiring switch 110. From then on, the physical-wiring-switch control unit 103k establishes the links again, and then, the entry information of the forwarding database having the mismatch can be deleted.

Figure 42:
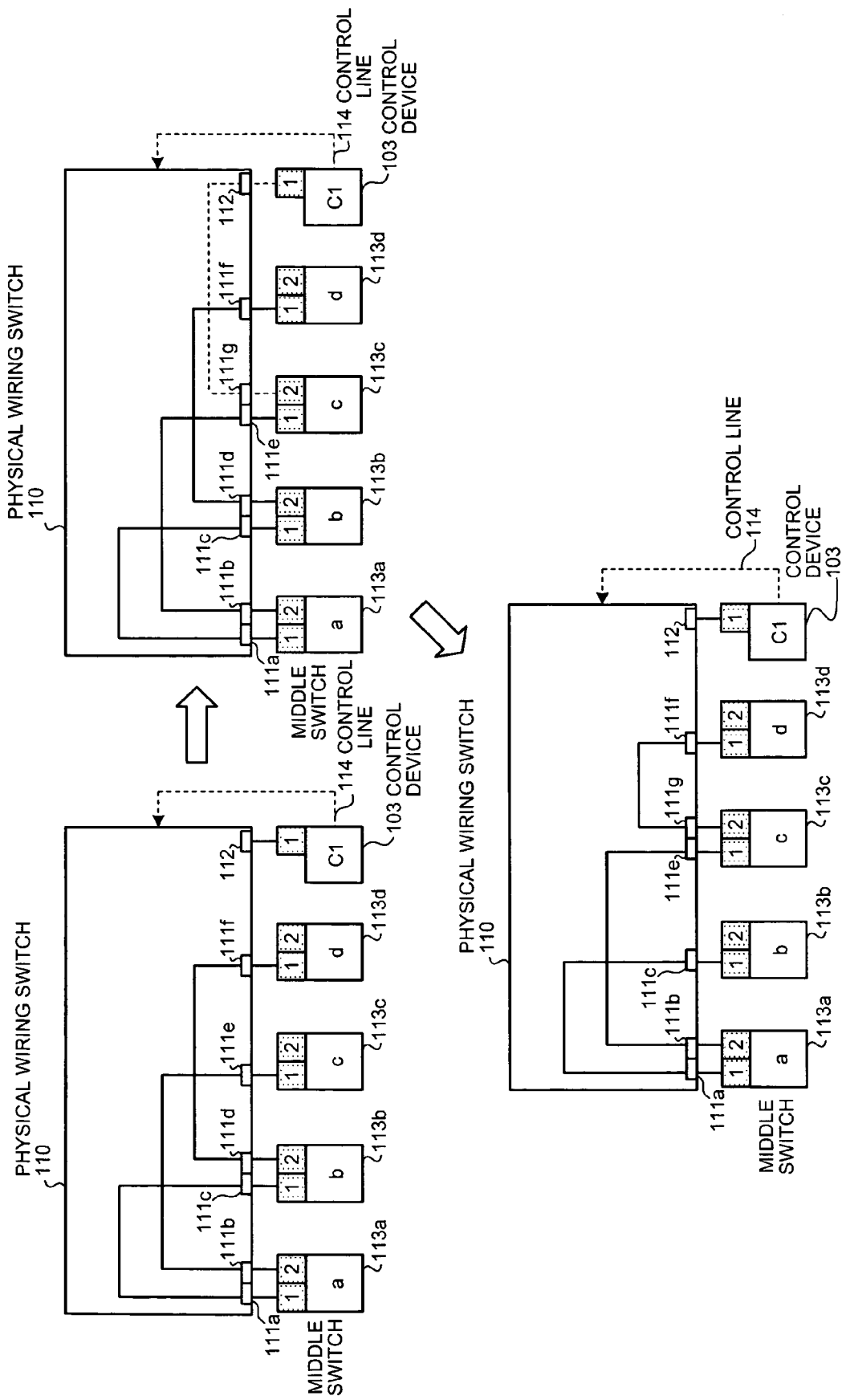
FIG. 42 is a schematic diagram for illustrating a process of rewriting the entry information of the forwarding database having a mismatch.

Alternatively, the mismatch of the forwarding database can be resolved by rewriting the entry information of the forwarding database having the mismatch instead of deleting it. FIG. 42 is a schematic diagram for illustrating a process of rewriting the entry information of the forwarding database having the mismatch.

In the example shown in FIG. 42, the network configuration is changed in such a manner that the middle switch 113d is changed from a sub node of the middle switch 113b to a sub node of the middle switch 113c.

First of all, the physical-wiring-switch control unit 103k of the control device 103 changes the network configuration by controlling the physical wiring switch 110, so that the control device 103 is connected to an interface 2 of the middle switch 113c that becomes a connection destination of the middle switch 113d.

The middle-switch control unit 103l performs a multicast transmission of a pseudo-frame having a MAC address of a device under the middle switch 113d as a transmission-source address, via the interface 2 of the middle switch 113c.

The middle-switch control unit 103l can acquire information on the MAC address of the device under the middle switch 113d from the middle switch 113d, or from a network administrator by receiving an input of the information.

Although the pseudo-frame is transmitted in multicast in the above example, the mismatch of the forwarding database can also be resolved transmitting the pseudo-frame in broadcast of in unicast.

With the above procedures, it is possible to make all of the middle switches 113a to 113d in the network recognize that the device under the middle switch 113d is connected to the interface 2 of the middle switch 113c. After that, the physical-wiring-switch control unit 103k connects the interface 2 of the middle switch 113c and the interface 1 of the middle switch 113d by controlling the physical wiring switch 110, and ends the process of changing the network configuration.

Although the layer 2 switch is considered for the middle switches 113a to 113d in the example explained with reference to FIG. 39 and FIG. 42, a similar process can be performed even in the case of more layers from a layer 3 to a layer 7.

In addition, to suppress a loss of data when executing the switching of the physical wiring to a minimum level, or to prevent a leakage of data due to the switching of the physical wiring, a transmission of the data from the middle switches 113a to 113d can be suspended at a time of switching the physical wiring.

In this case, the middle-switch control unit 103l of the control device 103 makes one of the middle switches 113a to 113d that is connected to the other of the middle switches 113a to 113d by the physical wiring switch 110 suspend a transmission of data for a predetermined time, and accumulates the data in a buffer memory of the middle switches 113a to 113d.

In addition, when performing a switching of the physical wiring, it is required to change a variety of settings in a layer 2/3 or a higher layer, such as a setting of the VLAN and a setting of a routing table, according to a new network configuration.

The change of the settings can be performed by a network administrator, or alternatively, the control device 103 can perform the setting on each of the middle switches. As for a method of performing the settings, the physical-wiring-switch control unit 103k of the control device 103 connects a middle switch on which a setting is to be performed and the control device 103 by controlling the physical wiring switch 110 to switch the physical wiring, and after that, the middle-switch control unit 103l performs the setting on the middle switch.

Another method is to perform the setting on the middle switch by providing the control line 115 that connects the control device 103 and each of the middle switches, and transmitting setting information to the middle switch by the middle-switch control unit 103l via the control line 115.

FIG. 43 is a schematic diagram for illustrating a topology of the middle switches after changing the network configuration. FIG. 44 is a schematic diagram for illustrating an example of network configuration data stored in the storing unit 103c of the control device 103. FIG. 45 is a schematic diagram for illustrating an example of a routing table to be set to the middle switch 113b.

In the example shown in FIG. 43, the middle switch 113a (node a) is set as the root node, the middle switch 113b (node b) is set as a left-side sub-node of the middle switch 113a, and the middle switch 113c (node c) is set as a right-side sub-node of the middle switch 113a.

Furthermore, the middle switch 113d (node d) is set as a left-side sub-node of the middle switch 113b (node b), the middle switch 113e (node e) is set as a right-side sub-node of the middle switch 113b (node b), the middle switch 113f (node f) is set as a left-side sub-node of the middle switch 113c (node c), and the middle switch 113g (node g) is set as a left-side sub-node of the middle switch 113c (node c). In this example, the middle switch 113b (node b) is a middle switch that is capable of performing a layer 3 routing, and is further connected to a common network 150.

The storing unit 103c of the control device 103 stores network configuration data shown in FIG. 44. The network configuration data includes information on "node", "interface", and "VLAN". By referring to the network configuration data, it is possible to detect a VLAN corresponding to each interface of the node. In addition, when the network configuration is changed, the middle-switch control unit 103l of the control device 103 receives information on an update of the network configuration data from the network administrator, and updates the network configuration data.

Then, the middle-switch control unit 103l creates a routing table shown in FIG. 45 based on the network configuration data, and sets the routing table to the middle switch 113b (node b) that has the layer 3 routing function.

Figure 46:
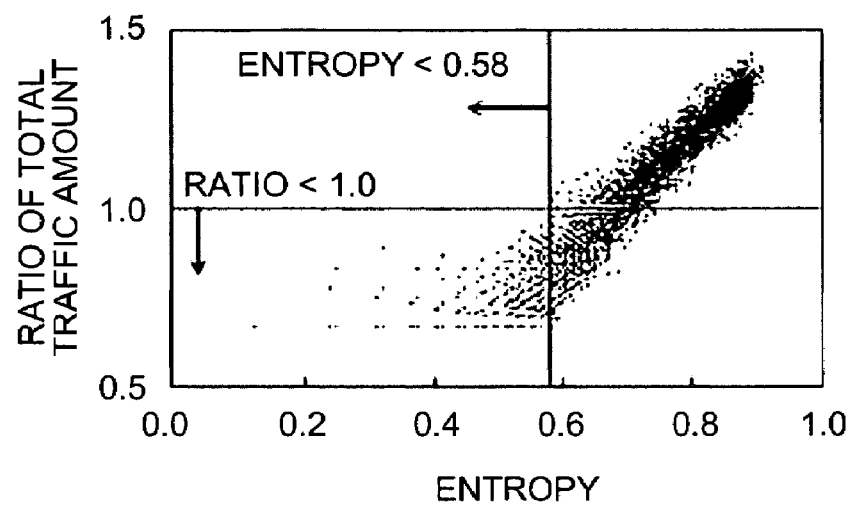
FIG. 46 is a graph for illustrating a comparison of the traffic amount between the communication system according to the second embodiment and the communication system according to the conventional technology.

FIG. 46 is a graph for illustrating a comparison of the traffic amount between the communication system according to the second embodiment and the communication system according to the conventional technology. In this case, edge switches are connected to the physical wiring switch 110 instead of the middle switches.

The vertical axis of the graph shown in FIG. 46 represents a ratio of a total traffic amount of a network in the communication system according to the second embodiment to a total traffic amount of a network in the communication system according to the conventional technology. When a value of the ratio is smaller than "1", it means that the total traffic amount of the network in the communication system according to the second embodiment is smaller than the total traffic amount of the network in the communication system according to the conventional technology.

The horizontal axis of the graph shown in FIG. 46 represents an entropy that is calculated as $$H = \frac{1}{\log_2 N^2} \sum_{i,j=0}^{N} (-1) \times \frac{M_{ij}}{S} \times \log_2\left(\frac{M_{ij}}{S}\right) \quad (1)$$

$$S = \sum_{i,j=0}^{N} M_{ij}$$

where H is the entropy, N is the number of edge switches, and $M_{ij}$ is a traffic amount between an edge switch i and an edge switch j.

When the traffic amount between the edge switches is same for all of the edge switches, the entropy becomes "1". On the other hand, as the traffic amount between the edge switches is different for each of the edge switches, the entropy approaches "0".

As shown in FIG. 46, when the entropy is smaller than "0.58", it is possible to bring the total traffic amount of the network in the communication system according to the second embodiment less than total traffic amount of the network in the communication system according to the conventional technology.

Figure 47:
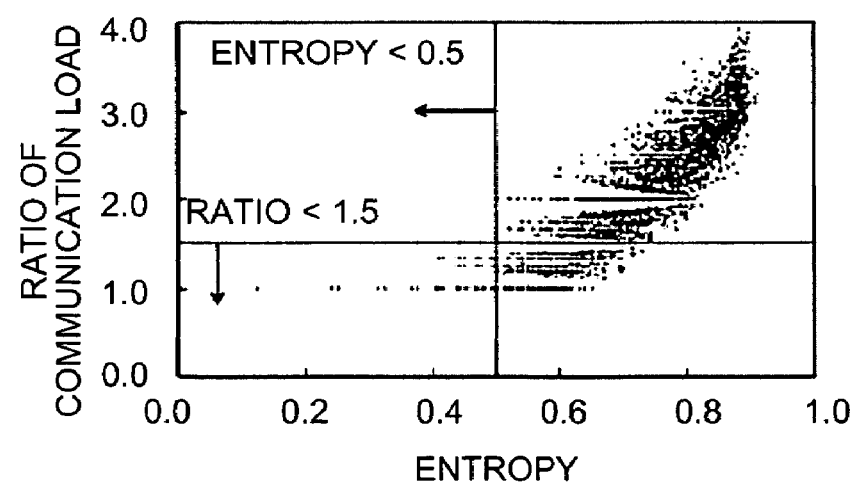
FIG. 47 is a graph for illustrating a comparison of the communication load between the communication system according to the second embodiment and the communication system according to the conventional technology.

FIG. 47 is a graph for illustrating a comparison of the communication load between the communication system according to the second embodiment and the communication system according to the conventional technology. The vertical axis of the graph shown in FIG. 47 represents a ratio of a maximum communication load of the edge switch in the communication system according to the second embodiment to a maximum communication load of the edge switch in the communication system according to the conventional technology. When a value of the ratio is bigger than "1", it means that the maximum communication load of the edge switch in the communication system according to the second embodiment is bigger than the maximum communication load of the edge switch in the communication system according to the conventional technology. The horizontal axis of the graph shown in FIG. 46 represents the entropy.

Because a communication load of a core switch in the communication system according to the conventional technology is distributed to the edge switches in the communication system according to the second embodiment, the ratio of the communication load is always bigger than "1". In an area in which the entropy is smaller than "0.5", the communication load of the communication system according to the second embodiment becomes equal to or less than 1.5 times the communication load of the communication system according to the conventional technology.

In general, in an intranet of a company, the entropy becomes smaller than "0.5" because the traffic amount is unevenly distributed in the network. In this case, the edge switches are often operated in a state in which even a half of the switching capability is not used.

However, in the communication system according to the second embodiment, a traffic process by the edge switches can be made as efficient as 1.5 times, and it is possible to effectively use the edge switches.

As described above, according to the second embodiment, the control device 103 performs a switching of connection between the connection interfaces by controlling the physical wiring switch 110 to which the middle switches 113a to 113g are connected by a plurality of connection interfaces per each; and therefore, a flexibility in establishing a network system can be enhanced effectively.

Furthermore, according to the second embodiment, upon receiving a request for changing a network configuration, the control device 103 autonomously performs the switching of connection between the connection interfaces in response to the received request; and therefore, the network system can be established effectively according to the request from the user.

Moreover, according to the second embodiment, the control device 103 autonomously performs the switching of connection between the connection interfaces based on the communication amount between the middle switches 113a to 113g; and therefore, the network system can be established effectively taking the communication amount between the middle switches 113a to 113g into consideration.

Furthermore, according to the second embodiment, the control device 103 measures the communication amount between the middle switches 113a to 113g, and autonomously performs the switching of connection between the connection interfaces based on the measured communication amount; and therefore, the network system can be established effectively taking the measured communication amount between the middle switches 113a to 113g into consideration.

Moreover, according to the second embodiment, the control device 103 performs the switching of connection between the connection interfaces in such a manner that the middle switches 113a to 113g of which a mutual communication traffic is large are arranged close to each other in a predetermined network topology; and therefore, it is possible to suppress a load on the other middle switches 113a to 113g.

Furthermore, according to the second embodiment, the control device 103 calculates a network configuration with which a sum of the communication traffics between the middle switches 113a to 113g is minimized, and performs the switching of connection between the connection interfaces based on information on the calculated network configuration; and therefore, it is possible to establish a network system that can effectively suppress a load on the middle switches 113a to 113g.

Moreover, according to the second embodiment, the control device 103 calculates a network configuration with which a sum of the communication traffics between the middle switches 113a to 113g is smaller than that in other network configuration, and performs the switching of connection between the connection interfaces based on information on the calculated network configuration; and therefore, it is possible to establish a network system that can relatively suppress a load on the middle switches 113a to 113g, and at the same time, a time for calculating the network configuration can be reduced.

Furthermore, according to the second embodiment, the control device 103 calculates a network configuration with which a sum of the communication traffics that should be handled by the middle switches 113a to 113g is minimized, and performs the switching of connection between the connection interfaces based on information on the calculated network configuration; and therefore, it is possible to establish a network system that can effectively suppress a load on the middle switches 113a to 113g.

Moreover, according to the second embodiment, the control device 103 calculates a network configuration with which a sum of the communication traffics that should be handled by the middle switches 113a to 113g is smaller than that in other network configuration, and performs the switching of connection between the connection interfaces based on information on the calculated network configuration; and therefore, it is possible to establish a network system that can relatively suppress a load on the middle switches 113a to 113g, and at the same time, a time for calculating the network configuration can be reduced.

Furthermore, according to the second embodiment, the control device 103 performs an update of routing information, when either one of the middle switches 113a to 113g having a routing function and a router is connected to the physical wiring switch 110, in response to the switching of connection between the connection interfaces, at a time of switching the connection between the connection interfaces; and therefore, even when the connection is changed, the middle switches 113a to 113g or the router can perform an appropriate routing process.

Moreover, according to the second embodiment, the control device 103 performs an update of routing information, when the middle switches 113a to 113g to which a routing function is added are connected to the physical wiring switch 110, in response to the switching of connection between the connection interfaces, at a time of switching the connection between the connection interfaces; and therefore, even when the connection is changed, the middle switches 113a to 113g to which the routing function is added can perform an appropriate routing process.

Furthermore, according to the second embodiment, the control device 103 performs an update of routing information, when either one of the middle switches 113a to 113g to which a routing function is added and a router is connected to the physical wiring switch 110, in response to the switching of connection between the connection interfaces, at a time of switching the connection between the connection interfaces; and therefore, even when the connection is changed, the middle switches 113a to 113g to which the routing function is added or the router can perform an appropriate routing process.

Moreover, according to the second embodiment, the control device 103 performs an update of a forwarding database of the middle switches 113a to 113g in response to the switching of connection between the connection interfaces, at a time of switching the connection between the connection interfaces; and therefore, even when the connection is changed, the middle switches 113a to 113g can appropriately transfer data.

Furthermore, according to the second embodiment, the control device 103 controls a transmission of pseudo-data having, as a transmission-source address, an address of a communication device stored in the middle switches 113a to 113g of which a connection relation with other middle switches 113a to 113g is changed, at a time of switching the connection between the connection interfaces; and therefore, due to an update of the forwarding database of the middle switches 113a to 113g that received the pseudo-data, even when the connection is changed, the middle switches 113a to 113g can appropriately transfer data.

Moreover, according to the second embodiment, the control device 103 controls a deletion of an entry of a forwarding database stored in the middle switches 113a to 113g, at a time of switching the connection between the connection interfaces; and therefore, it is possible to normalize the communication by making the middle switches 113a to 113g create a new forwarding database.

Furthermore, according to the second embodiment, the control device 103 temporarily deletes a connection between the middle switches 113a to 113g in which a forwarding database having a mismatching is stored and the other middle switches 113a to 113g, by controlling the physical wiring switch 110, at a time of switching the connection between the connection interfaces; and therefore, it is possible to normalize the communication by making the middle switches 113a to 113g create a new forwarding database.

Moreover, according to the second embodiment, the control device 103 sets an operation condition to the middle switches 113a to 113g, at a time of switching the connection between the connection interfaces; and therefore, it is possible to make the middle switches 113a to 113g appropriately perform a switching operation of a routing operation.

Furthermore, according to the second embodiment, the control device 103 temporarily suspends a transmission of data by controlling the middle switches 113a to 113g, at a time of switching the connection between the connection interfaces; and therefore, a loss or a leakage of data at a time of switching the connection can be prevented.

According to the first and the second embodiments, although the control device 19 or the control device 103 controls the change of the network configuration, it is also possible to obtain a network configuring program having the same function by realizing the structure of the control device 19 or the control device 103 by a software.

Figure 48:
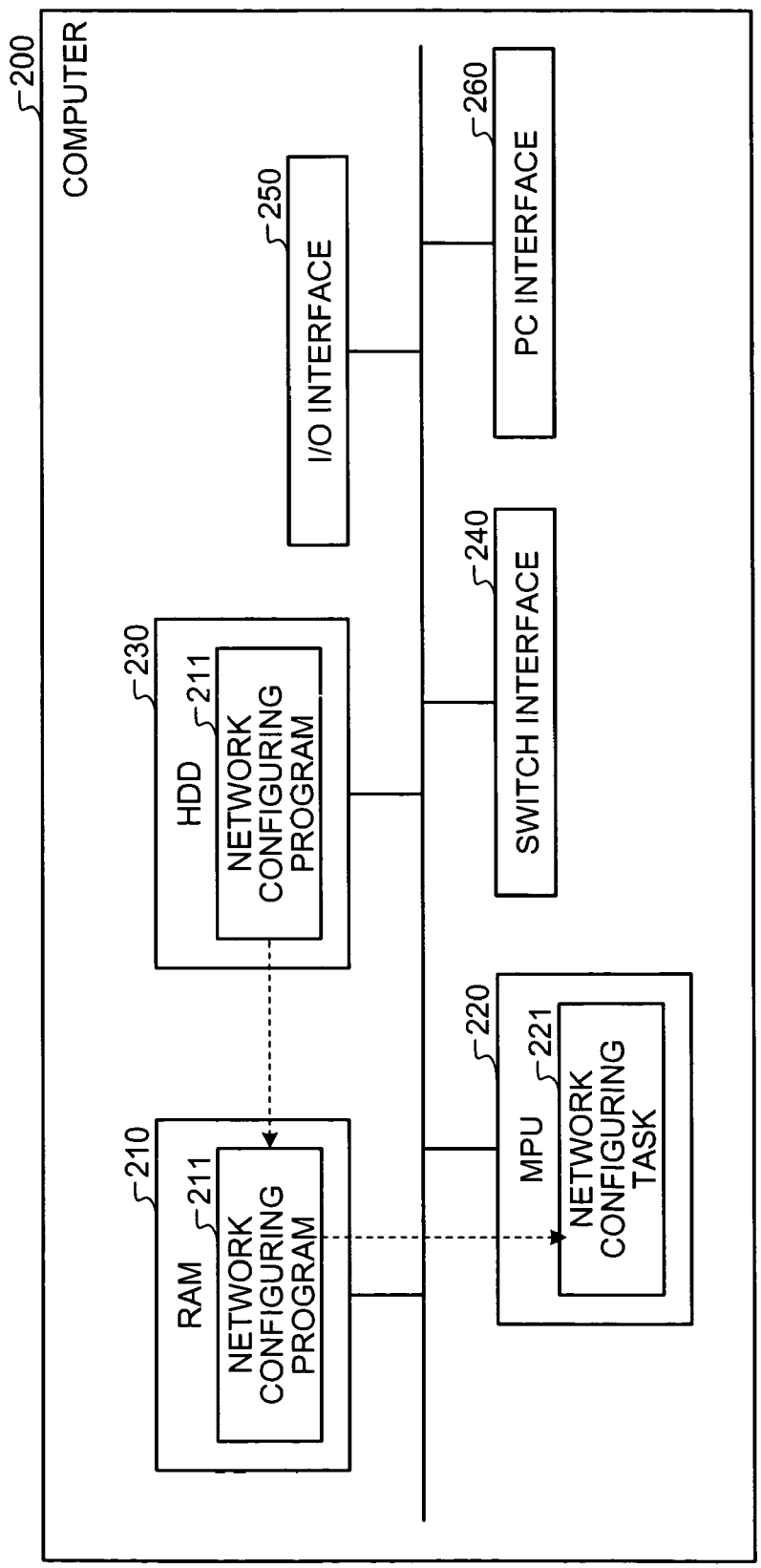
FIG. 48 is a block diagram for illustrating a functional configuration of a computer for executing a network configuring program.

FIG. 48 is a block diagram for illustrating a functional configuration of a computer 200 for executing a network configuring program 211. The computer 200 includes a random access memory (RAM) 210, a micro processing unit (MPU) 220, a hard disk drive (HDD) 230, a switch interface 240, an input/output (I/O) interface 250, and a personal computer (PC) interface 260.

The RAM 210 is a memory that stores a program or an intermediate result of the program in execution and the like. The MPU 220 is a processing unit that reads out a program from the RAM 210 and executes the program. The HDD 230 is a disk device that stores a program or data. The switch interface 240 is an interface for connecting the computer 200 to the physical wiring switches 110, 130, the LAN switches 15a, 15b, the middle switches 113a to 113g, and the like.

The I/O interface 250 is an interface for connecting a display unit and an input unit, such as a mouse and a keyboard. The PC interface 260 is an interface for connecting the computer 200 to the web servers 16a to 16c, the application servers 17a to 17c, the database servers 18a to 18c, and the like.

The network configuring program 211 executed in the computer 200 is downloaded from a PC via the PC interface 260, and stored in the HDD 230.

The network configuring program 211 stored in the HDD 230 is read out to the RAM 210, and executed by the MPU 220 as a network configuring task 221.

As described above, according to an embodiment of the present invention, it is possible to effectively enhance a flexibility in establishing a network system.

Furthermore, according to an embodiment of the present invention, it is possible to establish a network system with a capability of performing a communication between devices having different communication interfaces.

Moreover, according to an embodiment of the present invention, it is possible to establish a network system with a capability of performing a communication between devices having different protocols.

Furthermore, according to an embodiment of the present invention, it is possible to establish a network system with a capability of performing a communication between devices having different communication speeds.

Moreover, according to an embodiment of the present invention, a plurality of users can share a single packet switch, and therefore, it is possible to effectively enhance a flexibility in establishing a network system according to a request from each user.

Furthermore, according to an embodiment of the present invention, each the users can use each of the devices in a time-division manner, and as a result, it is possible to reduce the number of required devices.

Moreover, according to an embodiment of the present invention, it is possible to establish a network system including devices that satisfy the predetermined condition in an automatic manner.

Furthermore, according to an embodiment of the present invention, it is possible to perform an extraction of the devices satisfying the predetermined condition with efficiency.

Moreover, according to an embodiment of the present invention, it is possible to reduce a burden on a network administrator.

Furthermore, according to an embodiment of the present invention, it is possible to effectively establish a network system according to a request from each user.

Moreover, according to an embodiment of the present invention, it is possible to effectively establish a network system taking a communication amount between the packet switches into consideration.

Furthermore, according to an embodiment of the present invention, it is possible to effectively establish a network system taking a measured communication amount between the packet switches into consideration.

Moreover, according to an embodiment of the present invention, it is possible to suppress a load on other packet switches.

Furthermore, according to an embodiment of the present invention, it is possible to establish a network system that can effectively suppress a load on the packet switch.

Moreover, according to an embodiment of the present invention, it is possible to establish a network system that can relatively suppress a load on the packet switch, and at the same time, a time for calculating the network configuration can be reduced.

Furthermore, according to an embodiment of the present invention, even when a connection is changed, the packet switch or the router can perform an appropriate routing process.

Moreover, according to an embodiment of the present invention, even when the connection is changed, the packet switch to which the routing function is added can perform an appropriate routing process.

Furthermore, according to an embodiment of the present invention, even when the connection is changed, the packet switch to which the routing function is added or the router can perform an appropriate routing process.

Moreover, according to an embodiment of the present invention, even when the connection is changed, the packet switch can appropriately transfer data.

Furthermore, according to an embodiment of the present invention, due to an update of the forwarding database of the packet switch that received pseudo-data, even when the connection is changed, the packet switch can appropriately transfer data.

Moreover, according to an embodiment of the present invention, it is possible to normalize the communication by making the packet switch create a new forwarding database.

Furthermore, according to an embodiment of the present invention, it is possible to make the packet switch appropriately perform a switching operation of a routing operation.

Moreover, according to an embodiment of the present invention, a loss or a leakage of data at a time of switching the connection can be prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A network configuring apparatus comprising:
    an optical wiring switching unit that includes a first connection interface;
    a packet switch that includes a second connection interface;
    a resource that includes a third connection interface, the resource being formed with at least one of a server and a storage device; and
    a control device that controls the optical wiring switching unit to perform a switching of connection between the connection interfaces, wherein
    the packet switch and the resource are connected to the optical wiring switching unit via the connection interfaces,
    the network configuring apparatus configures a network by connecting the packet switch and the resource with a control of the optical wiring switching unit, and
    the control device autonomously performs the switching of connection between the connection interfaces in response to a request for changing a network configuration based on a communication traffic between packet switches.

2. The network configuring apparatus according to claim 1, further comprising:
    a network-division setting unit that performs a network division setting to the packet switch at a time of switching the connection between the connection interfaces by the control device.

3. The network configuring apparatus according to claim 1, wherein
    the control device performs the switching of connection between the connection interfaces based on a predetermined time.

4. The network configuring apparatus according to claim 1, further comprising:
    an extracting unit that extracts at least one of the packet switch and the resource satisfying a predetermined condition from among at least one of the packet switch and the resource connected to the optical wiring switching unit at a time of switching the connection between the connection interfaces by the control device, wherein
    the control device performs the switching of connection between the connection interfaces based on information on the at least one of the packet switch and the resource extracted by the extracting unit.

5. The network configuring apparatus according to claim 4, further comprising:
    a collecting unit that collects characteristic information on the at least one of the packet switch and the resource connected to the optical wiring switching unit, wherein
    the extracting unit extracts the at least one of the packet switch and the resource satisfying the predetermined condition based on the characteristic information collected by the collecting unit.

6. The network configuring apparatus according to claim 4, further comprising:
    a registering unit that registers characteristic information on the at least one of the packet switch and the resource connected to the optical wiring switching unit, wherein
    the extracting unit extracts the at least one of the packet switch and the resource satisfying the predetermined condition based on the characteristic information registered by the registering unit.

7. The network configuring apparatus according to claim 1, wherein
    the request for changing the network configuration is received from a user, and
    the control device autonomously performs the switching of connection between the connection interfaces in response to the request for changing the network configuration received from the user.

8. The network configuring apparatus according to claim 1, further comprising:
a measuring unit that measures the communication traffic between the packet switches, wherein
the control device autonomously performs the switching of connection between the connection interfaces based on the communication traffic measured by the measuring unit.

9. The network configuring apparatus according to claim 1, wherein
the control device performs the switching of connection between the connection interfaces in such a manner that packet switches of which a mutual communication traffic is large are arranged close to each other in a predetermined network topology.

10. The network configuring apparatus according to claim 1, wherein
the control device calculates a network configuration with which a sum of the communication traffics between the packet switches is minimized, and performs the switching of connection between the connection interfaces based on information on the calculated network configuration.

11. The network configuring apparatus according to claim 1, wherein
the control device calculates a network configuration with which a sum of the communication traffics between the packet switches is smaller than that in other network configuration, and performs the switching of connection between the connection interfaces based on information on the calculated network configuration.

12. The network configuring apparatus according to claim 1, wherein
the control device calculates a network configuration with which a sum of the communication traffics that should be handled by the packet switch is minimized, and performs the switching of connection between the connection interfaces based on information on the calculated network configuration.

13. The network configuring apparatus according to claim 1, wherein
the control device calculates a network configuration with which a sum of the communication traffics that should be handled by the packet switch is smaller than that in other network configuration, and performs the switching of connection between the connection interfaces based on information on the calculated network configuration.

14. The network configuring apparatus according to claim 1, further comprising:
a routing-information updating unit that performs an update of routing information, when either one of a packet switch having a routing function and a router is connected to the optical wiring switching unit, in response to the switching of connection between the connection interfaces, at a time of switching the connection between the connection interfaces by the control device.

15. The network configuring apparatus according to claim 1, further comprising:
a routing-information updating unit that performs an update of routing information, when a packet switch to which a routing function is added is connected to the optical wiring switching unit, in response to the switching of connection between the connection interfaces, at a time of switching the connection between the connection interfaces by the control device.

16. The network configuring apparatus according to claim 1, further comprising:
a routing-information updating unit that performs an update of routing information, when either one of a packet switch to which a routing function is added and a router is connected to the optical wiring switching unit, in response to the switching of connection between the connection interfaces, at a time of switching the connection between the connection interfaces by the control device.

17. The network configuring apparatus according to claim 1, further comprising:
a forwarding-database updating unit that performs an update of a forwarding database of the packet switch in response to the switching of connection between the connection interfaces, at a time of switching the connection between the connection interfaces by the control device.

18. The network configuring apparatus according to claim 1, further comprising:
a transmission control unit that controls a transmission of pseudo-data having, as a transmission-source address, an address of a communication device stored in a packet switch of which a connection relation with other packet switch is changed, at a time of switching the connection between the connection interfaces by the control device.

19. The network configuring apparatus according to claim 1, further comprising:
a deletion control unit that controls a deletion of an entry of a forwarding database stored in the packet switch, at a time of switching the connection between the connection interfaces by the control device.

20. The network configuring apparatus according to claim 1, wherein
the control device temporarily deletes a connection between a packet switch in which a forwarding database having a mismatching is stored and other packet switch, by controlling the optical wiring switching unit, at a time of switching the connection between the connection interfaces.

21. The network configuring apparatus according to claim 1, further comprising:
a condition setting unit that sets an operation condition to the packet switch, at a time of switching the connection between the connection interfaces by the control device.

22. The network configuring apparatus according to claim 1, further comprising:
a switch control unit that temporarily suspends a transmission of data by controlling the packet switch, at a time of switching the connection between the connection interfaces by the control device.

23. A network configuring apparatus comprising:
an optical wiring switching unit that includes a first connection interface;
a packet switch that includes a second connection interface;
a resource that includes a third connection interface, the resource being formed with at least one of a server and a storage device;
a control device that controls the optical wiring switching unit to perform a switching of connection between the connection interfaces; and
a communication interface converting unit that includes a fourth connection interface, the communication interface converting unit performing a conversion of a communication interface, wherein the control device controls the optical wiring switching unit to perform the switching of connection between the connection interfaces, the packet switch and at least one of the resource and the communication interface converting unit are connected to the optical wiring switching unit via the connection interfaces, end the network configuring apparatus configures a network by connecting the packet switch and at least one of the resource and the communication interface converting unit with a control of the optical wiring switching unit, the packet switch and the resource are connected to the optical wiring switching unit via the connection interfaces, and the network configuring apparatus configures a network by connecting the packet switch and the resource with a control of the optical wiring switching unit.

24. The network configuring apparatus according to claim 23, wherein the communication interface is a protocol, and the communication interface converting unit performs a conversion of the protocol.

25. The network configuring apparatus according to claim 23, wherein the communication interface is a communication speed, and the communication interface converting unit performs a conversion of the communication speed.

26. A network configuring method comprising:

controlling an optical wiring switching unit that includes a first connection interface, a packet switch that includes a second connection interface, a resource that includes a third connection interface, and is formed with at least one of a server and a storage device, to autonomously perform a switching of connection between the connection interfaces in response to a request for changing a network configuration based on a communication traffic between packet switches; and configuring a network by connecting the packet switch and the resource with a control of the optical wiring switching unit.

27. A computer-readable recording medium that stores therein a computer program for configuring a network, wherein the computer program causes a computer to execute:

controlling an optical wiring switching unit that includes a first connection interface, a packet switch that includes a second connection interface, a resource that includes a third connection interface, and is formed with at least one of a server and a storage device, to autonomously perform a switching of connection between the connection interfaces in response to a request for changing a network configuration based on a communication traffic between packet switches; and configuring a network by connecting the packet switch and the resource with a control of the optical wiring switching unit.

* * * * *